(12) United States Patent
Reh et al.

(10) Patent No.: US 12,472,270 B2
(45) Date of Patent: Nov. 18, 2025

(54) METHODS AND COMPOSITIONS FOR REPROGRAMMING MÜLLER GLIA

(71) Applicant: UNIVERSITY OF WASHINGTON, Seattle, WA (US)

(72) Inventors: Thomas A. Reh, Seattle, WA (US); Nikolas L. Jorstad, Seattle, WA (US); Levi Todd, Seattle, WA (US)

(73) Assignee: UNIVERSITY OF WASHINGTON, Seattle, WA (US)

( * ) Notice: Subject to any disclaimer, the term of this patent is extended or adjusted under 35 U.S.C. 154(b) by 911 days.

(21) Appl. No.: 17/594,661

(22) PCT Filed: Apr. 29, 2020

(86) PCT No.: PCT/US2020/030407
§ 371 (c)(1),
(2) Date: Oct. 25, 2021

(87) PCT Pub. No.: WO2020/223308
PCT Pub. Date: Nov. 5, 2020

(65) Prior Publication Data
US 2022/0193265 A1 Jun. 23, 2022

Related U.S. Application Data

(60) Provisional application No. 62/840,264, filed on Apr. 29, 2019.

(51) Int. Cl.
*A61K 48/00* (2006.01)
*A61K 38/17* (2006.01)
*A61P 27/02* (2006.01)
*C12N 15/62* (2006.01)
*C12N 15/86* (2006.01)

(52) U.S. Cl.
CPC ...... *A61K 48/0058* (2013.01); *A61K 38/1709* (2013.01); *A61P 27/02* (2018.01); *C12N 15/62* (2013.01); *C12N 15/86* (2013.01); *C12N 2740/15043* (2013.01); *C12N 2750/14143* (2013.01)

(58) Field of Classification Search
CPC . A61K 48/0058; A61K 38/1709; A61P 27/02; C12N 15/86
See application file for complete search history.

(56) References Cited

U.S. PATENT DOCUMENTS

| 2010/0049173 | A1 | 2/2010 | Plunkett |
| 2011/0223140 | A1 | 9/2011 | Park |
| 2018/0119122 | A1* | 5/2018 | Zhang ............... C12N 9/22 |
| 2018/0148689 | A1 | 5/2018 | Edge |
| 2021/0228741 | A1 | 7/2021 | Reh et al. |

FOREIGN PATENT DOCUMENTS

| WO | WO2013184809 A1 | 12/2013 |
| WO | WO2016125330 A1 | 8/2016 |
| WO | WO2017176810 | 10/2017 |

OTHER PUBLICATIONS

Baker et al. All in the family: proneural bHLH genes and neuronal diversity. (Year: 2018).*
Retinal Diseases. Cleveland Clinic. p. 1-16 downloaded from https://my.clevelandclinic.org/health/diseases/24853-retinal-diseases. (Year: 2024).*
Song et al. Atoh7 promotes retinal Muller cell differentiation into retinal ganglion cells. Cytotechnology (2016) 68:267-277 (Year: 2016).*
Fausett et al. The Proneural Basic Helix-Loop-Helix Gene Asc1a is Required for Retina Regeneration. The Journal of Neuroscience, Jan. 30, 2008 • 28(5):1109-1117 (Year: 2008).*
Wohlschlegel et al. ASCL1 induces neurogenesis in human Muller glia. Stem Cell Reports, vol. 18, p. 2400-2417 (Year: 2023).*
Inherited Retinal Disorders. Boston Children's Hospital p. 1-5 (Year: 2024).*
Glaucoma. National Eye Institutes. downloaded from https://www.nei.nih.gov/learn-about-eye-health/eye-conditions-and-diseases/glaucoma#. p. 1-5 (Year: 2024).*
Age-related Macular Degeneration. National Eye Institutes. downloaded from https://www.nei.nih.gov/learn-about-eye-health/eye-conditions-and-diseases/age-related-macular-degeneration#. p. 1-6 (Year: 2024).*
Chawla et al. Retinal Dystrophies. StatPearls—NCBI Bookshelf. p. 1-24 (Year: 2024).*
Voisin et al. Stem cell therapy in retinal diseases. Neural Regeneration Research, vol. 18, No. 7, Jul. 2023, p. 1478-1485 (published on Nov. 25, 2022) (Year: 2022).*
Vickers et al. The use of inducible engrailed fusion proteins to study the cellular functions of eukaryotic transcription factors. Methods 26 (2002) 270-280 (Year: 2002).*
Park. Lentiviral vectors: are they the future of animal transgenesis? Physiol Genomics 31: 159-173 (Year: 2007).*
Abernathy, D.G., et al., (2017). Cell stem cell 21, 332-348 e339.
Abrajano, J.J., et al., (2009) PloS one 4, e7936.
Andres, M.E., et al., (1999). Proceedings of the National Academy of Sciences of the United States of America 96, 9873-9878.

(Continued)

*Primary Examiner* — Taeyoon Kim
(74) *Attorney, Agent, or Firm* — Karen S. Canady; canady + lortz LLP

(57) ABSTRACT

Nucleic acid molecules and compositions, and methods using the same are provided herein for intraocular gene-based delivery and expression of two or more proneural bHLH transcription factors in the retina. The nucleic acid molecules, compositions and methods disclosed herein stimulate regeneration of retinal interneurons from retinal Müller glia (MG) and reprogram the MG into bipolar, amacrine, horizontal, and/or ganglion cells. Such methods and nucleic acid molecules are used for vision restoration and/or treatment of a range of ocular diseases involving retinal degeneration after injury, disease, or vison loss.

18 Claims, 2 Drawing Sheets

Specification includes a Sequence Listing.

(56) References Cited

OTHER PUBLICATIONS

Bai, G. et al. Dev Cell 13, 283-297, doi:10.1016/j.devcel.2007.05.014 (2007).
Balzeau, J., et al., (2017). Front Genet 8, 31.
Bardy, C., (2015). Proceedings of the National Academy of Sciences of the United States of America 112, E2725-2734.
Barnabe-Heider, F. et al. Neuron 48, 253-265, doi: 10.1016/j.neuron.2005.08.037 (2005).
Benezra, R., et al. Cell 61, 49-59 (1990).
Beveridge, N.J., et al., (2009). Cell Signal 21, 1837-1845.
Blackshaw, S., et al., (2004). PLoS Biol 2, E247.
Boareto, M., I et al. Development 144, 3465-3474, doi:10.1242/dev.152520 (2017).
Bonni, A. et al. Science 278, 477-483 (1997).
Brett, J.O., et al., (2011). Aging (Albany NY) 3, 108-124.
Bueno, M.J., Malumbres, M., (2011). MicroRNAs and the cell cycle. Biochim Biophys Acta 1812, 592-601.
Busskamp, V., et al., (2014). Neuron 83, 586-600.
Butler, A., et al. Nat Biotechnol 36, 411-420, doi:10.1038/nbt.4096 (2018).
Castro, D. S. et al. Genes Dev 25, 930-945, doi:10.1101/gad.627811 (2011).
Chronis, C. et al. Cell 168, 442-459 e420, doi:10.1016/j.cell.2016.12.016(2017).
Coulombre, J. L. & Coulombre, A. J. Dev Biol 12, 79-92 (1965).
Das, A.V., et al. (2006). Developmental biology 299, 283-302.
De Brouwer, S., et al., (2012). Int J Cancer 130, 2591-2598.
Dennis, L., et al., (2015). White Paper NanoString Technologies 1.0.
Doeppner, T.R., et al., (2013). Acta Neuropathol 126, 251-265.
Elsaeidi, F. et al. J Neurosci 38, 2246-2261, doi:10.1523/JNEUROSCI.2126-17.2018 (2018).
Erickson, P. A., et al. Invest Ophthalmol Vis Sci 24, 927-942 (1983).
Fausett, B. V. & Goldman, D. *J Neurosci* 26, 6303-6313, doi:10.1523/JNEUROSCI.0332-06.2006 (2006).
Fischer, A. J. & Reh, T. A. Nat Neurosci 4, 247-252, doi:10.1038/85090 (2001).
Foshay, K.M., Gallicano, G.I., (2009). Developmental biology 326, 431-443.
Gallina, D., et al., (2016). Developmental neurobiology 76, 983-1002.
Gao, X., et al., (2016). Sci Rep 6, 22490.
Geiss, G.K., et al., (2008). Nature biotechnology 26, 317-325.
Goldman, D., (2014). Nature reviews. Neuroscience 15, 431-442.
Gomez, D. L. et al. PLoS One 10, e0133862, doi:10.1371/journal.pone.0133862 (2015).
Grosche, A., et al., (2016). Mol Cell Proteomics 15, 462-480.
Guillemot, F. Prog Neurobiol 83, 37-52, doi:10.1016/j.pneurobio.2007.02.009 (2007).
Haug, B.H., et al., (2011). Carcinogenesis 32, 1005-1012.
He, F. et al. Nat Neurosci 8, 616-625, doi:10.1038/nn1440 (2005).
Heinz, S. et al. Mol Cell 38, 576-589, doi:10.1016/j.molcel.2010.05.004 (2010).
Hitchcock, Peter F., et al., Retinal Regeneration, Trends in Neurosciences. 1992. 15(3) p. 103-108.
Hjelm, B.E., et al., (2011). Neurosci Lett 502, 219-224.
Hunt, S., et al., (2011). FEBS Lett 585, 187-192.
Huo, J., et al., (2016). Int J Mol Sci 17.
Idichi, T., et al., (2018). Oncotarget 9, 28849-28865.
Jadhav, A.P., et al., (2009). Progress in retinal and eye research 28, 249-262.
Jeon, C.J., et al., (1998). The Journal of Neuroscience 18, 8936-8946.
Jin, J., et al., (2016). Cell reports 16, 1653-1663.
Jin, J., et al., (2018). Biochem Biophys Res Commun. 503: 1570-1574.
Johnson, S.M., et al., (2003). Developmental biology 259, 364-379.
Karl, M. O. & Reh, T. A. Trends Mol Med 16, 193-202, doi:10.1016/j.molmed.2010.02.003 (2010).
Karl, M. O. et al. Proc Natl Acad Sci U S A 105, 19508-19513, doi:10.1073/pnas.0807453105 (2008).
Kassen, S. C. et al. Exp Eye Res 88, 1051-1064, doi:10.1016/j.exer.2009.01.007 (2009).
La Torre, A., et al., (2013). Proceedings of the National Academy of Sciences of the United States of America 110, E2362-2370.
Lee, S.W., et al., (2018). Developmental cell 46, 73-84 e77.
Lee, Y.S., Dutta, A., (2007). Genes & development 21, 1025-1030.
Lenkowski, J. R. & Raymond, P. A. Prog Retin Eye Res 40, 94-123, doi:10.1016/j.preteyeres.2013.12.007 (2014).
Li, Y., et al., (2017). Oncotarget 8, 10274-10286.
Löffler, K., et al., (2015). Age-dependent Müller glia neurogenic competence in the mouse retina. Glia.
Makeyev, E.V., et al., (2007). Molecular cell 27, 435-448.
Mao, S., et al., (2014). FEBS J 281, 1144-1158.
Masserdotti, G., et al., (2015). Cell stem cell 17, 74-88.
McLean, C. Y. et al. Nat Biotechnol 28, 495-501, doi:10.1038/nbt.1630 (2010).
Naka-Kaneda, H., et al., (2014). Proceedings of the National Academy of Sciences of the United States of America 111, 1604-1609.
Nakamura, R.E., et al., (2007). BMC Cell Biol 8, 52.
Nam, H. S. & Benezra, R. Cell Stem Cell 5, 515-526, doi:10.1016/j.stem.2009.08.017 (2009).
Nelson, B.R., et al., (2011). PloS one 6, e22817.
Nelson, C. M. et al. J Comp Neurol 520, 4294-4311, doi:10.1002/cne.23213.
Neo, W.H., et al., (2014) The Journal of biological chemistry 289, 20788-20801.
Nesti, E., et al., (2014). Proceedings of the National Academy of Sciences of the United States of America 111, E3929-3936.
Pasquinelli, A.E., et al., (2000). Nature 408, 86-89.
Patterson, M., et al., (2014). Stem cell reports 3, 758-773.
Peterson, W. M., et al. J Neurosci 20, 4081-4090 (2000).
Qiu, X. et al. Nat Methods 14, 309-315, doi:10.1038/nmeth.4150 (2017).
Qureshi, I.A., et al., (2010). Cell Cycle 9, 4477-4486.
Rajaram, K., et al., (2014). Developmental dynamics 243, 1591-1605.
Ramachandran, R., et al., (2011). Proceedings of the National Academy of Sciences of the United States of America 108, 15858-15863.
Ramachandran, Rajesh, et al., Ascl1a regulates Muller glia dedifferentiation and retinal regeneration through a Lin-28-dependent, let-7 microRNA signaling pathway, Nature. 2010. pp. 1101-1107.
Raymond, P. A., et al.. BMC Dev Biol 6, 36, doi:10.1186/1471-213X-6-36.
Reh, T. A., Nagy, T. & Gretton, H. Nature 330, 68-71, doi:10.1038/330068a0.
Reinhart, B.J., et al., (2000). Nature 403, 901-906.
Roesch, K., et al., (2008). The Journal of comparative neurology 509, 225-238.
Ruzinova, M. B. & Benezra, R. Trends Cell Biol 13, 410-418 (2003).
Sherpa, T. et al. Dev Neurobiol 68, 166-181, doi:10.1002/dneu.20568 (2008).
Takahashi, K. & Yamanaka, S. Cell 126, 663-676, doi:10.1016/j.cell.2006.07.024 (2006).
Thummel, R., et al.. *Dev Neurobiol* 68, 392-408, doi:10.1002/dneu.20596 (2008).
Todd, L., et al. Sci Rep 6, 35703, doi:10.1038/srep35703 (2016).
Todd, L., et al., (2018). Stem cells 36, 392-405.
Todd, L., Fischer, A.J., (2015). Development 142, 2610-2622.
Trapnell, C. et al. Nat Biotechnol 32, 381-386, doi:10.1038/nbt.2859 (2014).
Trompeter, H.I., et al., (2011). PloS one 6, e16138.
Ueki, Y. et al. Glia 60, 1579-1589, doi:10.1002/glia.22377 (2012).
Ueki, Y., et al. J Neurochem 105, 784-796, doi:10.1111/j.1471-4159.2007.05180.x (2008).
Vazquez-Chona, F.R., et al., (2009). Investigative ophthalmology & visual science 50, 3996-4003.
Victor, M.B., et al., (2014). Neuron 84, 311-323.
Visvanathan, J., et al., (2007). Genes & development 21, 744-749.
Wan, J. & Goldman, D. Curr Opin Genet Dev 40, 41-47, doi:10.1016/j.gde.2016.05.009 (2016).

(56) References Cited

OTHER PUBLICATIONS

Wapinski, O. L. et al. Cell 155, 621-635, doi:10.1016/j.cell.2013.09.028 (2013).
Wernig, M., et al., (2008). Proceedings of the National Academy of Sciences of the United States of America 105, 5856-5861.
Wilken, M. S. & Reh, T. A. Curr Opin Genet Dev 40, 57-64, doi:10.1016/j.gde.2016.05.028 (2016).
Wilken, M. S. et al.. Epigenetics Chromatin 8, 8, doi:10.1186/1756-8935-8-8 (2015.
Wohl, S.G., et al., (2017). Nature communications 8, 1603.
Wohl, S.G., Reh, T.A., (2016a). Sci Rep 6, 35423.
Worringer, K.A., et al., (2014). Cell stem cell 14, 40-52.
Xiang, L., et al., (2017). Proceedings of the National Academy of Sciences of the United States of America 114, 6376-6381.
Xu, S., et al., (2007). The Journal of biological chemistry 282, 25053-25066.
Xue, Y., et al., (2013). Cell 152, 82-96.
Yang, P., et al., (2017). J Neurosci Res 95, 1574-1581.
Yao, K. et al. Cell Rep 17, 165-178, doi:10.1016/j.celrep.2016.08.078 (2016).
Yoo, A.S., et al., (2009). Nature 460, 642-646.
Yoo, A.S., et al., (2011). Nature 476, 228-231.
Yoshida, A., et al., (2018). Acta Med Okayama 72, 165-174.
Yu, J., Vodyanik, et al., (2007). Science 318, 1917-1920.
Zelinka, C.P., et al., (2016). Development 143, 1859-1873.
Zhang, J., et al., (2015). Developmental biology 403, 128-138.
Zhao, X. F. et al. Cell Rep 9, 272-284, doi:10.1016/j.celrep.2014.08.047.
Zhu, Q., et al., (2011). The Journal of biological chemistry 286, 31749-31760.
Bhattacharya et al. Ciliary Neurotrophic Factor-Mediated Signaling Regulates Neuronal Versus Glial Differentiation of Retinal Stem Cells/Progenitors by Concentration-Dependent Recruitment of Mitogen-Activated Protein Kinase and Janus Kinase-Signal Transducer and Activator of Transcription Pathways in Conjunction with Notch Signaling. Stem Cells, Oct. 2008, vol. 26, No. 10, pp. 2611-2624.
Brzezinski, Joseph A. et al., Ascl1 expression defines a subpopulation of lineage-restricted progenitors in the mammalian retina, Development. Aug. 15, 2011; 138(16): 3519-3531.
Fagard, Remi, et al., STAT3 inhibitors for cancer therapy, JAK-STAT 2:1, e22882; Jan./Feb./Mar. 2013.
Jorstad, Nikolas, et al., Stimulation of functional neuronal regeneration from Muller glia in adult mice. Nature, Aug. 3, 2017, vol. 548, No. 7665, pp. 103-107.
Nelson, Branden R., Acheate-scute like 1 (Ascl1) is required for normal Delta-like (Dll) gene expression and Notch signaling during retinal development, Dev Dyn. Sep. 2009 ; 238(9): 2163-2178. doi:10.1002/dvdy.21848.
Pollack, Julia, et al., ASCL1 reprograms mouse Muller glia into neurogenic retinal progenitors, Development. Jun. 15, 2013; 140(12): 2619-2631. doi: 10.1242/dev.091355: 10.1242/dev.091355.
Ueki, Yumi, et al., Transgenic expression of the proneural transcription factor Ascl1 in Müller glia stimulates retinal regeneration in young mice, PNAS, Nov. 3, 2015, vol. 112, No. 44, pp. 13717-13722. www.pnas.org/cgi/doi/10.1073/pnas.1510595112.
Wang, Dongyuan, et al., Stabilized peptide HDAC inhibitors derived from HDAC1 substrate H3K56 for the treatment of cancer stem-like cells in vivo, Cancer Res Published Online First Mar. 6, 2019. DOI: 10.1158/0008-5472.CAN-18-1421.
Wohl, Stefanie G., et al., miR-124-9-9* potentiates Ascl1-induced reprogramming of cultured Müller glia, Glia. May 2016 ; 64(5): 743-762. doi:10.1002/glia.22958.
Xia et al., let-7 microRNA regulates neurogliogenesis in the mammalian retina through Hmga2. Developmental Biology, Feb. 1, 2016, vol. 410, No. 1, pp. 70-85.
International Search Report for PCT/US2019/029725 (WO2019210320 Published Oct. 31, 2019).
Brown, N. L., Dagenais, S. L., Chen, C. M. & Glaser, T. Molecular characterization and mapping of ATOH7, a human atonal homolog with a predicted role in retinal ganglion cell development. Mamm Genome 13, 95-101, doi:10.1007/s00335-001-2101-3 (2002).
Brown, N. L., Patel, S., Brzezinski, J. & Glaser, T. Math5 is required for retinal ganglion cell and optic nerve formation. Development 128, 2497-2508 (2001).
Cafaro, J., Lee, G. S. & Stone, J. S. Atoh1 expression defines activated progenitors and differentiating hair cells during avian hair cell regeneration. Dev Dyn 236, 156-170, doi:10.1002/dvdy.21023 (2007).
Chen, P., Johnson, J. E., Zoghbi, H. Y. & Segil, N. The role of Math1 in inner ear development: Uncoupling the establishment of the sensory primordium from hair cell fate determination. Development 129, 2495-2505 (2002).
Guillemot, F. Cell fate specification in the mammalian telencephalon. Prog Neurobiol 83, 37-52, doi:10.1016/j.pneurobio.2007.02.009 (2007).
Jorstad, N. L. et al. STAT pathway activation limits the Ascl1-mediated chromatin remodeling required for neural regeneration from Muller glia in adult mouse retina. bioRxiv. Sep. 3, 2019.
Jorstad, N. L. et al. STAT Signaling Modifies Ascl1 Chromatin Binding and Limits Neural Regeneration from Muller Glia in Adult Mouse Retina. Cell Reports. vol. 30, issue 7, Feb. 18, 2020, 2195-2208.
Kay, J. N., Finger-Baier, K. C., Roeser, T., Staub, W. & Baier, H. Retinal ganglion cell genesis requires lakritz, a Zebrafish atonal Homolog. Neuron 30, 725-736 (2001).
Le Dréau, G. et al. E proteins sharpen neurogenesis by modulating proneural bHLH transcription factors' activity in an E-box-dependent manner. eLife 2018;7:e37267.
Lun, A.T.L., Rosenfeld, S., Andrews, T., Dao, T.P., Gomes, T., and Marioni, J.C.; participants in the 1st Human Cell Atlas Jamboree (2019). EmptyDrops: distinguishing cells from empty droplets in droplet-based single-cell RNA sequencing data. Genome Biol.
McCarthy, D. J., Chen, Y. & Smyth, G. K. Differential expression analysis of multifactor RNA-Seq experiments with respect to biological variation. Nucleic Acids Res 40, 4288-4297, doi:10.1093/nar/gks042 (2012).
Quinlan, A. R. & Hall, I. M. BEDTools: a flexible suite of utilities for comparing genomic features. Bioinformatics 26, 841-842, doi:10.1093/bioinformatics/btq033 (2010).
Raymond, I. D., Vila, A., Huynh, U. C. & Brecha, N. C. Cyan fluorescent protein expression in ganglion and amacrine cells in a thy1-CFP transgenic mouse retina. Mol Vis 14, 1559-1574 (2008).
Robinson, M. D., McCarthy, D. J. & Smyth, G. K. edgeR: a Bioconductor package for differential expression analysis of digital gene expression data. Bioinformatics 26, 139-140, doi:10.1093/bioinformatics/btp616 (2010).
Schlamp, C. L. et al. Evaluation of the percentage of ganglion cells in the ganglion cell layer of the rodent retina. Mol Vis 19, 1387-1396 (2013).
Stuart, T., Butler, A., Hoffman, P., Hafemeister, C., Papalexi, E., Mauck, W.M., III, Hao, Y., Stoeckius, M., Smibert, P., and Satija, R. (2018). Comprehensive Integration of Single-Cell Data. Cell 7, 1888-1902.
Wang, S. W. et al. Requirement for math5 in the development of retinal ganglion cells. Genes Dev 15, 24-29 (2001).

\* cited by examiner

GFP

ATOH1

DAPI

SEQUENCE LISTING

```
<160> NUMBER OF SEQ ID NOS: 51

<210> SEQ ID NO 1
<211> LENGTH: 2843
<212> TYPE: DNA
<213> ORGANISM: Homo sapiens

<400> SEQUENCE: 1
agcactctct cacttctggc cagggaacgt ggaaggcgca ccgacaggga tccggccagg      60
gagggcgagt gaaagaagga aatcagaaag gaagggagtt aacaaaataa taaaaacagc     120
ctgagccacg gctggagaga ccgagacccg gcgcaagaga gcgcagcctt agtaggagag     180
gaacgcgaga cgcggcagag cgcgttcagc actgactttt gctgctgctt ctgcttttt      240 tttcttaga aacaagaagg cgccagcggc agcctcacac gcgagcgcca cgcgaggctc     300
ccgaagccaa cccgcgaagg gaggagggga gggaggagga ggcggcgtgc agggaggaga    360
```

```
aaaagcattt tcactttttt tgctcccact ctaagaagtc tcccggggat tttgtatata    420
ttttttaact tccgtcaggg ctcccgcttc atatttcctt tctttcccct ctctgttcct    480
gcacccaagt tctctctgtg tcccctcgc gggccccgca cctcgcgtcc cggatcgctc     540
tgattccgcg actccttggc cgccgctgcg catggaaagc tctgccaaga tggagagcgg    600
cggcgccggc cagcagcccc agccgcagcc ccagcagccc ttcctgccgc ccgcagcctg    660
tttctttgcc acggccgcag ccgcggcggc cgcagccgcc gcagcggcag cgcagagcgc    720
gcagcagcag cagcagcagc agcagcagca gcagcaggcg ccgcagctga ccggcggc     780 cgacggccag ccctcagggg gcggtcacaa gtcagcgccc aagcaagtca gcgacagcg    840 ctcgtcttcg cccgaactga tgcgctgcaa cgccggctc aacttcagcg ctttggcta     900 cagcctgccg cagcagcagc cggccgccgt ggcgcgccgc aacgagcgcg agcgcaaccg    960
cgtcaagttg gtcaacctgg ctttgccac ccttcgggag cacgtcccca acggcgcggc    1020
caacaagaag atgagtaagg tggagacact gcgctcggcg gtcgagtaca tccgcgcgct    1080
gcagcagctg ctggacgagc atgacgcggt gagcgccgcc ttccaggcag gcgtcctgtc    1140
gcccaccatc tcccccaact actccaacga cttgaactcc atggccggct cgccggtctc    1200
atcctactcg tcggacgagg gctcttacga cccgctcagc cccgaggagc aggagcttct    1260
cgacttcacc aactggttct gaggggctcg gcctggtcag gccctggtgc gaatggactt    1320
tggaagcagg taggttgcat tttggggtgg gcagggggt attcttgcct tcgtcctccc    1380
tctgagtgtc tgtggaagtg gggatgtctc caaggagata aggggatttt tatttaaaga    1440
atttgtgaaa gttggtcgat ttcaagtcct agtttgttag tttcagcact ggcctctgaa    1500
aatggccttg cccaggtctc caaggagtga agggtagtag tgaggtgcag agatactggt    1560
gaaccgaata ctgggacatg ttaaaagaga tgtctacctg acagactctt tccccagacc    1620
tccatctccc tctaccacta gcctacacgt tcaaattaac ctctcctgtt cttttcctta    1680
tgttataggg tgatcgcaca acctgcatct ttagtgcttt cttgtcagtg gcgttgggag    1740
ggggagaaaa ggaaaagaaa aaaaaagaa gaagaagaag aaaagagaag aagaaaaaaa    1800
cgaaaacagt caaccaaccc catcgccaac taagcgaggc atgcctgaga gacatggctt    1860
tcagaaaacg ggaagcgctc agaacagtat ctttgcactc caatcattca cggagatatg    1920
aagagcaact gggacctgag tcaatgcgca aaatgcagct tgtgtgcaaa agcagtgggc    1980
tcctggcaga agggagcagc acacgcgtta tagtaactcc catcacctct aacacgcaca    2040
gctgaaagtt cttgctcggg tcccttcacc tcctcgccct tcttaaagt gcagttctta    2100 gccctctaga aacgagttgg tgtctttcgt ctcagtagcc cccaccccaa taagctgtag    2160
acattggttt acagtgaaac tatgctattc tcagcccttt gaaactctgc ttctcctcca    2220
gggcccgatt cccaaacccc atggcttccc tcacactgtc ttttctacca ttttcattat    2280
agaatgcttc caatcttttg tgaattttt attataaaaa atctatttgt atctatccta    2340
accagttcgg ggatatatta agatatttt gtacataaga gagaaagaga gagaaaaatt    2400
tatagaagtt ttgtacaaat ggtttaaaat gtgtatatct tgatacttta acatgtaatg    2460
ctattacctc tgcatatttt agatgtgtag ttcaccttac aactgcaatt ttccctatgt    2520
ggttttgtaa agaactctcc tcataggtga gatcaagagg ccaccagttg tacttcagca    2580
ccaatgtgtc ttactttata gaatgttgt taatgtatta atgatgttat taaatactgt    2640
tcaagaagaa caaagtttat gcagctactg tccaaactca aagtggcagc cagttggttt    2700
```

```
tgataggttg cctttggag atttctatta ctgcctttt ttttcttact gttttattac    2760
aaacttacaa aaatatgtat aaccctgttt tatacaaact agtttcgtaa taaaactttt    2820 tcctttttt aaaatgaaaa taa                                            2843
```

<210> SEQ ID NO 2
<211> LENGTH: 236
<212> TYPE: PRT
<213> ORGANISM: Homo sapiens

<400> SEQUENCE: 2

```
Met Glu Ser Ser Ala Lys Met Glu Ser Gly Gly Ala Gly Gln Gln Pro
1               5                   10                  15

Gln Pro Gln Pro Gln Gln Pro Phe Leu Pro Pro Ala Ala Cys Phe Phe
            20                  25                  30

Ala Thr Ala Ala Ala Ala Ala Ala Ala Ala Ala Ala Ala Ala Ala Gln
        35                  40                  45

Ser Ala Gln Gln Gln Gln Gln Gln Gln Gln Gln Gln Gln Gln Ala Pro
    50                  55                  60

Gln Leu Arg Pro Ala Ala Asp Gly Gln Pro Ser Gly Gly Gly His Lys
65                  70                  75                  80

Ser Ala Pro Lys Gln Val Lys Arg Gln Arg Ser Ser Ser Pro Glu Leu
                85                  90                  95

Met Arg Cys Lys Arg Arg Leu Asn Phe Ser Gly Phe Gly Tyr Ser Leu
            100                 105                 110

Pro Gln Gln Gln Pro Ala Ala Val Ala Arg Arg Asn Glu Arg Glu Arg
        115                 120                 125

Asn Arg Val Lys Leu Val Asn Leu Gly Phe Ala Thr Leu Arg Glu His
130                 135                 140

Val Pro Asn Gly Ala Ala Asn Lys Lys Met Ser Lys Val Glu Thr Leu
145                 150                 155                 160

Arg Ser Ala Val Glu Tyr Ile Arg Ala Leu Gln Gln Leu Leu Asp Glu
                165                 170                 175

His Asp Ala Val Ser Ala Ala Phe Gln Ala Gly Val Leu Ser Pro Thr
            180                 185                 190

Ile Ser Pro Asn Tyr Ser Asn Asp Leu Asn Ser Met Ala Gly Ser Pro
        195                 200                 205

Val Ser Ser Tyr Ser Ser Asp Glu Gly Ser Tyr Asp Pro Leu Ser Pro
    210                 215                 220

Glu Glu Gln Glu Leu Leu Asp Phe Thr Asn Trp Phe
225                 230                 235
```

<210> SEQ ID NO 3
<211> LENGTH: 1065
<212> TYPE: DNA
<213> ORGANISM: Homo sapiens

<400> SEQUENCE: 3

```
atgtcccgcc tgctgcatgc agaagagtgg gctgaagtga aggagttggg agaccaccat    60
cgccagcccc agccgcatca tctcccgcaa ccgccgccgc cgccgcagcc acctgcaact   120
ttgcaggcga gagagcatcc cgtctacccg cctgagctgt ccctcctgga cagcaccgac   180
ccacgcgcct ggctggctcc cactttgcag gcatctgca cggcacgcgc cgcccagtat    240
ttgctacatt ccccggagct gggtgcctca gaggccgctg cgccccggga cgaggtggac   300
ggccgggggg agctggtaag gaggagcagc ggcggtgcca gcagcagcaa gagccccggg   360
```

```
ccggtgaaag tgcgggaaca gctgtgcaag ctgaaaggcg gggtggtggt agacgagctg      420
ggctgcagcc gccaacgggc cccttccagc aaacaggtga atggggtgca gaagcagaga      480
cggctagcag ccaacgccag ggagcggcgc aggatgcatg gctgaaccca cgccttcgac      540
cagctgcgca atgttatccc gtcgttcaac aacgacaaga agctgtccaa atatgagacc      600
ctgcagatgg cccaaatcta catcaacgcc ttgtccgagc tgctacaaac gcccagcgga      660
ggggaacagc caccgccgcc tccagcctcc tgcaaaagcg accaccacca ccttcgcacc      720
gcggcctcct atgaagggggg cgcgggcaac gcgaccgcag ctggggctca gcaggcttcc      780
ggagggagcc agcggccgac cccgcccggg agttgccgga ctcgcttctc agccccagct      840
tctgcgggag ggtactcggt gcagctggac gctctgcact tctcgacttt cgaggacagc      900
gccctgacag cgatgatggc gcaaaagaat ttgtctcctt ctctccccgg gagcatcttg      960
cagccagtgc aggaggaaaa cagcaaaact tcgcctcggt cccacagaag cgacgggaa     1020 ttttcccccc attcccatta cagtgactcg gatgaggcaa gttag                    1065
```

<210> SEQ ID NO 4
<211> LENGTH: 354
<212> TYPE: PRT
<213> ORGANISM: Homo sapiens

<400> SEQUENCE: 4

```
Met Ser Arg Leu Leu His Ala Glu Glu Trp Ala Glu Val Lys Glu Leu
1               5                   10                  15

Gly Asp His His Arg Gln Pro Gln Pro His His Leu Pro Gln Pro Pro
            20                  25                  30

Pro Pro Pro Gln Pro Pro Ala Thr Leu Gln Ala Arg Glu His Pro Val
        35                  40                  45

Tyr Pro Pro Glu Leu Ser Leu Leu Asp Ser Thr Asp Pro Arg Ala Trp
    50                  55                  60

Leu Ala Pro Thr Leu Gln Gly Ile Cys Thr Ala Arg Ala Ala Gln Tyr
65                  70                  75                  80

Leu Leu His Ser Pro Glu Leu Gly Ala Ser Glu Ala Ala Pro Arg
                85                  90                  95

Asp Glu Val Asp Gly Arg Gly Glu Leu Val Arg Arg Ser Ser Gly Gly
            100                 105                 110

Ala Ser Ser Ser Lys Ser Pro Gly Pro Val Lys Val Arg Glu Gln Leu
        115                 120                 125

Cys Lys Leu Lys Gly Gly Val Val Asp Glu Leu Gly Cys Ser Arg
        130                 135                 140

Gln Arg Ala Pro Ser Ser Lys Gln Val Asn Gly Val Gln Lys Gln Arg
145                 150                 155                 160

Arg Leu Ala Ala Asn Ala Arg Glu Arg Arg Met His Gly Leu Asn
                165                 170                 175

His Ala Phe Asp Gln Leu Arg Asn Val Ile Pro Ser Phe Asn Asn Asp
            180                 185                 190

Lys Lys Leu Ser Lys Tyr Glu Thr Leu Gln Met Ala Gln Ile Tyr Ile
        195                 200                 205

Asn Ala Leu Ser Glu Leu Leu Gln Thr Pro Ser Gly Gly Glu Gln Pro
    210                 215                 220

Pro Pro Pro Pro Ala Ser Cys Lys Ser Asp His His Leu Arg Thr
225                 230                 235                 240

Ala Ala Ser Tyr Glu Gly Gly Ala Gly Asn Ala Thr Ala Ala Gly Ala
                245                 250                 255
```

```
Gln Gln Ala Ser Gly Gly Ser Gln Arg Pro Thr Pro Pro Gly Ser Cys
            260                 265                 270

Arg Thr Arg Phe Ser Ala Pro Ala Ser Ala Gly Gly Tyr Ser Val Gln
        275                 280                 285

Leu Asp Ala Leu His Phe Ser Thr Phe Glu Asp Ser Ala Leu Thr Ala
    290                 295                 300

Met Met Ala Gln Lys Asn Leu Ser Pro Ser Leu Pro Gly Ser Ile Leu
305                 310                 315                 320

Gln Pro Val Gln Glu Glu Asn Ser Lys Thr Ser Pro Arg Ser His Arg
                325                 330                 335

Ser Asp Gly Glu Phe Ser Pro His Ser His Tyr Ser Asp Ser Asp Glu
            340                 345                 350

Ala Ser
```

<210> SEQ ID NO 5
<211> LENGTH: 1534
<212> TYPE: DNA
<213> ORGANISM: Homo sapiens

<400> SEQUENCE: 5

| | |
|---|---:|
| ctgcactctc cgacagctac tgcgctaaaa gcgctccttc cctgagcttc gggaaagagt | 60 |
| tcatcttcct gcaaaggagt ctcaggcttt cccagaggac ttgaaaggcc ttcctcgaac | 120 |
| cagccacacc aaactctgct gcagaaggtt tccttctctt tttcaacttc atgttgagaa | 180 |
| aatgactttc tcttgagcat ctcatttttcc cctaaatttg ggcaagtgaa gagatatcag | 240 |
| cctggtcatc cagtagaaca aaggccgag tcccgcactc ccccactgta aactatttga | 300 |
| ttgcacgtga gttgctttgt ttatgactta tttgctcaga agaggcacgt tgggaagcgg | 360 |
| ctcgagagac cagcccacgc gcaggtcctg agcgggcggg cgtgcgaggt cggcgcctcg | 420 |
| ctgcttgggg ccggggatga agtcctgcaa gcccagcggc ccgccggcgg gagcgcgcgt | 480 |
| tgcacccccg tgcgcgggcg gcaccgagtg cgcgggcacg tgcgccgggg ccgggcggct | 540 |
| ggagagcgcg gcgcgcaggc gcctggcggc caacgcgcgc gagcgccgcc gcatgcaggg | 600 |
| gctcaacact gccttcgacc gcttacgcag ggtggttccc cagtggggcc aggataaaaa | 660 |
| gctgtccaag tacgagaccc tgcagatggc cctgagctac atcatggctc tgacccggat | 720 |
| cctggccgag gccgagcgat tcggctcgga gcgggactgg gtgggtctcc actgtgagca | 780 |
| cttcggccgc gaccactacc tcccgttccc gggcgcgaag ctgccggggcg agagcgagct | 840 |
| gtacagccag agactcttcg gcttccagcc cgagcccttc cagatggcca cctagggcgc | 900 |
| gcgcctccgc gggggtgggt gtccggcagc cgctccgagc ctcggccctg ccccaagtag | 960 |
| cccagaagcc tccggcggcc caggattcta aggatgcaat cctcgaggaa aattagtcga | 1020 |
| ttctcagatt acctttattc gcatcatcag acctatggac gcaatcattt aattgccttt | 1080 |
| cttttcccct cctcctttgt attttgtaga tttcattaat ggatcttgtg aatgggttga | 1140 |
| ttgctgtgaa aataatgccc cctttcccct tttctgggct actttgaggg aaaacaatct | 1200 |
| taagaaaaat aggattaagc tattctgttc cagtcctcag agaaataatc actttcttaa | 1260 |
| actttgtgag tttgtcctgt tcgggtgaag ttacagtatc cattacttgt gtttgctcac | 1320 |
| aacagagcta ccttcctgtt gtgtaaatgc gttttgctt tagtgcattg tgtgtgcaag | 1380 |
| catgaagtag aaacactttt tttttctggg tacagtacat gggtatcggt gctctgtatt | 1440 |
| tttttaaact gtgtacacat tattaaaata tacatttat aaaatataaa taaaacgtg | 1500 | gatttgtttt tcatgccaaa aaaaaaaaaa aaaa                                   1534

<210> SEQ ID NO 6
<211> LENGTH: 152
<212> TYPE: PRT
<213> ORGANISM: Homo sapiens

<400> SEQUENCE: 6

Met Lys Ser Cys Lys Pro Ser Gly Pro Pro Ala Gly Ala Arg Val Ala
1               5                   10                  15

Pro Pro Cys Ala Gly Gly Thr Glu Cys Ala Gly Thr Cys Ala Gly Ala
            20                  25                  30

Gly Arg Leu Glu Ser Ala Ala Arg Arg Leu Ala Ala Asn Ala Arg
        35                  40                  45

Glu Arg Arg Arg Met Gln Gly Leu Asn Thr Ala Phe Asp Arg Leu Arg
 50                  55                  60

Arg Val Val Pro Gln Trp Gly Gln Asp Lys Lys Leu Ser Lys Tyr Glu
65                  70                  75                  80

Thr Leu Gln Met Ala Leu Ser Tyr Ile Met Ala Leu Thr Arg Ile Leu
                85                  90                  95

Ala Glu Ala Glu Arg Phe Gly Ser Glu Arg Asp Trp Val Gly Leu His
            100                 105                 110

Cys Glu His Phe Gly Arg Asp His Tyr Leu Pro Phe Pro Gly Ala Lys
        115                 120                 125

Leu Pro Gly Glu Ser Glu Leu Tyr Ser Gln Arg Leu Phe Gly Phe Gln
 130                 135                 140

Pro Glu Pro Phe Gln Met Ala Thr
145                 150

<210> SEQ ID NO 7
<211> LENGTH: 2347
<212> TYPE: DNA
<213> ORGANISM: Homo sapiens

<400> SEQUENCE: 7
tcagtactca gacccaagtt gtgacttcct gtcaggacca agaggcagcc tgctgtggcg      60
caaaagttgg acctgggttc aagttcttct cttccacttg caggctgtga gatttaaccc     120
cagtcttggt tgttccctgt aaagtaggat ggaagtgtta tgaaatgtaa tggacacata     180
agcaatgctt ggttaccaga acaggtccca ttcatggccc acatgacaac ctgcttcccc     240
agtgggtatt tttggagaca gctcttctgt ttccaggttt tctctcctgc ctaaatgtcc     300
tgcctaagtg ccttcaagaa cccttcacca tcctgctcct gcatgtgacc aggttccatg     360
gtcagttcaa tcacctagtc acagttggta agtgacagag ttgggacttg aacctatgcc     420
tgcctgacac caagtctttt tttgacacct agagccaaga catctgaaga caaactccct     480
aggagagctg gcgtcataga aaccttaaag gttagggaga cctgggtttg aatcaggctt     540
tgtcagttat gacttgtgtg accctagcaa gttatttaac ctttctgggt ctcagtttcc     600
tcatctgcaa actgaggata ataacagtac ctaccaaaaa gaactgtcgt gaaaaccata     660
taatttctgc aatgctcctg gcacagtgtc ctgttctaaa gcatagttcc ccttctcttt     720
cttagctcca tattgattat taccctaact tgcacaaaga gacttggagg accccccatag    780 agtatcggag ggtcccccat ttcctgctct ttccactcca caccccagc aagcacaggg      840 aagttctggg ggccataatc cacccacagg aaccaaatct aagccacctt tctggctggt     900
agacatccag gtatgtgggc acagaggtag acaggctgaa atgctgctgt gctatcagtt     960

```
gggttttgct ggaacaggaa tggaaatgga gaggctgaca gaactgccct ggggagccca    1020
ggcaagaggg acagtggctg acaccccca gccagttgtg cagaccatca gaacaagatc    1080
ctagatttta ggaatacagg gttcaagtcc gtgcggcaac tcttttctaa atatgcccaa    1140
gccattaact ttgagtttta aaatactga tttacaagct gtacacaatg aaaaaatgcc    1200
tatccctcac accatgctga tgctgttccc tgccatctca gattaccaat taaatacaga    1260
atgcccagtt aaatgtgaac tttttttttt tttttttttt tgagatggag ttttgttctt    1320
gtcgcccagg ctagagtgca atggtgcgat ctcagctcac tgcaacctct gcctcccagg    1380
ttcaagcaat tctcctgcct tagcctcctg agtagctgga actacaggtg cccaccagca    1440
cgcctggcta attttttggta ttttttagtgg agatggggtt tcaccatgtt ggccaggctg    1500
gtctcgaact cctgacctca ggtgatctgc ctgcctcggc ctcccaaagt gctgggatta    1560
caggcgtgag cctaaatgtg aacttttttta atactaaaaa agtatttgct gttcatctga    1620
aattcacatt taactgggtg tcctgtattt ttatttgcta aatctgccat caaattggtc    1680
tggctcaacc tggagaatgg ccaggtggtt tcagttttac aggcatcttg gacgtggtc    1740 tccctgctcc cctgagtcct cacccagtc ctgggctccc tggcccaggc aagcccagg    1800 tattgactta cctgccaggt cggcagctcc tccttggggc tacctggtac ctgaatgtcc    1860
tggagctcta gaggttccct ccgctggagg cgtggtccgg tcagcaggtt gggattagtg    1920
tgtcataagg aacttctcac cgcccacagt ttccgttaaa tcgggctcac aggaggccct    1980
cagtggggca aaggaagacc cagagagaaa ggggagaggg gagaggcctg ggcctggctg    2040
gaggcgcatc aaagccctcc tttgtgtgct cctgctctgg agttcctgct cggccatgtg    2100
gaagcccggc tgtggggctg ggatctgggc cagtcccatt ccctcttttc tctgccctct    2160
ttctcctcaa gatcccgggg tggggttgct gagagagcac cccccccccc ccaccaccac    2220
caccagggta ataagaggtg aagggaaatc gtaaatatga ctacatctac agtggcagct    2280
ctggcaaatc caggcctatt gcccacccct ccccagcca gcaggacctg gcatggtagt    2340
tttcacc                                                              2347
```

<210> SEQ ID NO 8
<211> LENGTH: 16
<212> TYPE: PRT
<213> ORGANISM: Artificial Sequence
<220> FEATURE:
<223> OTHER INFORMATION: Synthetic peptide
<220> FEATURE:
<221> NAME/KEY: MOD_RES
<222> LOCATION: (1)..(1)
<223> OTHER INFORMATION: ACETYLATION
<220> FEATURE:
<221> NAME/KEY: SITE
<222> LOCATION: (4)..(4)
<223> OTHER INFORMATION: IsoAsp
<220> FEATURE:
<221> NAME/KEY: MISC_FEATURE
<222> LOCATION: (4)..(7)
<223> OTHER INFORMATION: cyclic peptide
<220> FEATURE:
<221> NAME/KEY: SITE
<222> LOCATION: (7)..(7)
<223> OTHER INFORMATION: Diaminopropionic acid
<220> FEATURE:
<221> NAME/KEY: SITE
<222> LOCATION: (15)..(15)
<223> OTHER INFORMATION: Hx

<400> SEQUENCE: 8

Arg Arg Arg Asp Val Ala Xaa Arg Glu Ile Arg Arg Tyr Gln Xaa Ala
1               5                   10                  15

<210> SEQ ID NO 9
<211> LENGTH: 16
<212> TYPE: PRT
<213> ORGANISM: Artificial Sequence
<220> FEATURE:
<223> OTHER INFORMATION: Synthetic peptide
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (15)..(15)
<223> OTHER INFORMATION: Hx

<400> SEQUENCE: 9

Arg Arg Arg Thr Val Ala Leu Arg Glu Ile Arg Arg Tyr Gln Xaa Ala
1               5                   10                  15

<210> SEQ ID NO 10
<211> LENGTH: 16
<212> TYPE: PRT
<213> ORGANISM: Artificial Sequence
<220> FEATURE:
<223> OTHER INFORMATION: Synthetic peptide
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (4)..(4)
<223> OTHER INFORMATION: IsoAsp
<220> FEATURE:
<221> NAME/KEY: MISC_FEATURE
<222> LOCATION: (4)..(7)
<223> OTHER INFORMATION: Cyclic peptide
<220> FEATURE:
<221> NAME/KEY: MISC_FEATURE
<222> LOCATION: (7)..(7)
<223> OTHER INFORMATION: Diaminopropionic acid

<400> SEQUENCE: 10

Arg Arg Arg Asp Val Ala Xaa Arg Glu Ile Arg Arg Tyr Gln Lys Ala
1               5                   10                  15

<210> SEQ ID NO 11
<211> LENGTH: 211
<212> TYPE: PRT
<213> ORGANISM: Homo sapiens

<400> SEQUENCE: 11

Met Val Ala His Asn Gln Val Ala Ala Asp Asn Ala Val Ser Thr Ala
1               5                   10                  15

Ala Glu Pro Arg Arg Pro Glu Pro Ser Ser Ser Ser Ser Ser
                20                  25                  30

Pro Ala Ala Pro Ala Arg Pro Arg Pro Cys Pro Ala Val Pro Ala Pro
                35                  40                  45

Ala Pro Gly Asp Thr His Phe Arg Thr Phe Arg Ser His Ala Asp Tyr
            50                  55                  60

Arg Arg Ile Thr Arg Ala Ser Ala Leu Leu Asp Ala Cys Gly Phe Tyr
65                  70                  75                  80

Trp Gly Pro Leu Ser Val His Gly Ala His Glu Arg Leu Arg Ala Glu
                85                  90                  95

| | | | | | | | | | | | |
|---|---|---|---|---|---|---|---|---|---|---|---|
|Pro|Val|Gly|Thr|Phe|Leu|Val|Arg|Asp|Ser|Arg|Gln|Arg|Asn|Cys|Phe|
| | | |100| | | |105| | | |110|
|Phe|Ala|Leu|Ser|Val|Lys|Met|Ala|Ser|Gly|Pro|Thr|Ser|Ile|Arg|Val|
| | | |115| | | |120| | | |125|
|His|Phe|Gln|Ala|Gly|Arg|Phe|His|Leu|Asp|Gly|Ser|Arg|Glu|Ser|Phe|
| | |130| | | |135| | | |140|
|Asp|Cys|Leu|Phe|Glu|Leu|Leu|Glu|His|Tyr|Val|Ala|Ala|Pro|Arg|Arg|
|145| | | |150| | | |155| | | |160|
|Met|Leu|Gly|Ala|Pro|Leu|Arg|Gln|Arg|Arg|Val|Arg|Pro|Leu|Gln|Glu|
| | | | |165| | | |170| | | |175|
|Leu|Cys|Arg|Gln|Arg|Ile|Val|Ala|Thr|Val|Gly|Arg|Glu|Asn|Leu|Ala|
| | | |180| | | |185| | | |190|
|Arg|Ile|Pro|Leu|Asn|Pro|Val|Leu|Arg|Asp|Tyr|Leu|Ser|Ser|Phe|Pro|
| | |195| | | |200| | | |205|
|Phe|Gln|Ile|
| | |210|

```
<210> SEQ ID NO 12
<211> LENGTH: 1216
<212> TYPE: DNA
<213> ORGANISM: Homo sapiens

<400> SEQUENCE: 12
ggcagctgca cggctcctgg ccccggagca tgcgcgagag ccgccccgga gcgccccgga      60
gccccccgcc gtcccgcccg cggcgtcccg cgcccgccg ccagcgcacc cccggacgct     120
atggcccacc cctccggctg gccccttctg taggatggta gcacacaacc aggtggcagc    180
cgacaatgca gtctccacag cagcagagcc ccgacggcgg ccagaacctt cctcctcttc    240
ctcctcctcg cccgcggccc ccgcgcgccc cggccgtgc cccgcggtcc cggccccggc     300
ccccggcgac acgcacttcc gcacattccg ttcgcacgcc gattaccggc gcatcacgcg    360
cgccagcgcg ctcctggacg cctgcggatt ctactggggg cccctgagcg tgcacggggc    420
gcacgagcgg ctgcgcgccg agcccgtggg caccttcctg gtgcgcgaca ccgccagcg    480
gaactgcttt ttcgcccctta gcgtgaagat ggcctcggga cccacgagca tccgcgtgca    540
cttt caggcc ggccgctttc acctggatgg cagccgcgag agcttcgact gcctcttcga    600
gctgctggag cactacgtgg cggcgccgcg ccgcatgctg ggggcccgc tgcgccagcg     660
ccgcgtgcgg ccgctgcagg agctgtgccg ccagcgcatc gtggccaccg tgggccgcga    720
gaacctggct cgcatccccc tcaaccccgt cctccgcgac tacctgagct ccttcccctt    780
ccagatttga ccggcagcgc ccgccgtgca cgcagcatta actgggatgc cgtgttattt     840
tgttattact tgcctggaac catgtgggta ccctccccgg cctgggttgg agggagcgga    900
tgggtgtagg ggcgaggcgc ctcccgccct cggctggaga cgaggccgca gaccccttct    960
cacctcttga gggggtcctc cccctcctgg tgctccctct gggtcccct ggttgttgta    1020
gcagcttaac tgtatctgga gccaggacct gaactcgcac ctcctacctc ttcatgttta   1080
catataccca gtatctttgc acaaaccagg ggttggggga gggtctctgg ctttattttt   1140
ctgctgtgca gaatcctatt ttatattttt taaagtcagt ttaggtaata aactttatta   1200
tgaaagtttt ttttttt                                                  1216

<210> SEQ ID NO 13
<211> LENGTH: 198
<212> TYPE: PRT
<213> ORGANISM: Homo sapiens
```

<400> SEQUENCE: 13

```
Met Thr Leu Arg Cys Leu Glu Pro Ser Gly Asn Gly Gly Glu Gly Thr
1               5                   10                  15

Arg Ser Gln Trp Gly Thr Ala Gly Ser Ala Glu Glu Pro Ser Pro Gln
            20                  25                  30

Ala Ala Arg Leu Ala Lys Ala Leu Arg Glu Leu Gly Gln Thr Gly Trp
        35                  40                  45

Tyr Trp Gly Ser Met Thr Val Asn Glu Ala Lys Glu Lys Leu Lys Glu
50                  55                  60

Ala Pro Glu Gly Thr Phe Leu Ile Arg Asp Ser Ser His Ser Asp Tyr
65                  70                  75                  80

Leu Leu Thr Ile Ser Val Lys Thr Ser Ala Gly Pro Thr Asn Leu Arg
                85                  90                  95

Ile Glu Tyr Gln Asp Gly Lys Phe Arg Leu Asp Ser Ile Ile Cys Val
            100                 105                 110

Lys Ser Lys Leu Lys Gln Phe Asp Ser Val Val His Leu Ile Asp Tyr
        115                 120                 125

Tyr Val Gln Met Cys Lys Asp Lys Arg Thr Gly Pro Glu Ala Pro Arg
130                 135                 140

Asn Gly Thr Val His Leu Tyr Leu Thr Lys Pro Leu Tyr Thr Ser Ala
145                 150                 155                 160

Pro Ser Leu Gln His Leu Cys Arg Leu Thr Ile Asn Lys Cys Thr Gly
                165                 170                 175

Ala Ile Trp Gly Leu Pro Leu Pro Thr Arg Leu Lys Asp Tyr Leu Glu
            180                 185                 190

Glu Tyr Lys Phe Gln Val
        195
```

<210> SEQ ID NO 14
<211> LENGTH: 2759
<212> TYPE: DNA
<213> ORGANISM: Homo sapiens

<400> SEQUENCE: 14

| | | |
|---|---|---|
| agccgcggcc tcaactaaaa gtggccattg acctttcaag ctttcgagca gtgatgcaat | 60 |
| agaatagtat ttcaaagaaa aatgcttatc gaaattttgg atccggtttt cccgtgattg | 120 |
| ttaagggttt cttttaaaaa gtaggtcaca tttcaagtag gtcatatttc ggggcgggt | 180 |
| gcgcagacaa ggagatgagt ttccactaag gccaggggc ctccaacggg gttggaggtg | 240 |
| agaatcccag gtagggtaga ggtgccgaga tccttccgaa tcccagccct ggggcgtcag | 300 |
| ccctgcaggg aatggcagag acactctccg gactgaggga accgaggcca gtcaccaagc | 360 |
| cccttccggg cgcgcaggcg atcagtgggt gaccgcggct gcgagggact ttgtcatccg | 420 |
| tcctccagga tctggggaga aagagcccca tcccttctct ctctgccacc atttcggaca | 480 |
| ccccgcaggg actcgttttg ggattcgcac tgacttcaag gaaggacgcg aacccttctc | 540 |
| tgaccccagc tcgggcggcc acctgtcttt gccgcggtga cccttctctc atgaccctgc | 600 |
| ggtgccttga gccctccggg aatgcgggg aagggacgcg gagccagtgg gggaccgcgg | 660 |
| ggtcggcgga ggagccatcc ccgcaggcgg cgcgtctggc gaaggccctg cgggagctcg | 720 |
| gtcagacagg atggtactgg ggaagtatga ctgttaatga agccaaagag aaattaaaag | 780 |
| aggcaccaga aggaactttc ttgattagag atagctcgca ttcagactac ctactaacaa | 840 |
| tatctgttaa aacatcagct ggaccaacta atcttcgaat cgaataccaa gacggaaaat | 900 |

```
tcagattgga ctctatcata tgtgtcaaat ccaagcttaa acaatttgac agtgtggttc    960
atctgatcga ctactatgtt cagatgtgca aggataagcg gacaggtcca gaagccccca   1020
ggaacggcac tgttcacctt tatctgacca aaccgctcta cacgtcagca ccatctctgc   1080
agcatctctg taggctcacc attaacaaat gtaccggtgc catctgggga ctgcctttac   1140
caacaagact aaaagattac ttggaagaat ataaattcca ggtataaatg tttctctttt   1200
tttaaacatg tctcacatag agtatctccg aatgcagcta tgtaaaagag aaccaaaact   1260
tgagtgctct ggataactat atggaatgct ttctaagaac agctgaagct aatctaattt   1320
aaatttaaca gcttgaagag gtagctaggt gtttaaagtt cctccagata cttttacctg   1380
agtgatgctt cccttcctaa ggctgaccaa gacctgttga tccttttaga ttaaaaataa   1440
aatgtcgcat gtaaaggctg aagtcgcgtt ttatcagaat gccttgcctt cttaggttct   1500
tttccattat gtcaaaggtc caggctccag taggagagaa agaactcctc ataggaatac   1560
tgaagaagtg ggaaggaacc aagctgacac aggcctcact gcaatttgat atgcctgctg   1620
atcagagtct cttgggcatt ttatattttg cattctgatg tacctaggag ttttgttaaa   1680
cagatgatgt atgtgagtat ttatcccatt ttatgcaatt aaccaaatca accaaaaaaa   1740
gtgaccatga agtcctgtat ttgtcttttt actacatgta ggaactctca tgtgaatgag   1800
tactgtagta atccattcta tgggagcctt atttcagaaa tatttcaaac tggtgcaaat   1860
ggaaaagact ttctcttttc ctttaaagct aaagacaaga atatcatgct atacaggtgc   1920
aactcaatcc ccgttaataa aaaccaatgt aggtataggc attctaccct ttgaaatagc   1980
tgtgtcccaa cctgttgcca ttgatttttt ggaaatggct ttagaaatat ccaagttgtc   2040
cttgaattgt ctaaccatgg acataaacag ttgtctccct tctactgtgt agaatacttt   2100
gacttaattt tcttccagat acaggggggat acctgcctgt ttttcaaagt gtttatttac   2160
tgctgttact atttgattag aatgtattaa ataaaaaaaa cctgatttct acaagttgca   2220
cttattgagt tctagagaac gtacactttc atggtaatag aggattgcca taaaaactta   2280
cgtcaagtga aataagccaa ttattcaaca aaagtagaa cattacttgc cattctgtaa   2340
agttatgggc tgtacctgcc cccttttgcaa tttggaaagc atggtttaga aactacaggc   2400
attgtcaagt ggccgggtct tttataattt gaataggcat aacactgatg tcctctgtgt   2460
ttccaaaaac atggtttaga aactacaaac attatgacat ggccagtctt ttacaagttg   2520
agtaggcata atactaaaga aaaatacaaa gttttgtggc cacttatttt ttgctatgtt   2580
agtctgcata actgttataa atgtaccatc ttttctagag tccagacatt atttatttta   2640
tggctttaaa atttttcctgc atagctacaa tcctgtggtg tgtcaccata aaggtggacc   2700
ctgtgtgaat gagaaaattc agttataaat tgtaataaaa cctgcttact ggaaaaaaa    2759
```

<210> SEQ ID NO 15
<211> LENGTH: 225
<212> TYPE: PRT
<213> ORGANISM: Homo sapiens

<400> SEQUENCE: 15

Met Val Thr His Ser Lys Phe Pro Ala Ala Gly Met Ser Arg Pro Leu
1               5                   10                  15

Asp Thr Ser Leu Arg Leu Lys Thr Phe Ser Ser Lys Ser Glu Tyr Gln
            20                  25                  30

Leu Val Val Asn Ala Val Arg Lys Leu Gln Glu Ser Gly Phe Tyr Trp
        35                  40                  45

```
Ser Ala Val Thr Gly Gly Glu Ala Asn Leu Leu Ser Ala Glu Pro
     50                  55                  60

Ala Gly Thr Phe Leu Ile Arg Asp Ser Ser Asp Gln Arg His Phe
 65                  70                  75                  80

Thr Leu Ser Val Lys Thr Gln Ser Gly Thr Lys Asn Leu Arg Ile Gln
                 85                  90                  95

Cys Glu Gly Gly Ser Phe Ser Leu Gln Ser Asp Pro Arg Ser Thr Gln
                100                 105                 110

Pro Val Pro Arg Phe Asp Cys Val Leu Lys Leu Val His His Tyr Met
            115                 120                 125

Pro Pro Pro Gly Ala Pro Ser Phe Pro Ser Pro Thr Glu Pro Ser
    130                 135                 140

Ser Glu Val Pro Glu Gln Pro Ser Ala Gln Pro Leu Pro Gly Ser Pro
145                 150                 155                 160

Pro Arg Arg Ala Tyr Tyr Ile Tyr Ser Gly Gly Glu Lys Ile Pro Leu
                165                 170                 175

Val Leu Ser Arg Pro Leu Ser Ser Asn Val Ala Thr Leu Gln His Leu
            180                 185                 190

Cys Arg Lys Thr Val Asn Gly His Leu Asp Ser Tyr Glu Lys Val Thr
            195                 200                 205

Gln Leu Pro Gly Pro Ile Arg Glu Phe Leu Asp Gln Tyr Asp Ala Pro
    210                 215                 220

Leu
225
```

<210> SEQ ID NO 16
<211> LENGTH: 2737
<212> TYPE: DNA
<213> ORGANISM: Homo sapiens
<400> SEQUENCE: 16

```
gcggctccga cttggactcc ctgctccgct gctgccgctt cggccccgca cgcagccagc    60
cgccagccgc ccgcccggcc cagctcccgc cgcggcccct tgccgcggtc cctctcctgg   120 tccccctcccg gttggtccgg gggtgcgcag ggggcagggc gggcgcccag gggaagctcg   180
agggacgcgc gcgcgaaggc tcctttgtgg acttcacggc cgccaacatc tgggcgcagc   240
gcgggccacc gctggccgtc tcgccgccgc gtcgccttgg ggacccgagg gggctcagcc   300
ccaaggacgg agacttcgat tcgggaccag ccccccggga tgcggtagcg gccgctgtgc   360
ggaggccgcg aagcagctgc agccgccgcc gcgcagatcc acgctggctc cgtgcgccat   420
ggtcacccac agcaagtttc ccgccgccgg gatgagccgc ccctggaca ccagcctgcg   480 cctcaagacc ttcagctcca agagcgagta ccagctggtg gtgaacgcag tgcgcaagct   540
gcaggagagc ggcttctact ggagcgcagt gaccggcggc gaggcgaacc tgctgctcag   600
tgccgagccc gccggcacct ttctgatccg cgacagctcg gaccagcgcc acttcttcac   660
gctcagcgtc aagacccagt ctgggaccaa gaacctgcgc atccagtgtg agggggggcag   720 cttctctctg cagagcgatc cccggagcac gcagcccgtg cccgcttcg actgcgtgct   780 caagctggtg caccactaca tgccgccccc tggagccccc tccttcccct cgccacctac   840
tgaaccctcc tccgaggtgc ccgagcagcc gtctgcccag ccactccctg ggagtccccc   900
cagaagagcc tattacatct actccggggg cgagaagatc cccctggtgt tgagccggcc   960
cctctcctcc aacgtggcca ctcttcagca tctctgtcgg aagaccgtca acggccacct  1020
```

-continued

```
ggactcctat gagaaagtca cccagctgcc ggggcccatt cgggagttcc tggaccagta    1080
cgatgccccg ctttaagggg taaagggcgc aaagggcatg ggtcgggaga ggggacgcag    1140
gcccctctcc tccgtggcac atggcacaag cacaagaagc caaccaggag agagtcctgt    1200
agctctgggg ggaaagaggg cggacaggcc cctccctctg ccctctccct gcagaatgtg    1260
gcaggcggac ctggaatgtg ttggagggaa ggggagtac cacctgagtc tccagcttct     1320
ccggaggagc cagctgtcct ggtgggacga tagcaaccac aagtggattc tccttcaatt    1380
cctcagcttc ccctctgcct ccaaacaggg gacacttcgg gaatgctgaa ctaatgagaa    1440
ctgccaggga atcttcaaac tttccaacgg aacttgtttg ctctttgatt tggtttaaac    1500
ctgagctggt tgtggagcct gggaaaggtg aagagagag aggtcctgag ggccccaggg     1560
ctgcgggctg gcgaaggaaa tggtcacacc cccgcccac cccaggcgag atcctggtg      1620
acatgctcct ctccctggct ccggggagaa gggcttgggg tgacctgaag ggaaccatcc    1680
tggtacccca catcctctcc tccgggacag tcaccgaaaa cacaggttcc aaagtctacc    1740
tggtgcctga gagcccaggg cccttcctcc gttttaaggg ggaagcaaca tttggagggg    1800
atggatgggc tggtcagctg gtctcctttt cctactcata ctataccttc ctgtacctgg    1860
gtggatggag cgggaggatg gaggagacgg gacatctttc acctcaggct cctggtagag    1920
aagacagggg attctactct gtgcctcctg actatgtctg gctaagagat cgccttaaa     1980
tgctccctgt cccatggaga gggacccagc ataggaaagc cacatactca gcctggatgg    2040
gtggagaggc tgagggactc actggagggc accaagccag cccacagcca gggaagtggg    2100
gaggggggc ggaaacccat gcctcccagc tgagcactgg gaatgtcagc ccagtaagta     2160
ttggccagtc aggcgcctcg tggtcagagc agagccacca ggtcccactg ccccgagccc    2220
tgcacagccc tccctcctgc ctgggtgggg gaggctggag gtcattggag aggctggact    2280
gctgccaccc cgggtgctcc cgctctgcca tagcactgat cagtgacaat ttacaggaat    2340
gtagcagcga tggaattacc tggaacagtt ttttgttttt gttttgttt ttgttttgt      2400
gggggggggc aactaaacaa acacaaagta ttctgtgtca ggtattgggc tggacagggc    2460
agttgtgtgt tggggtggtt ttttttctcta tttttttgtt tgtttcttgt tttttaataa   2520
tgtttacaat ctgcctcaat cactctgtct tttataaaga ttccacctcc agtcctctct    2580
cctcccccct actcaggccc ttgaggctat taggagatgc ttgaagaact caacaaaatc    2640
ccaatccaag tcaaactttg cacatatttta tatttatatt cagaaaagaa acatttcagt   2700
aatttataat aaagagcact attttttaat gaaaaac                             2737
```

<210> SEQ ID NO 17
<211> LENGTH: 440
<212> TYPE: PRT
<213> ORGANISM: Homo sapiens

<400> SEQUENCE: 17

Met Ala Glu Asn Asn Glu Asn Ile Ser Lys Asn Val Asp Val Arg Pro
1               5                   10                  15

Lys Thr Ser Arg Ser Arg Ser Ala Asp Arg Lys Asp Gly Tyr Val Trp
            20                  25                  30

Ser Gly Lys Lys Leu Ser Trp Ser Lys Lys Ser Glu Ser Tyr Ser Asp
        35                  40                  45

Ala Glu Thr Val Asn Gly Ile Glu Lys Thr Glu Val Ser Leu Arg Asn
    50                  55                  60

Gln Glu Arg Lys His Ser Cys Ser Ser Ile Glu Leu Asp Leu Asp His

```
                65                  70                  75                  80
        Ser Cys Gly His Arg Phe Leu Gly Arg Ser Leu Lys Gln Lys Leu Gln
                            85                  90                  95

Asp Ala Val Gly Gln Cys Phe Pro Ile Lys Asn Cys Ser Ser Arg His
                        100                 105                 110

Ser Ser Gly Leu Pro Ser Lys Arg Lys Ile His Ile Ser Glu Leu Met
                    115                 120                 125

Leu Asp Lys Cys Pro Phe Pro Pro Arg Ser Asp Leu Ala Phe Arg Trp
                130                 135                 140

His Phe Ile Lys Arg His Thr Ala Pro Ile Asn Ser Lys Ser Asp Glu
        145                 150                 155                 160

Trp Val Ser Thr Asp Leu Ser Gln Thr Glu Leu Arg Asp Gly Gln Leu
                        165                 170                 175

Lys Arg Arg Asn Met Glu Glu Asn Ile Asn Cys Phe Ser His Thr Asn
                    180                 185                 190

Val Gln Pro Cys Val Ile Thr Thr Asp Asn Ala Leu Cys Arg Glu Gly
                195                 200                 205

Pro Met Thr Gly Ser Val Met Asn Leu Val Ser Asn Ser Ile Glu
            210                 215                 220

Asp Ser Asp Met Asp Ser Asp Glu Ile Leu Thr Leu Cys Thr Ser
        225                 230                 235                 240

Ser Arg Lys Arg Asn Lys Pro Lys Trp Asp Leu Asp Asp Glu Ile Leu
                        245                 250                 255

Gln Leu Glu Thr Pro Pro Lys Tyr His Thr Gln Ile Asp Tyr Val His
                    260                 265                 270

Cys Leu Val Pro Asp Leu Leu Gln Ile Asn Asn Asn Pro Cys Tyr Trp
                275                 280                 285

Gly Val Met Asp Lys Tyr Ala Ala Glu Ala Leu Leu Glu Gly Lys Pro
            290                 295                 300

Glu Gly Thr Phe Leu Leu Arg Asp Ser Ala Gln Glu Asp Tyr Leu Phe
        305                 310                 315                 320

Ser Val Ser Phe Arg Arg Tyr Ser Arg Ser Leu His Ala Arg Ile Glu
                        325                 330                 335

Gln Trp Asn His Asn Phe Ser Phe Asp Ala His Asp Pro Cys Val Phe
                    340                 345                 350

His Ser Pro Asp Ile Thr Gly Leu Leu Glu His Tyr Lys Asp Pro Ser
                355                 360                 365

Ala Cys Met Phe Phe Glu Pro Leu Leu Ser Thr Pro Leu Ile Arg Thr
            370                 375                 380

Phe Pro Phe Ser Leu Gln His Ile Cys Arg Thr Val Ile Cys Asn Cys
        385                 390                 395                 400

Thr Thr Tyr Asp Gly Ile Asp Ala Leu Pro Ile Pro Ser Ser Met Lys
                        405                 410                 415

Leu Tyr Leu Lys Glu Tyr His Tyr Lys Ser Lys Val Arg Val Leu Arg
                    420                 425                 430

Ile Asp Ala Pro Glu Gln Gln Cys
                435                 440

<210> SEQ ID NO 18
<211> LENGTH: 6903
<212> TYPE: DNA
<213> ORGANISM: Homo sapiens

<400> SEQUENCE: 18
```

```
acggaagtgg tggcggcgcc cagggaaccg gcggaggcga tgaccgtgac ggctgggttg        60
ggaccggaac gccgaagcgg ggttgggggt ggcagaaaag catctgcttt gtaagaccta       120
cacgaggtgc aggagtggtt gggcctcccc tctccactta agcaagcgcc cagactgatg       180
gcgatggtga tggcagcagt tactcgcaca accccagtta agctgcgctc cgggaggagt       240
tcatctgttg tctgctctcc agtgacttcc gtttgtggag cctaagtgtt tctacagaat       300
ccaactcaaa tatcaaggac tatgatcaga atgctttcaa ggagttttg  ggcacatgat       360
ggcagataca tccagaaagt gcccagaaga aacttcctgc tggaaaaaat gaaaaagcag       420
tatttataac attagaatct ggataatttg ttaacatggc agaaaataat gaaaatatta       480
gtaaaaatgt agatgtaagg cccaaaacta gtcggagcag aagtgccgac agaaaagacg       540
gttatgtgtg gagtggaaag aagttatctt ggtcaaaaaa gagtgagagt tattcagatg       600
ctgagacagt gaatggtata gagaaaaccg aagtgtcttt aaggaaccaa gaaaggaagc       660
acagctgttc atccattgag ttggacttag atcattcctg tgggcatcga ttttttaggcc      720
gatctcttaa acagaaactg caagatgccg tggggcagtg ttttccaata aagaattgta       780
gtagtcggca ctcttcaggg cttccgtcta aaaggaaaat tcatatcagt gaactcatgt       840
tagataagtg tcctttccca cctcgatcag atttagcctt taggtggcat tttattaaac       900
gacacactgc tcctataaat tccaaatcag atgaatgggt aagcacagac ttgtctcaga       960
ctgaattgag ggatggtcag ctaaaacgaa gaaatatgga agaaaatata aactgtttct      1020
cacataccaa tgttcagccc tgtgtcataa ccaccgacaa tgctttgtgt agagaaggtc      1080
ctatgactgg ctctgtgatg aacctggttt caaataacag tatagaagat agtgatatgg      1140
attccgatga tgaaattcta acactttgca caagttccag aaaaagaaac aaacccaaat      1200
gggatttgga tgatgaaatc ctgcagttgg aaacacctcc taaataccac acgcagattg      1260
attatgtcca ctgtcttgta ccagacctcc ttcagatcaa taacaaccca tgttactggg      1320
gagtgatgga taaatacgca gccgaagcac tactggaagg aaaaccagag ggtaccttt       1380
tacttcgaga ctcagcacag gaagactatt tattctctgt tagttttaga cgctatagtc      1440
gttctcttca tgctagaatt gaacagtgga atcacaactt tagctttgat gcacatgacc      1500
cctgtgtctt ccattctcct gacattactg ggctcctaga acattataag gacccaagcg      1560
cctgtatgtt ctttgaacca cttctatcca ctcccttaat tcggactttc ccttttttccc     1620
tgcagcatat atgcagaaca gttatttgta actgtacaac ttatgatggc atcgatgccc      1680
ttccaattcc ttcttctatg aaattatatc tgaaggaata tcattataaa tcaaaagtta      1740
gagtactcag gattgatgca ccagaacagc aatgctagta acaggatggg aacatgggaa      1800
tgataatata tattttttct tttaatattt tattttctt  tttatgccac tttggatttt      1860
tctacaaagg cagtggtgtc caaaataaaa tctctgccct aaattttact aataaatcca      1920
tttttctagt gatacacaaa ttgtttaagg ttatacactc gagcttaaat agatatttt       1980
aaccaggtgt ttggtttttg ttttaccgt  gtaggttgta tacttacatt ttttctttcc      2040
ttaatttata catgatcctt tttccttaat ttatacatga tccaggcaca tttgaaattt      2100
ggtaggcatt gcaaacacat ttgaatattg tgtatttcat actattcttt aaagtaatc       2160
ttatgtcctt tcctacatgt aaaatatttt gttaatctat gccattagta gtattatata      2220
taaaatatag ttccccgtcc ccctttttcat tgagtttgat attcttcagt aaagctgaat     2280
gttgtaattc accattcata ctaatgttat tgacttttgt aacttactaa tagggatgtt      2340
aaaagtaaca aaaccaagtc aaacttggtg tatttttatt ttaaatatta actctaaagc      2400
```

```
aggattacta aatttgatta atctggtcaa tgagaatcaa atggaaacat atcattctgg    2460
aggtgcactt actcttctac aatgtggccg gatcatttgt cattcctgaa taggtctttc    2520
tctcaacctg caagagctaa accatcttca aaacataaat cttgttcctt tctcattgga    2580
agctttgaaa ataatgataa cactattagt agctagtagt tactaaagtg ctaaagtaat    2640
tgtggggttt ttctgtatta gcttatgaac tgttgcttct acttagccct tttatagaaa    2700
ctctgagctg ttactttggg gaaattccac aatgtattag cagccacaaa tttccactgg    2760
taaccaaaga gtacctaagt agttttttcat tattttaagt tgaatttgaa taaagattcc    2820
agaaataaac atggagctca gtattcagga agcttaatac tgtttttgat ctacaagatc    2880
caaataatta tccctatctt cagaattaac ttagtctgta atgtggcttc aaaaaaagaa    2940
agccttttga cagctacatg acttacacca tacagaacag tactgacaa aaggggtgat     3000 attttaaatt tactatccca gaaacagggc aacgttttta gaaacatctt tagcccaaag    3060
taactagtaa aaataaatgg agtggtatcc tatcttcttt ttttaaggaa tcaatgaata    3120
ataaatgtag atagacaatt ttcttctggt gagctgtcta acccttttgta cacattgaca   3180 ttttaatat cgtaactgat ttcttgatgc tagtttagct atattaggaa actgcttcta    3240
cctagattga aagaaatttg actcataaac ttccaagtta gaacaaatat ttcttcatta    3300
ttgttgcttt tatgtgagta gcatttccct atcttgcagt tctgttaaca tgaaaatggc    3360 attttttccat aatagcttta aaataatttt ttagtaatta ttacaaaatt aaggaaaatc   3420
tctattaccg ttatctttta gcattttttt tttcctcagt gatctcaaga ttgtcttagt    3480
ctcaatgaga tgtagctaca aaaatggcac ctcttagcag tgatgaggct caggatatcg    3540
gatatcataa caccaatgtc aggataaata tctcttctaa agacgatatt tacctttac    3600 aaggttagaa aagtctcata ctacctcatc tttattgtgg cgcttttgta gatcactgag    3660
aagcttatct tattaaccaa tataccactt cctaaatatc catctttggt gaaagaaaat    3720
agtgtggtaa gagtacccat gattatagtt ttttatcaga atttgataag atttttctgtt    3780 tctgtgaaac aattattta aatatttttc ttttaaaaat aacttttttat cagtacagaa    3840 aaacctaagg gatgactagc ttacaaatat tctgttaagg ggtagtttta taagaaaaa    3900 tgatatatag ttatgttgtc tttatagtg ttaaaattag tatttatatg aaagtcaaga    3960
tctaagtacc ttttcatata attcaaactg attgcttgtg atatgttttc tctggctttt    4020 ttatttttttc aacttcaagg tattaacagc tgttaacact taaaaagtac tgccacatat    4080
gtagccttga agtagttgat ctaataaatg agagcaggga ggagattcat tgactctgaa    4140
atgattttta tttttcctttt ggtatttgct acagtgaaaa aagtttgga aagtagatac    4200 ataaagactt gagaagggaa ttgtttaagg gaaaagaaaa gagtaataat ttttttttaaa   4260 acattaagga attggaattc agaaaggtta ccccttcct ctgtgtcttt gtaaggatac     4320
atttggaaga acatacagta ttcagaaact aacctatata aaatgtaaac aatatattga    4380
ttgcactata taaatgagta aattttgaga ggaacaatgt gggaatgtat aaatttgtct    4440
aaaattttat aactgttgaa caagggaag atttgaacag tgtaaattcc agagttgaga     4500
aagcatttag catggtggaa atgtggagag cttattggtg agagaggatg gagctaagag    4560
aaataagatc aaatattaaa attaggaatt taggcattac ctcagggaaa agccttgaca    4620
gtgaaaagaa actacttaat cgctaatagc tagtctggac cagacactta actgcgcttt    4680
gggaatcatc ctgggctaat caggaaataa acttgacttt tctatttttc tctgaagctt    4740
```

```
tacaggacat actcccactc ccattttttt ctaagcctac agcatcttga ttcatagtat    4800
aattcctgaa gtatgctgaa tggactttt  aaggttcctt tagcattttt gtatagagtt    4860
atatgtgatc tttctataac catgccattc acttaaataa ttcatgaagg gaatggttta    4920
atttaaagga agacctaata ggaagaagat taaaggaagc ttttagtcag cctgtggcta    4980
gatttattga tttggtgatc aaacctgtgc tatttcctga atttcagcta atggccaact    5040
gtggtcaaag aatggctttc agttaaagtt ttgacttctt attataaata atataaagaa    5100
tgtctcagta attagaaatc ccttaataag tagaacaaat gtggcaagta ggactcctat    5160
cggtatacaa attccatttc tttttataag aaaaacacat aaaccattat catttattca    5220
tgagccaaag ccattaagaa gataaatcca gttatcagct tcctgtctct gaagtttgga    5280
tcattttata gatccacgca atagagagct tccttcctat gaaacaaaaa ccttgagatc    5340
tcttttttt  tgagacagag tctcgctgtt gtcagcccag gctggagtgc aatggcgcaa    5400
tctcggttca ctgcaacctc tgccttccag gttccagcaa ttctcctacc tcagctccca    5460
agtagctgag atgacaggcg tgtgccacca cgcccagcta ttttttgtat ttttagtagc    5520
gatggtgttt cactacattg gccaggctgg tctcgaactc ctgacctcag gtgaccaccc    5580
gcctcagcct cccaaagtgc tgggattaca ggcatgagcc actgtgcccg gccaagatct    5640
aactcacgct tactttcat  taaaatattt cttgtcgctt ttagctattg tcagaatcca    5700
ataaacagct tacgcattca ttttggtaaa gcaaatttca caggaaaata gacaaaatta    5760
taagagattc ctggagacaa cacaaggaaa acaatgttta aaagcaaaat agcctgtgta    5820
atgttaggta atgtaatgcc caagtgaata aaagattttt cgtcaagcaa actactgttt    5880
ctactttggg ggaaaaaagt cagttttaca tttgtaattt aaggaaagaa cagaaagcac    5940
aaaggttttt cttttctta  ttaatggcct actagaaatg agcagtgcaa gagtctacct    6000
gtactattct aatacagtaa gatattggac acaaaatgga ggtaactttt taaaatagat    6060
tggcttggaa gttgaaatgt agattaatgg atataaccca atagaaaggg attttcaaat    6120
aaaaccaaag tctattttt  tatttacttt ctaatttgta acagatgact cagtcctaaa    6180
tctttgcctt tatttcctat aaaatgtagg tgatacttgt aactcgactt cctggagtta    6240
attcttcagc aagaggtgac cctgggagcg tactttaaaa taattgctgt acagccattg    6300
agtactaaca tgatgatagg ttttcaaaat atctttgtag tggatgctgc ataattacat    6360
tcacttctct tagactgtaa aagacttttct tgacttgttt taacagtaga gatagcagta    6420
caatttgaat ttatggttta ggctctgcaa ttagaggaac aattgcagtt tcctcctacc    6480
cttcatatgg tctgtgtaaa actgatgttt gcttaactta ttttaaaagt tgattacgtt    6540
ttcagaaaat aaagataatc acttttgcca tggttataat caaatctaag ctttcagact    6600
tgagagccat ggtgtaaaac tcaaggaggt ttatttaaat tatgctgact tgctagaat     6660
tggataaatt ctgtataagc caagtatgag ttcacatgta ctcgaatata cagttttcac    6720
aaagctatta ctctcatcag tcaggcttgt atgatctatt ccttaccaca aaagaagtag    6780
acaattgcca cttttatttc taatccttaa gttgaatgtt tcttcttgga tgtaagttca    6840
aataaattga tctggataaa ttttcatttc tacttaatta aaacttccta tgtaaaatcc    6900
aaa                                                                  6903

<210> SEQ ID NO 19
<211> LENGTH: 536
<212> TYPE: PRT
<213> ORGANISM: Homo sapiens
```

<400> SEQUENCE: 19

| | | | | | | | | | | | | | | |
|---|---|---|---|---|---|---|---|---|---|---|---|---|---|---|
| Met | Asp | Lys | Val | Gly | Lys | Met | Trp | Asn | Asn | Phe | Lys | Tyr | Arg | Cys | Gln |
| 1 | | | | 5 | | | | | 10 | | | | | 15 | |

Asn Leu Phe Gly His Glu Gly Gly Ser Arg Ser Glu Asn Val Asp Met
               20                    25                   30

Asn Ser Asn Arg Cys Leu Ser Val Lys Glu Lys Asn Ile Ser Ile Gly
         35                   40                45

Asp Ser Thr Pro Gln Gln Ser Ser Pro Leu Arg Glu Asn Ile Ala
   50                55               60

Leu Gln Leu Gly Leu Ser Pro Ser Lys Asn Ser Ser Arg Arg Asn Gln
65               70                75                80

Asn Cys Ala Thr Glu Ile Pro Gln Ile Val Glu Ile Ser Ile Glu Lys
               85                   90               95

Asp Asn Asp Ser Cys Val Thr Pro Gly Thr Arg Leu Ala Arg Arg Asp
        100                 105              110

Ser Tyr Ser Arg His Ala Pro Trp Gly Lys Lys His Ser Cys
        115                 120              125

Ser Thr Lys Thr Gln Ser Ser Leu Asp Ala Asp Lys Lys Phe Gly Arg
   130                135              140

Thr Arg Ser Gly Leu Gln Arg Arg Glu Arg Arg Tyr Gly Val Ser Ser
145               150                155              160

Val His Asp Met Asp Ser Val Ser Ser Arg Thr Val Gly Ser Arg Ser
               165                  170             175

Leu Arg Gln Arg Leu Gln Asp Thr Val Gly Leu Cys Phe Pro Met Arg
        180                 185              190

Thr Tyr Ser Lys Gln Ser Lys Pro Leu Phe Ser Asn Lys Arg Lys Ile
               195                  200             205

His Leu Ser Glu Leu Met Leu Glu Lys Cys Pro Phe Pro Ala Gly Ser
   210                215              220

Asp Leu Ala Gln Lys Trp His Leu Ile Lys Gln His Thr Ala Pro Val
225               230                235              240

Ser Pro His Ser Thr Phe Phe Asp Thr Phe Asp Pro Ser Leu Val Ser
               245                  250             255

Thr Glu Asp Glu Glu Asp Arg Leu Arg Glu Arg Arg Leu Ser Ile
        260               265              270

Glu Glu Gly Val Asp Pro Pro Asn Ala Gln Ile His Thr Phe Glu
        275               280              285

Ala Thr Ala Gln Val Asn Pro Leu Tyr Lys Leu Gly Pro Lys Leu Ala
   290                295              300

Pro Gly Met Thr Glu Ile Ser Gly Asp Ser Ala Ile Pro Gln Ala
305               310                315              320

Asn Cys Asp Ser Glu Glu Asp Thr Thr Thr Leu Cys Leu Gln Ser Arg
        325               330              335

Arg Gln Lys Gln Arg Gln Ile Ser Gly Asp Ser His Thr His Val Ser
   340                345              350

Arg Gln Gly Ala Trp Lys Val His Thr Gln Ile Asp Tyr Ile His Cys
        355               360              365

Leu Val Pro Asp Leu Leu Gln Ile Thr Gly Asn Pro Cys Tyr Trp Gly
   370                375              380

Val Met Asp Arg Tyr Glu Ala Glu Ala Leu Leu Glu Gly Lys Pro Glu
385               390                395              400

Gly Thr Phe Leu Leu Arg Asp Ser Ala Gln Glu Asp Tyr Leu Phe Ser

-continued

```
            405                 410                 415
Val Ser Phe Arg Arg Tyr Asn Arg Ser Leu His Ala Arg Ile Glu Gln
            420                 425                 430

Trp Asn His Asn Phe Ser Phe Asp Ala His Asp Pro Cys Val Phe His
            435                 440                 445

Ser Ser Thr Val Thr Gly Leu Leu Glu His Tyr Lys Asp Pro Ser Ser
    450                 455                 460

Cys Met Phe Phe Glu Pro Leu Leu Thr Ile Ser Leu Asn Arg Thr Phe
465                 470                 475                 480

Pro Phe Ser Leu Gln Tyr Ile Cys Arg Ala Val Ile Cys Arg Cys Thr
                485                 490                 495

Thr Tyr Asp Gly Ile Asp Gly Leu Pro Leu Pro Ser Met Leu Gln Asp
                500                 505                 510

Phe Leu Lys Glu Tyr His Tyr Lys Gln Lys Val Arg Val Arg Trp Leu
            515                 520                 525

Glu Arg Glu Pro Val Lys Ala Lys
            530                 535
```

<210> SEQ ID NO 20
<211> LENGTH: 4422
<212> TYPE: DNA
<213> ORGANISM: Homo sapiens

<400> SEQUENCE: 20

```
cgcagagcgc gcacccaagc ggccggacct ccccgactcc cgggccgccc ccgtctcgcg     60
ccctgcctcc ctccttcggc cttcacctac ccgcctccgg attggccgct aggaatcccg    120
cccctctaaa gccctgcctg ctattggtca cgattttata atcaatggat aaagtgggaa    180
aaatgtggaa taacttcaaa tacaggtgtc agaatctctt cggtcatgag ggaggaagcc    240
gtagtgaaaa tgtggacatg aactccaaca gatgtttgtc tgtcaaagag aaaaacatca    300
gcataggaga ctcaactcct cagcaacaaa gcagtccctt aagagaaaat attgccttac    360
aactgggatt aagcccttcg aagaattctt caaggagaaa tcaaaattgt gccacagaaa    420
tccctcaaat tgttgaaata agcatcgaaa aggataatga ttcttgtgtt accccaggaa    480
caagacttgc acgaagagat tcctactctc gacatgctcc atggggtggg aagaaaaaac    540
attcctgttc tacaaagacc cagagttcat tggatgctga taaaaagttt ggtagaactc    600
gaagtggact tcaaaggaga gagaggcgct acggcgtaag ttctgtacac gacatggaca    660
gtgtttccag cagaactgta ggaagtcgct ctctaagaca gaggttgcag gatactgtgg    720
gcttgtgttt tcccatgaga acttacagca agcagtcaaa gcctctcttt tccaataaaa    780
gaaaaatcca tctctctgaa ttaatgcttg agaaatgccc ttttcctgct ggctcagatt    840
tagcccaaaa atggcatttg attaaacagc atacagctcc tgtgagccca cattcaacat    900
tttttgatac atttgatcca tctttggttt ctacagaaga tgaagaagat aggcttagag    960
agagaaggcg gcttagtatt gaagaagggg ttgatccccc tcccaatgca caaatacata   1020
catttgaagc tactgcacag gttaatccat tatataaact gggaccaaaa ttagctcctg   1080
gaatgactga aataagtggg gacagttctg caattccaca agctaattgt gactcggaag   1140
aggatacaac caccctgtgt ttgcagtcac ggaggcagaa gcagcgtcag atatctggag   1200
acagccatac ccatgttagc agacagggag cttggaaagt ccacacacag attgattaca   1260
tacactgcct cgtgcctgat tgcttcaaa ttacagggaa tccctgttac tggggagtga   1320
tggaccgtta tgaagcagaa gcccttctcg aagggaaacc tgaaggcacg ttttgctca   1380
```

```
gggactctgc gcaagaggac tacctcttct ctgtgagctt ccgccgctac aacagatccc    1440
tgcatgcccg aattgagcag tggaatcaca actttagttt cgacgcccat gacccgtgtg    1500
tatttcactc ctccactgta acgggacttt tagaacatta taaagatccc agttcgtgca    1560
tgttttttga accattgctt actatatcac taaataggac tttcccttttt agcctgcagt    1620 atatctgtcg cgcggtaatc tgcaggtgca ctacgtatga tggaattgat gggctccctc    1680
taccctcaat gttacaggat tttttaaaag agtatcatta taaacaaaaa gttagagttc    1740
gctggttgga acgagaacca gtcaaggcaa agtaaactct ccggtcccca aaggttgtta    1800
actaggtccg ctttcatgtg catcagacag tacacctata gcaagcacac gtagcagtgt    1860
taggcttttt catacagtat gtaagcttag tgttagtatc tgtcagatgc tacctgctgt    1920
tacttattca gataaacatg gtgcctattg gaacaatagc ggatagagct acaggtgttc    1980
agtaagacta caaaaacatt ttgcctattt cgctaacagt ttggttttta atggctgtgg    2040
tatttgagtg aggcaactct ggggcatttg ttatgaagaa ttctatttct tactgaagaa    2100
caaattatta atattggatg agtatttcaa cagtgtgact aatgtttgaa attatttttt    2160
ctaagagttt ttctataacc ttccaaaagt cgtgatgttt gtagttacta taaatcaagc    2220
tttggaagtc caaaaagaat aaaagactgc cttccttttta gaaaaaaatg caattttctg    2280
gccacaaggg catagtgcag ttcacttacg tgttgatgta gtttataatc agacgccttt    2340
tctcttctgc aaaaggtact gttaagtaaa ccagattttc taaataggca ttcttaaaat    2400
ttcagactta caaagctagt agtagaattt tattgaaagg cctaggtatt aattttttaa    2460
atgagtgctt taacttaaaa caggcgtttg gaatagctgc tgcaatgtag tcttgtgtgt    2520 gattttttt taagttgatg tgcagtctaa ttgttgtttc ataaaagttg gatctgttcc    2580
tatgcccagg atgattttgt gaaccgtgaa gtacgtgaga ctagaagacg cccaaacaag    2640
tcagataata gtaactacaa tggttgctga tgttgagatt attgttgaac tataattaat    2700
aatttggatg gcagaattta tctctttttt gtaaactctc ataactgaat tgcttaagta    2760
taatttatag aatttcagtg cagttcattc ttaatggaaa atctgaaacc taaattgcag    2820
atttaaaagg tactgtacaa ccattatatc tgtaaataac ttagcacctt tttgtcactt    2880
agaataatat gtactactac ttgagtgagc gcttttggaa gttatatcaa gttctagtgt    2940
ttgcttctta gtaactgaac tgaatttaca gttctgtcct agacattttg cactaaagta    3000
gccgaatcca ctctcatgtc ttttcgttaa tgtgctctgt accactggtg agtgctccat    3060
agtttcctta cctgctgcta cagaatgtta ttttacatcc ctatggctat tgccaaggct    3120
acaaaaaagg aaagctatat ttgtatgcaa cactaacctt ttgactgcta atgtatgttt    3180
ctgcttgctg tgccttgtta tggctgcttt ttttgtgcta ataaagtatg tttggtgttc    3240
tccttgtata tctgctgttt tatacatttg caacaatttc tcttgtaaat ggaatggttt    3300
ggggttttta ataagcatt aactaacaac ctttctatag ttaatgcaga gttaatgaac    3360
agtctaatat tgacttatca gaataagcta actctaaatt taatgctcta catcttatca    3420
gtcataatta tatatactgt ggaacagtat ctgtagttac tgcaaattac tgtacagttt    3480
aggttataac agaaaactga cagagaagta ataaacctat tgatttctct gcttataaat    3540
gaaagattga aactatccaa tgacatatta tagtaaatga gtatctgtaa cctcccactg    3600
catcagaagc aggttaaatg aagtcttgtg aatttgtaat agatcagtac catttattgg    3660
tttggggacc atcttaatta aaaataaatg cccaaaatgt agaactttaa ccaaagactt    3720
```

```
gtcccttttta aagcaaaatg gggattgaag ggacttataa tttctgttgt ttctaattaa    3780
agtccctgaa gatcatatac caaagtgttt gagaacttca tccaaaccta ctttaaagca    3840
ttatgtgcaa ttaagttgtt atgacataat tatattgcct aattgttggg tcttttttct    3900
tgagcttata atgtacctgg aaaataaacc tcttgagaaa aagaaaagtt catactgatt    3960
attggaaaag gactatatat gtgagcaaga ttgtgtttta gagaggaaac ttgaaactcc    4020
aagaaagcac ttgatgtttt tatatgcttg tagcaaattg atgttctaac tgtagttttta   4080 tagaaagtat taatgctttt atgtatttca aaactttcat atgttaaatg gaaattgttt    4140
taaatgtgtt tgagtttatg taagcatgta tacactgtgc taaaagtcac atgtttcagt    4200
ttgtgtataa tattaatatg caatttttgg tttaaatttt tgtcttaaaa tattagtggc    4260 ttacattttta aaaagaaaaa atcaccagca tgaacttgca cctaagtcta tattcactgt    4320
gtccttttct gaatcccatt gtagcctgtc aactaaattt gagtgttaac ggtcttttta    4380
aagtgcattt aaatacaaac caggaatttc tttagaagtt ga                       4422
```

<210> SEQ ID NO 21
<211> LENGTH: 535
<212> TYPE: PRT
<213> ORGANISM: Homo sapiens

<400> SEQUENCE: 21

Met Lys Lys Ile Ser Leu Lys Thr Leu Arg Lys Ser Phe Asn Leu Asn
1               5                   10                  15

Lys Ser Lys Glu Glu Thr Asp Phe Met Val Val Gln Gln Pro Ser Leu
            20                  25                  30

Ala Ser Asp Phe Gly Lys Asp Asp Ser Leu Phe Gly Ser Cys Tyr Gly
        35                  40                  45

Lys Asp Met Ala Ser Cys Asp Ile Asn Gly Glu Asp Glu Lys Gly Gly
    50                  55                  60

Lys Asn Arg Ser Lys Ser Glu Ser Leu Met Gly Thr Leu Lys Arg Arg
65                  70                  75                  80

Leu Ser Ala Lys Gln Lys Ser Lys Gly Lys Ala Gly Thr Pro Ser Gly
                85                  90                  95

Ser Ser Ala Asp Glu Asp Thr Phe Ser Ser Ser Ala Pro Ile Val
            100                 105                 110

Phe Lys Asp Val Arg Ala Gln Arg Pro Ile Arg Ser Thr Ser Leu Arg
        115                 120                 125

Ser His His Tyr Ser Pro Ala Pro Trp Pro Leu Arg Pro Thr Asn Ser
    130                 135                 140

Glu Thr Cys Ile Lys Met Glu Val Arg Val Lys Ala Leu Val His
145                 150                 155                 160

Ser Ser Ser Pro Ser Pro Ala Leu Asn Gly Val Arg Lys Asp Phe His
                165                 170                 175

Asp Leu Gln Ser Glu Thr Thr Cys Gln Glu Gln Ala Asn Ser Leu Lys
            180                 185                 190

Ser Ser Ala Ser His Asn Gly Asp Leu His Leu His Leu Asp Glu His
        195                 200                 205

Val Pro Val Val Ile Gly Leu Met Pro Gln Asp Tyr Ile Gln Tyr Thr
    210                 215                 220

Val Pro Leu Asp Glu Gly Met Tyr Pro Leu Glu Gly Ser Arg Ser Tyr
225                 230                 235                 240

Cys Leu Asp Ser Ser Ser Pro Met Glu Val Ser Ala Val Pro Pro Gln
                245                 250                 255

Val Gly Gly Arg Ala Phe Pro Glu Asp Glu Ser Gln Val Asp Gln Asp
            260                 265                 270

Leu Val Val Ala Pro Glu Ile Phe Val Asp Gln Ser Val Asn Gly Leu
            275                 280                 285

Leu Ile Gly Thr Thr Gly Val Met Leu Gln Ser Pro Arg Ala Gly His
            290                 295                 300

Asp Asp Val Pro Pro Leu Ser Pro Leu Pro Pro Met Gln Asn Asn
305                 310                 315                 320

Gln Ile Gln Arg Asn Phe Ser Gly Leu Thr Gly Thr Glu Ala His Val
                325                 330                 335

Ala Glu Ser Met Arg Cys His Leu Asn Phe Asp Pro Asn Ser Ala Pro
            340                 345                 350

Gly Val Ala Arg Val Tyr Asp Ser Val Gln Ser Ser Gly Pro Met Val
            355                 360                 365

Val Thr Ser Leu Thr Glu Glu Leu Lys Lys Leu Ala Lys Gln Gly Trp
370                 375                 380

Tyr Trp Gly Pro Ile Thr Arg Trp Glu Ala Glu Gly Lys Leu Ala Asn
385                 390                 395                 400

Val Pro Asp Gly Ser Phe Leu Val Arg Asp Ser Ser Asp Asp Arg Tyr
            405                 410                 415

Leu Leu Ser Leu Ser Phe Arg Ser His Gly Lys Thr Leu His Thr Arg
            420                 425                 430

Ile Glu His Ser Asn Gly Arg Phe Ser Phe Tyr Glu Gln Pro Asp Val
            435                 440                 445

Glu Gly His Thr Ser Ile Val Asp Leu Ile Glu His Ser Ile Arg Asp
            450                 455                 460

Ser Glu Asn Gly Ala Phe Cys Tyr Ser Arg Ser Arg Leu Pro Gly Ser
465                 470                 475                 480

Ala Thr Tyr Pro Val Arg Leu Thr Asn Pro Val Ser Arg Phe Met Gln
            485                 490                 495

Val Arg Ser Leu Gln Tyr Leu Cys Arg Phe Val Ile Arg Gln Tyr Thr
            500                 505                 510

Arg Ile Asp Leu Ile Gln Lys Leu Pro Leu Pro Asn Lys Met Lys Asp
            515                 520                 525

Tyr Leu Gln Glu Lys His Tyr
    530                 535

<210> SEQ ID NO 22
<211> LENGTH: 5703
<212> TYPE: DNA
<213> ORGANISM: Homo sapiens

<400> SEQUENCE: 22
agtcgcgccg gcgctgggcg aggaagcgga gccgggccgc ctccggaaaa tggctccaaa       60
ggttaaatga agcaggaaaa atacatagat gcagccttgc agcctctcca gatgtttggg      120
gataatattc cagatagaaa tattgatccc ttggattagg taactagtca taatgaagaa      180
aattagtctt aaaaccttac ggaaatcttt aacttgaat aaaagtaaag aagaaactga      240
tttcatggta gtacaacaac catcgctagc cagtgacttt ggaaaagatg attccttatt      300
tggtagctgc tatggtaaag atatggccag ctgcgatatc aacggtgaag atgaaaaagg      360
cggaaaaaac agatcaaaaa gcgagagcct gatgggtacg ctaaaaaggc ggctttctgc      420
aaaacagaag tcaaaaggca aggcgggcac accctctggg agctctgccg acgaggacac      480

```
cttctcctcc tcctcagcac ccatagtctt taaagacgtg agagctcaga ggccgataag    540
gtccacgtcg ctccgcagcc atcactacag tcccgcgccg tggcctctgc ggcccacaaa    600
ctccgaggag acctgcatca agatggaggt gagagtcaag gccttggttc actcttccag    660
cccgagtcca gccctgaatg gcgtccggaa ggatttccac gacctccagt ctgagaccac    720
gtgccaggag caagccaatt cactgaagag ctcggcttct cataatggag acctgcatct    780
tcacctggat gaacatgtgc ctgtcgttat tggacttatg cctcaggact acattcagta    840
tactgtgcct ttagatgagg ggatgtatcc tttggaagga tcacggagct attgtctgga    900
cagctcttct cccatggaag tctctgcggt tcctcctcaa gtgggagggc gcgctttccc    960
cgaggatgag agtcaggtag accaggacct agttgtcgcc ccagagatct tcgtggatca   1020
gtccgtgaat ggcttgttga ttggcaccac gggagtcatg ttgcagagcc cgagagcggg   1080
tcacgatgat gtccctccac tctcaccatt gctacctcca atgcagaata atcaaatcca   1140
aaggaacttc agtggactca ctggcacaga agcccacgtg gctgaaagta tgcgctgtca   1200
tttgaatttt gatccgaact ctgctcctgg ggttgcaaga gttatgact cagtgcaaag    1260 tagtggtccc atggttgtga caagccttac agaggagctg aaaaaacttg caaagcaagg   1320
atggtactgg ggaccaatca cacgttggga ggcagaaggg aagctagcaa acgtgccaga   1380
tggttctttt cttgttcggg acagttctga cgaccgttac cttttaagct tgagctttcg   1440
ctcccatggt aaaacacttc acactagaat tgagcactca aatggtaggt ttagcttta    1500 tgaacagcca gatgtggaag acatacgtc catagttgat ctaattgagc attcaatcag    1560
ggactctgaa aatggagctt tttgttattc aaggtctcgg ctgcctggat ctgcaactta   1620
ccccgtcaga ctgaccaacc cagtgtcccg gttcatgcag gtgcgctcgt tgcagtacct   1680
gtgtcgtttt gttatacgtc agtataccag aatagactta attcagaaac tgcctttgcc   1740
aaacaaaatg aaggattatt tacaggagaa gcactactga aagattgaga accctgcatc   1800
ttgcactttg gaataagaa caagagattg aaatacagtt tacaaacttt cattgccatc    1860
aaaatctttt gctgccataa ctatttcagt tttatgtgta aaagagtcat cagtttgttt   1920
aggggtgggg aagtgtcagc aaggtgtctt gggtttattt tggttctta aaaaagggaa    1980 gtcttgaggt tttagaggtg tgaattatgt ttcatcaatg tgcagaataa tcacaatgtg   2040
aattatcaaa ttctcctcaa tgccccccc gcccagtcct ttgctgctat ccactgtgat    2100
ttttatgcat taaaagcaca tttcatgtgt attcaaccct aagtaaagtt gaatgaaact   2160
taacagaatg gaaattgcta tgtcttttta aatggtccat tttcaaaaga cagtgttgaa   2220
taaacatacc tgtgtgataa aacacagaat ttacatatac actgaagatg agttttaat    2280 ctcttacttt aaaaagattt atttagaatc gtgaattgac ataatcttgg gtaatggaac   2340
ggagatctgc aacatatctt ttaacaacac tttttttctaa attatttcta aggttgtgct   2400
aattcttttg gttgtgaaaa gttgaatttt tctgttgcct tcgttttcat cttctagttt    2460
gtctatttta ataaatggcc ttacattaaa aaattgtaaa gaaatgtata ccaccaattt    2520
agaaattgtt gccttttctg taattaaact cgggtacaaa ttggcataac atgaaaacct   2580
atggaactag aattattatt aaagaaatat tagatgatca tagcttcctg tgatagcatt   2640
tttttgtgtg ttacctatcc ttttggtaaa atgttttatc tgtgatttct ttagcttagt   2700
caacattttc ttgggtgaac ttgattgtca actaattttc ataaatggac tggattctct   2760
tgcaacatta atgtttataa aaagttttaa attgatttga atagaaagaa acattgttt    2820 taaagttgga tttatatttt tcttctatgt agttactata aaagtgtgct ggatttgacc   2880
```

```
aatccttacc cccactataa agagaacccg tgatgacttt agtttaaaaa ttgtggaaat    2940
tgtggagcaa tttttctcac aatgtgagaa aaattctaaa ccatattaga taatgtggaa    3000
gtcatattgt ctatcatata tactgccatt taaaaatagg ttttaaaat ttagctaagt     3060 cttaagtaat ttgccgttgc taataatttt atctccttga gtcggttgtt ggggagagat    3120
gttatattca ataatttta gttattttgt aatgcagagt gtttattcat ttcacagttc     3180
tgcaatggat gtagtatttt gggattgccc tgtccagaaa attttcagct acacaccttt    3240
aaaggaaaat gtttctatct cagatgaaac atgtaatttg ggatggttct tcctttgtca    3300
cttaaaggaa gagataggaa aagtctctta cccactttaa acatgagggt aaaggtttag    3360
gtcaaactta ctggctttgt cattcaagca tatctgaatc ctcactttt tctctttgct     3420 ttttagggtc agaactgaga tattaccaag aaaaggcaca atgccataat attatggtgt    3480 tatggtatt tgacttaaag gggaaaaggt acttaatttt ggtgggatgt tgattgtacc     3540
ttgttaaaaa gactctcatt ttctcatatg ttttctccta ataagatgga atatggagta    3600
tactgtaata atataagtgt tcattataag ctatttggat taagaactat tgcagagttg    3660
taagcttgtt atcaaattaa tgcaagacat ttaaactatt tttttgcaaa actatttatt    3720
tttaaaacaa cttaaagtat atctagggtg agttaaaagt ccctgtgcat ctatattaga    3780
tggcaggttt tgtcacagag tcactgtgta ttaataataa atgttgaaat ggcttctccg    3840
tgtctccaga agcatttaca tgtcctcctt gtgagatcat ggtgcacaga ggtctttgga    3900
ctgccctgaa cccgtcttat gtggacataa cctattccct tcgttttctc atcatgccat    3960
gtgtttaaga tctacccgct tagtgtcaag attattgaga ttttcatcta aatgttttta    4020
aaattgtatt ttgtgtttta gtggaggaca gtcttgatac tgttctaatt cagaaagcca    4080
aattttgatg cgcttttgta tattcataat atatacttta atatgcccta ttctaatcta    4140
gtttgaaatt gttagattct gatagtataa tgataaaatc aaactatttg ccaaaaagtt    4200
aaatttacaa gcagaaagat gttttgcgat attttctact tttgtgtaga aagataacca    4260
tttggggtag gcagcacaac agaatgtgaa agattggctt tatatgatac taacacagtc    4320
cagttaaaag tggaaacagg gaaaagagag agagaaaact catcatttag tttggtctag    4380
acacaatttg gttaaatttt aggattctat tggcagttaa catagatgac atggacacag    4440
cctatgagtg cttttaaat acgtgcttct aaaaatctga gctcaaagca agaaaaagaa     4500
aacaggaaag ctgtatccat ttgccataat agatgaatca gaattgtttt ctattaaata    4560
tttcatcacg aaatatgatg gaggccagaa gctattttta ggcttactat aacactatta    4620
tgcattttta taaataagaa gaaggctgta gaaagtactt gaaaaatatc taattctctt    4680
tctgtctaag gaaaactctt tctacttggt gcaataatct gaaaatttag aaggtcaaaa    4740
tatgtcacag gaaatgatca tagacctaaa aatagttttt aaggaaacca gctacacggg    4800
gcaaccaacc atcttgctgt tgaagaaaac agttccaaaa ggctaaatca ttggcataaa    4860
ggaaacaaaa cccaaagtat gcgttgtaat tcttgagcca gtattactga aacaggataa    4920
aagttataaa atctaacata ggttaatgca atgtctctgc tagtgctaca agtctaaaat    4980
atctttgtaa caatgctttc agaaatgcca gttttaatta catttcacat tgtatatgag    5040
agatactgct ttatgaatga atcggaataa tacattttca tttaaatctt aattgctttt    5100
cattaaatgc gaagtcttaa tttcaaaatg aaatcacact accagcaata gacagttttc    5160
ttgaaaactc taataaggaa caatagccag ttccgtaaat aactttaaaa ttctaaaagt    5220
```

-continued

```
gttggtacac tagcaatcac aaatatggtt tctttaata ctttttaat cctgtaaaga    5280 agggttttta taaacattct ttttattaat cagtcataac atggcgaagt gtgtagttgc    5340
tgtttctgaa aagtgatcca aactctacat ccagagatta tgaaaaattc ttatagaatt    5400
ttgtaacaag tatttacatg ttgggtgaaa gaaatttcat agtcgttgga gtgccatgaa    5460
attaatactt gcaattcaga ttgcggtagt ttacactttt tctgtatgtt tcaaatcagg    5520
tgtgtaccat ttgtactgag aacaccacag aatgaattat ccaaagtcca ttgattttaa    5580
tacgtgtttt ggtttgtaaa caaattatag taatttcttg cacattttg gaaattaatt    5640 gtataagaat ttatgtatct gcttctagat acagtgtgta aataaaaaat ttcgttcaca    5700
aga                                                                  5703
```

<210> SEQ ID NO 23
<211> LENGTH: 645
<212> TYPE: PRT
<213> ORGANISM: Homo sapiens

<400> SEQUENCE: 23

```
Met Gln Glu Ala Glu Leu Arg Asp Gly Glu Ala Ala Ala Ala Ala Ala
1               5                   10                  15

Ser Tyr Arg Val Leu Ser Arg Leu Leu Gly Tyr Gly Glu Ala Ala Pro
                20                  25                  30

Glu Pro Gly Pro Pro Pro Pro Pro Gly His Gly Pro Pro Pro Pro
            35                  40                  45

Pro Phe Leu Ala Arg Pro Gly Pro Arg Gly Ser Arg Pro Pro Gln Leu
        50                  55                  60

Met Val Phe Arg Asn Val Gly Arg Pro Pro Glu Glu Asp Val Glu
65                  70                  75                  80

Ala Ala Pro Glu Pro Gly Pro Ser Glu Leu Leu Cys Pro Arg His Arg
                85                  90                  95

Cys Ala Leu Asp Pro Lys Ala Leu Pro Pro Gly Leu Ala Leu Glu Arg
                100                 105                 110

Thr Trp Gly Pro Ala Ala Gly Leu Glu Ala Gln Leu Ala Ala Leu Gly
            115                 120                 125

Leu Gly Gln Pro Ala Gly Pro Gly Val Lys Thr Val Gly Gly Gly Cys
    130                 135                 140

Cys Pro Cys Pro Cys Pro Pro Gln Pro Pro Pro Gln Pro Gln Pro
145                 150                 155                 160

Pro Ala Ala Ala Pro Gln Ala Gly Glu Asp Pro Thr Glu Thr Ser Asp
                165                 170                 175

Ala Leu Leu Val Leu Glu Gly Leu Glu Ser Glu Ala Glu Ser Leu Glu
            180                 185                 190

Thr Asn Ser Cys Ser Glu Glu Glu Leu Ser Ser Pro Gly Arg Gly Gly
        195                 200                 205

Gly Gly Gly Gly Arg Leu Leu Leu Gln Pro Gly Pro Glu Leu Pro
    210                 215                 220

Pro Val Pro Phe Pro Leu Gln Asp Leu Val Pro Leu Gly Arg Leu Ser
225                 230                 235                 240

Arg Gly Glu Gln Gln Gln Gln Gln Gln Gln Pro Pro Pro Pro
                245                 250                 255

Pro Pro Pro Gly Pro Leu Arg Pro Leu Ala Gly Pro Ser Arg Lys Gly
            260                 265                 270

Ser Phe Lys Ile Arg Leu Ser Arg Leu Phe Arg Thr Lys Ser Cys Asn
        275                 280                 285
```

```
Gly Gly Ser Gly Gly Asp Gly Thr Gly Lys Arg Pro Ser Gly Glu
        290                 295                 300

Leu Ala Ala Ser Ala Ala Ser Leu Thr Asp Met Gly Gly Ser Ala Gly
305                 310                 315                 320

Arg Glu Leu Asp Ala Gly Arg Lys Pro Lys Leu Thr Arg Thr Gln Ser
                325                 330                 335

Ala Phe Ser Pro Val Ser Phe Ser Pro Leu Phe Thr Gly Glu Thr Val
                340                 345                 350

Ser Leu Val Asp Val Asp Ile Ser Gln Arg Gly Leu Thr Ser Pro His
                355                 360                 365

Pro Pro Thr Pro Pro Pro Pro Arg Arg Ser Leu Ser Leu Leu Asp
        370                 375                 380

Asp Ile Ser Gly Thr Leu Pro Thr Ser Val Leu Val Ala Pro Met Gly
385                 390                 395                 400

Ser Ser Leu Gln Ser Phe Pro Leu Pro Pro Pro Pro Pro His Ala
                405                 410                 415

Pro Asp Ala Phe Pro Arg Ile Ala Pro Ile Arg Ala Ala Glu Ser Leu
                420                 425                 430

His Ser Gln Pro Pro Gln His Leu Gln Cys Pro Leu Tyr Arg Pro Asp
                435                 440                 445

Ser Ser Ser Phe Ala Ala Ser Leu Arg Glu Leu Glu Lys Cys Gly Trp
        450                 455                 460

Tyr Trp Gly Pro Met Asn Trp Glu Asp Ala Glu Met Lys Leu Lys Gly
465                 470                 475                 480

Lys Pro Asp Gly Ser Phe Leu Val Arg Asp Ser Ser Asp Pro Arg Tyr
                485                 490                 495

Ile Leu Ser Leu Ser Phe Arg Ser Gln Gly Ile Thr His His Thr Arg
                500                 505                 510

Met Glu His Tyr Arg Gly Thr Phe Ser Leu Trp Cys His Pro Lys Phe
                515                 520                 525

Glu Asp Arg Cys Gln Ser Val Val Glu Phe Ile Lys Arg Ala Ile Met
        530                 535                 540

His Ser Lys Asn Gly Lys Phe Leu Tyr Phe Leu Arg Ser Arg Val Pro
545                 550                 555                 560

Gly Leu Pro Pro Thr Pro Val Gln Leu Leu Tyr Pro Val Ser Arg Phe
                565                 570                 575

Ser Asn Val Lys Ser Leu Gln His Leu Cys Arg Phe Arg Ile Arg Gln
                580                 585                 590

Leu Val Arg Ile Asp His Ile Pro Asp Leu Pro Leu Pro Lys Pro Leu
                595                 600                 605

Ile Ser Tyr Ile Arg Lys Phe Tyr Tyr Tyr Asp Pro Gln Glu Glu Val
                610                 615                 620

Tyr Leu Ser Leu Lys Glu Ala Gln Leu Ile Ser Lys Gln Lys Gln Glu
625                 630                 635                 640

Val Glu Pro Ser Thr
                645

<210> SEQ ID NO 24
<211> LENGTH: 8258
<212> TYPE: DNA
<213> ORGANISM: Homo sapiens

<400> SEQUENCE: 24
ggcttggggg cggtgctcgg cggtggcgga gcgcggcctg ggctcgcgct gggctccgcg    60
```

```
cgcccccgc cccctctat gaggcagagg ccgcggcggc cgttagcgct gtcgctccgg      120
gggccgcggc gggcggggct ccggcggggc ccggcctagt ccccacccca gcccggctcc      180
cagccgcccg ccctccctcc ctctccccga tgcaggaggc cgagctccgg gatggcgagg      240
cggcggcggc ggccgcttcg taccgcgtcc tgagccgcct ccttggctat ggagaggcgg      300 ccccccgagcc aggccctccg ccaccgcccc cgggccatgg ccccccgccg ccacccttcc      360
tcgcgcggcc cggcccgcgg ggctcccggc cgccgcagct gatggtgttc cgcaacgtgg      420
gtcggccgcc ggaggaggag gacgtggagg cggccccgga gccgggaccc tcggaactgc      480
tgtgtccccg gcaccgctgt gccctggacc ccaaggccct gccgccgggc ttggcgctcg      540
agcggacctg ggcccggcg gctggactag aggcgcagtt ggcggctctg ggctcgggc      600 agccggcggg gccgggggtc aagacagtcg gtggggttg ctgcccgtgt ccgtgtcctc      660
ctcagccgcc ccctccgcag ccccagccgc ctgctgccgc cccgcaggcc ggggaggacc      720
ccacggaaac gagcgacgcg ctgctggtcc tggaggctt ggaatcggag ccgagagcc      780 tggagactaa cagctgctcg gaagaggagc tcagcagccc gggtcgcgga ggaggagggg      840
gcggccggct tctgctgcag cccccaggcc ctgaattacc tccggtgccc ttcccgctgc      900
aggacttggt ccctctgggg cgcctgagta gagggagca gcagcagcag cagcagcagc      960
aacctccccc gcccccgcct cctccccggc ccctccggcc actcgcgggt ccttctcgga     1020
agggctcctt caaaatccgc ctcagtcgcc tctttcgcac caagagctgc aacggtggct     1080
ccggcggtgg ggatgggacc ggcaagaggc cttctggaga gctggctgct tcagctgcga     1140
gcctgacaga catgggaggc tctgcgggcc gggagctgga cgcggggagg aaacccaagt     1200
tgacaagaac tcaaagtgcc ttttctccgg tctccttcag cccctgttc acaggtgaaa     1260 ctgtgtcgct tgtggatgtg acatttctc agcggggcct gacctctcca cccctccaa     1320 ctccccctcc tcctccgaga agaagcctca gcctcctaga tgatatcagt gggacgctgc     1380
ctacatctgt ccttgtggct ccgatgggt cttccttgca gtctttcccc ctacctccgc     1440
ctcctccacc ccatgcccca gatgcatttc ccggattgc tcccatccga gcagctgaat     1500
ccctgcacag ccaacccca cagcacctcc agtgtcccct ctaccggcct gactcgagca     1560
gctttgcagc cagccttcga gagttggaga agtgtggttg gtattggggg ccaatgaatt     1620
gggaagatgc agagatgaag ctgaaaggga accagatgg ttctttcctg gtacgagaca     1680
gttctgatcc tcgttacatc ctgagcctca gttccgatc acagggtatc acccaccaca     1740
ctagaatgga gcactacaga ggaaccttca gcctgtggtg tcatcccaag tttgaggacc     1800
gctgtcaatc tgttgtagag tttattaaga gagccattat gcactccaag aatggaaagt     1860 ttctctatttt cttaagatcc agggttccag gactgccacc aactcctgtc cagctgctct     1920
atccagtgtc ccgattcagc aatgtcaaat ccctccagca cctttgcaga ttccggatac     1980
gacagctcgt caggatagat cacatcccag atctcccact gcctaaacct ctgatctctt     2040
atatccgaaa gttctactac tatgatcctc aggaagaggt atacctgtct ctaaaggaag     2100
cgcagctcat ttccaaacag aagcaagagg tggaaccctc cacgtagcga ggggctccct     2160
gctggtcacc accaagggca tttggttgcc aagctccagc tttgaagaac caaattaagc     2220
taccatgaaa agaagaggaa aagtgaggga acaggaaggt tgggattctc tgtgcagaga     2280
ctttggttcc ccacgcagcc ctggggcttg gaagaagcac atgaccgtac tctgcgtggg     2340
gctccacctc acacccaccc ctgggcatct taggactgga ggggctcctt ggaaaactgg     2400
```

```
aagaagtctc aacactgttt cttttttcaga agttttgttt ttgatattta tattacttgg   2460
tatggaaaac tcaccttgaa ggcagttggg gtttgtgccc gttggattga aagtggtgcg   2520
aagggtgagc aggtccaaag aagggggtggg aggagggaac aggggacggc cattcagctg   2580
gtgccaaagg cagagttaga gtctgtgctg tgggcctgga agatgggagg aggggcttga   2640
ggtttgcaaa ggactgggag ttcctgagga aggggggaatc tgcctcttgt tgccatgggc   2700
agctgttgta ggagcaggag agaaaggagg gtgggtggtc tcgaaaagaa tattgggcaa   2760
aacctagcca attggcctta gctgggagaa gtagtgactc ctgcatcctt ttttaaggtt   2820
taggaacctg agttcagaaa cacctctcat ggaagctgta ctagttgtga tttacttaat   2880
tccttaagtt ccatgacctg aagttaaccc cgttcttcct ctgctctcaa cccattgccc   2940
cttgagataa ctgtacatgt cactctgatc atggtaacag catccctatt gcttctgcca   3000
gctgtcatgg caatcgtgtt tcccatcacc tgggcggttc agagccagtc atgggctgct   3060
gaatttaatg gagcatgttt ccaggttctt catggcaaac tgtactcatg acttaggagt   3120
gagtgttact tccatgtgcc tgtcagcttg tgaggggaa tgtggaggaa ggtgagaaat   3180
acagctccca cagttgtgct cttcctagag gaagctctca gaacgcagcc ctcacgggat   3240
ttccttaggt cagaggagag catcgcatct cacgttttta ggtttatcac tgccatccca   3300
cttctgggat gggaggtagc aagggcttct gtattttctt gtgttcattc tagcaaccca   3360
gacatttccg gatcagatcc tgctggtctc cactcactgg aaagtctgcc agatgccgat   3420
ttgagagctg cctgtccctg ctttcaggag gagcggggag aaaaactcca atggtcttta   3480
atggtttctg cagctggcca tggccaattc atatgacatt gtgagtttgc tttcttatag   3540
agctgctctg gggagaggtt tgctattgag atgtaacagt ggagctgttg ggtcttcatg   3600
actcctttgc gtgtgttcca tgggactctc tttctgggtt ccccatgctt atagttgcct   3660
cgtgtcacaa gacagatact aatgtcaggt ttgtggcttc ctgatggttt gggtggggcc   3720
ccagtgtcct ggtaatttat aggactgcct catctgggag cattgccttc ttccttagtc   3780
ccacgtggag tgaccagtct tcctccttgt agctgaacag ggaggaaact tgcaccatta   3840
cctgactgtg gaagggtggc ccacaagatg agctgtgcac cataaacaca gcccacctct   3900
gatttgtcat gtggtacctc ttcttttcctt ggcttccatg gtagtattat caactaagca   3960
agattgtgat cccagaaatt ggcttagcat gtgagtgttg cctcgtgaga gtacaagtaa   4020
tataactcgc catcttgcag gaagtgccac cccaatatag agcctgaagt tggaatctgt   4080
tgagatcctt gggtggctga tatacagcct gggatctttc tttttttttgt tccttttcaa   4140 ccacccataa ttttaatatt attttttagt gtgtgtgtgc ctggctttgc gctagatatt   4200
gtagaaaaca aaaaggtaa aagacgtaat atgtggccta agggagcttt taggtgactg   4260
ctgcacatca agcagaaaat caaggactat ctaaagacgt ttatagtaga taagatcagg   4320
gtagaccaga tggtctggga aagttctgtg cctctgaggc tttgggttgt agtcaatggc   4380
aggacagaca gtgagatgaa aaacacatga gcaaagcaa ggaagcagaa atctgcatgg   4440
catgtactga acagtgcaca gccctgttag agcaacatgg ttaaagaatc ctttccagtg   4500
cggttttcta gatggaagct tcccagccac caggcagacc tgagtgccaa ggggttatga   4560
tggtgaggtg gagcccaaag cccaaggag tcagcaaggc tcctgcccat tgccagggcc   4620
tcactatggt cagctcaggc catgtgaggg aggcagagcc tctgcacccc ctgtgttact   4680 gggggtttctt ctggagaact catacattca ggtacaaaac aaaccaactg aggaggtgtg   4740
acccaacctc accacccacc tttctcctcc tggggagtgt cgtgttgaac tgtgtctgtg   4800
```

```
tcagtgcact ggtcccagcc ctggccgcag cctagtcctt tctctgtgga gtgggctgca    4860
aaacagcagc gcaagaggag acagtcttcg tcaggtgtgg gtgtttggtg cctgcatggg    4920
tggccttgca cagagcagtt aggggaagat gaggggggagg catggggctg gccagctct    4980 ctgggataca gcctggtcag agagtaaatg gagcagagga gcaggtgtgg cagcacctgc    5040
ccttcacctc cctgaccagg cccgtccctc cttcgccagt gctgtgcaga gctcatttaa    5100
atgtattcct ttctaggtct gggcgcggtg gctcacgcct gtaatcccag cactttggga    5160
ggctgaggtg ggtggatcat gaggtcggga gttcaagacc agcttggcca acagtgaaa    5220 ccctatctct actaaaatac aaaaattagc tgggcatggt ggcatgcgcc tgtagtccca    5280
gctacttggg aggctgagac aggagaattg cttgaaccca ggaggcggag gttgcactga    5340
gccgagattg cgccactgcc ctctagccta gacgacagag tgagactcca tctcaaaaaa    5400
aataaataat ttctttctgg ttgtattttc aagtcacaaa ttggaaaagg cttacatcta    5460
gggacccact gttgattcct aagttgtggg tgggtgatat cagtggcctc agtgcctgca    5520
taaccctcac ctgtttatga ctgatctact gtaaccttcc tcaggttgag agtgagctgc    5580
tgtgagccta tgacaactac tgctacaact tgctgttact tgaaattcgt gtgctatgtt    5640
ggtagcacag gagtaggcgg gcgggggttt tggtgtgggc actaggtaag tgggtggcaa    5700
ccggctcttt gggaccattg gtgctgacct ttgcctggtc acctgcctgt gcctaggcca    5760
agtgaatgtt acatcttgga acctgagcca tggaggtggc gccacctccc tgaggagaaa    5820
ggtgtggcca aaggaaactc ctgcatggct cctgctcctt cccttccct acatttcact    5880 tgggctaatg atgtaagccc cccttgaggt tggggatggt gtggagatag ctgcagacac    5940
ccctgtaaca gacatccagg aagaattagg gagtgggggg aattatagtt cctaggtcta    6000
ggggtgagag gtgggagtag aaccagaagt gccctggaat ccagccgtgt cagccctcac    6060
cccagggccc ccaggaaagc atggcctgct tgaagccctc tgctccctgc agaaactggg    6120
gcgaggagga gcttttttcct tcagttagat ctttcccttc cctgctgcct cgctcccta    6180 gctttggagc cctaaagtta gtggacaaga cactgggata aagctctatg gctgctggaa    6240
ggaggtctga gtctgtgtgt gtgcatatgc atgcatgtgt gtgtgtgtgt gtgtcctcat    6300
ttgcagaagt cttgctacca gttagggtgt taagagcatc tccactgggc ggagacctgg    6360
catttgtttt ccactgttaa gagaatgaca cacccctgt catgtaaggg aggagctatt    6420
gagttagaca ttttccctat gggaatcctc ggtttggttt gtgggaaagg agggaatgga    6480
taagtgattt ttatctctaa tcgtcaacac agctgttctt ccactgaatt tgtgctattg    6540
catacatgta gccatctttc tttttcactgc agcagtgttt atcagtagtt caaaatgatt    6600
tatttgctcc tggggagtaa aaccttttt attaaaaaaa gaaaagaaa aaaaaagaa    6660 agaaaagtgt gcccccctcc tatgctgcga tagctataaa atgattgggt cacaaaggtc    6720
aagtctgcac gtccctgtgg tagaccctgc tttcacattg gagccttcac actcagcaca    6780
aaatgattgg aggccttgat aaaatggaga gcaaagtctt gggagcagtg aaatgggggt    6840
tggatcatag agacaggcgc tgggactcg ggtactgcag ttaggaaagt agcgttatga    6900
gttgtactga aaatgttgat tctctaatct gccagaaaag gacctgtctt ttcatgcaga    6960
tttcatattg tctttgtcct tttcattgct tcttgacctt cctggcaggt gtcgctcagt    7020
ttcttcctgt ttccctttcct gtcctctcca cacctgctat cccgtcccac tcccatctac    7080
ctcccgggaa gccagccctg catgctgagt ttgtgacctg cttcattccc atttcatttc    7140
```

-continued

```
tagagggttt agaggtgacc tggaaccgtt ccctttccct ctcctacccc ctcctctgca    7200
acaccaagag gcctggaggg gcagacagaa agcagccagc cacggcggga agacatgcat    7260
gtttggttgc agctggactg cgatcgtagt tcctcctgga gatagagtgt gaggaactta    7320
ggacactctt cctcagactc tgggatcatc acataccaca ctgccccgct cagagtttcg    7380
tcctgagctc cctaaccagc tcaggtggag cagaagcctg ctctcactcc tccatctctg    7440
gtgctccctt gggcggggac ctgtccctca ctcttaggcc cagaacctgt ccaagggaca    7500
ggtagggtcc aggtgccact ttgggtagct ggctgttgga atgcccacac tggtgctgcc    7560
tgtggcatag ccactgctgt acgtttttgg ttgtttttaa gaaactcgat gaagaggggt    7620
gtcattctgg gctcggggtg gttgccaatt tttcaccaga aagggagcca cccccttgcaa   7680 ccacttctgt ctccgttagc ccccctctg ccctcctcca agccaaagcg tggcctggct    7740
tttgtcttcc catttagttt tcctcttta cccttccttt tgtgcttaat ttattaaaat     7800
agttgctgta taatttattt tcataaacta taaaaaaata ctaaatggtt aaaatagact    7860
tgcaggccaa tcttaaatgg ggtgggaggg gtctgagggt gggatgggga aagggaaaga    7920
ggttttgata taaacaaaac aaatgcactt tgggtgtgtt ttggtatttt tctggggata    7980
gagggggtgg ggttagggat gtccctgtag attagttcca gaatgggtg tctgtatata     8040 ctgtattaat aggcatgttt gactctcgta aagggacgtt agtagctgct gcaggtcctg    8100
tttgaaaacc ccatgtacaa ttcccagttt tttgtaagtg tcagtgcgag agacatttga    8160
ctcttgtgtt tgtatctcct ttttatgatt gctgtaccta cccatgtctt tttggggagg    8220
ggtgaaaaga gatttgaaat aaaaatgttt agaaatta                             8258
```

<210> SEQ ID NO 25
<211> LENGTH: 22
<212> TYPE: RNA
<213> ORGANISM: Mus musculus

<400> SEQUENCE: 25
cauugcacuu gucucggucu ga                                              22

<210> SEQ ID NO 26
<211> LENGTH: 22
<212> TYPE: RNA
<213> ORGANISM: Artificial Sequence
<220> FEATURE:
<223> OTHER INFORMATION: mir mimic

<400> SEQUENCE: 26
cauugcacuu gucucggucu ga                                              22

<210> SEQ ID NO 27
<211> LENGTH: 20
<212> TYPE: RNA
<213> ORGANISM: Mus musculus

<400> SEQUENCE: 27
uaaggcacgc ggugaaugcc                                                 20

<210> SEQ ID NO 28
<211> LENGTH: 20
<212> TYPE: RNA
<213> ORGANISM: Artificial Sequence
<220> FEATURE:
<223> OTHER INFORMATION: mir mimic

<400> SEQUENCE: 28

-continued

| | |
|---|---|
| uaaggcacgc ggugaaugcc | 20 |

<210> SEQ ID NO 29
<211> LENGTH: 22
<212> TYPE: RNA
<213> ORGANISM: Mus musculus

<400> SEQUENCE: 29

| | |
|---|---|
| ugagguagua gguuguauag uu | 22 |

<210> SEQ ID NO 30
<211> LENGTH: 22
<212> TYPE: RNA
<213> ORGANISM: Mus musculus

<400> SEQUENCE: 30

| | |
|---|---|
| ugagguagua gguuguaugg uu | 22 |

<210> SEQ ID NO 31
<211> LENGTH: 22
<212> TYPE: RNA
<213> ORGANISM: Artificial Sequence
<220> FEATURE:
<223> OTHER INFORMATION: Synthetic antagomir

<400> SEQUENCE: 31

| | |
|---|---|
| ugagguagua gguuguauag uu | 22 |

<210> SEQ ID NO 32
<211> LENGTH: 22
<212> TYPE: RNA
<213> ORGANISM: Artificial Sequence
<220> FEATURE:
<223> OTHER INFORMATION: Synthetic antagomir

<400> SEQUENCE: 32

| | |
|---|---|
| ugagguagua gguuguaugg uu | 22 |

<210> SEQ ID NO 33
<211> LENGTH: 20
<212> TYPE: DNA
<213> ORGANISM: Artificial Sequence
<220> FEATURE:
<223> OTHER INFORMATION: Synthetic primer

<400> SEQUENCE: 33

| | |
|---|---|
| ggcattgctc tcaatgacaa | 20 |

<210> SEQ ID NO 34
<211> LENGTH: 20
<212> TYPE: DNA
<213> ORGANISM: Artificial Sequence
<220> FEATURE:
<223> OTHER INFORMATION: Synthetic primer

<400> SEQUENCE: 34

| | |
|---|---|
| cttgctcagt gtccttgctg | 20 |

<210> SEQ ID NO 35
<211> LENGTH: 24
<212> TYPE: DNA
<213> ORGANISM: Artificial Sequence
<220> FEATURE:
<223> OTHER INFORMATION: Synthetic primer

```
<400> SEQUENCE: 35
tacgacatga acggctgcta ctca                                          24

<210> SEQ ID NO 36
<211> LENGTH: 24
<212> TYPE: DNA
<213> ORGANISM: Artificial Sequence
<220> FEATURE:
<223> OTHER INFORMATION: Synthetic primer

<400> SEQUENCE: 36
ttacatgctg caggatctcc acct                                          24

<210> SEQ ID NO 37
<211> LENGTH: 8
<212> TYPE: DNA
<213> ORGANISM: Artificial Sequence
<220> FEATURE:
<223> OTHER INFORMATION: Motif

<400> SEQUENCE: 37 vcasctgm                                                             8

<210> SEQ ID NO 38
<211> LENGTH: 12
<212> TYPE: DNA
<213> ORGANISM: Artificial Sequence
<220> FEATURE:
<223> OTHER INFORMATION: Motif

<400> SEQUENCE: 38
thvdbasaav rw                                                       12

<210> SEQ ID NO 39
<211> LENGTH: 10
<212> TYPE: DNA
<213> ORGANISM: Artificial Sequence
<220> FEATURE:
<223> OTHER INFORMATION: Motif
<220> FEATURE:
<221> NAME/KEY: misc_feature
<222> LOCATION: (1)..(1)
<223> OTHER INFORMATION: n is a, c, g, or t

<400> SEQUENCE: 39 nwkscsabad                                                          10

<210> SEQ ID NO 40
<211> LENGTH: 29
<212> TYPE: RNA
<213> ORGANISM: Artificial Sequence
<220> FEATURE:
<223> OTHER INFORMATION: Predicted miRNA sites in Dkk3

<400> SEQUENCE: 40
ccagcugagu cacugguaga ugugcaaua                                     29

<210> SEQ ID NO 41
<211> LENGTH: 22
<212> TYPE: RNA
<213> ORGANISM: Artificial Sequence
<220> FEATURE:
<223> OTHER INFORMATION: predicted miR-25 sites

<400> SEQUENCE: 41
agucuggcuc uguucacguu ac                                            22
```

<210> SEQ ID NO 42
<211> LENGTH: 29
<212> TYPE: RNA
<213> ORGANISM: Artificial Sequence
<220> FEATURE:
<223> OTHER INFORMATION: predicted miR-25 sites

<400> SEQUENCE: 42
gauacuguaa caaaacggcu gaagcaaug                                   29

<210> SEQ ID NO 43
<211> LENGTH: 22
<212> TYPE: RNA
<213> ORGANISM: Artificial Sequence
<220> FEATURE:
<223> OTHER INFORMATION: predicted miR-25 sites

<400> SEQUENCE: 43
agucuggcuc uguucacguu ac                                          22

<210> SEQ ID NO 44
<211> LENGTH: 29
<212> TYPE: RNA
<213> ORGANISM: Artificial Sequence
<220> FEATURE:
<223> OTHER INFORMATION: predicted miR-25 sites

<400> SEQUENCE: 44
cuuucuggcu aacaggagag ugggcaaug                                   29

<210> SEQ ID NO 45
<211> LENGTH: 22
<212> TYPE: RNA
<213> ORGANISM: Artificial Sequence
<220> FEATURE:
<223> OTHER INFORMATION: predicted miR-25 sites

<400> SEQUENCE: 45
agucuggcuc uguucacguu ac                                          22

<210> SEQ ID NO 46
<211> LENGTH: 29
<212> TYPE: RNA
<213> ORGANISM: Artificial Sequence
<220> FEATURE:
<223> OTHER INFORMATION: let-7 sites in Klf4 3'UTR

<400> SEQUENCE: 46
cggaggaaga ggaagcgauu cagguacag                                   29

<210> SEQ ID NO 47
<211> LENGTH: 22
<212> TYPE: RNA
<213> ORGANISM: Artificial Sequence
<220> FEATURE:
<223> OTHER INFORMATION: let-7 sites in Klf4 3'UTR

<400> SEQUENCE: 47
ccuuucgauc uuccaacaug uc                                          22

<210> SEQ ID NO 48
<211> LENGTH: 29
<212> TYPE: RNA
<213> ORGANISM: Artificial Sequence
<220> FEATURE:

```
<223> OTHER INFORMATION: let-7 sites in Klf4 3'UTR

<400> SEQUENCE: 48
ugguuucaga ugugcaauaa uuuguacaa                                      29

<210> SEQ ID NO 49
<211> LENGTH: 19
<212> TYPE: RNA
<213> ORGANISM: Artificial Sequence
<220> FEATURE:
<223> OTHER INFORMATION: let-7 sites in Klf4 3'UTR

<400> SEQUENCE: 49
uucgaucuuc caacauguc                                                 19

<210> SEQ ID NO 50
<211> LENGTH: 2295
<212> TYPE: DNA
<213> ORGANISM: Homo sapiens

<400> SEQUENCE: 50
gccagacacg cagccactga accacaagca gcttcgcgtt aactggagtg cctgggagtc      60
gcgtgccagg agccgcacgg ccagggactg actgacagag agacacgcac caccaccaca     120
acacacgaga cccgggcggg ccgccgccgc cgccgccggg gctcttggca aactcgccgg     180
tcgcagaggt cccccgcgga gctgcgccac agtagcgccg ggcttgcagc tttcacgccg     240
ggcgaaggac ccggcgctgc gctcgcagct gcgcggagat tcccggcaca ggccaaagtc     300
acagcaacgc tgaggcacag ttagagccaa ctaagatgtt cgtcaaatcc gagaccttgg     360
agttgaagga ggaagaggac gtgttagtgc tgctcggatc ggcctccccc gccttggcgg     420
ccctgacccc gctgtcatcc agcgccgacg aagaagagga ggaggagccg ggcgcgtcag     480 gcgggggcgcg tcggcagcgc ggggctgagg ccgggcaggg ggcgcgggcg ggcgtggctg     540
cgggtgcgga gggctgccgg cccgcacggc tgctgggtct ggtacacgat tgcaaacggc     600
gcccttcccg ggcgcgggcc gtctcccgag gcgccaagac ggccgagacg gtgcagcgca     660
tcaagaagac ccgtagactg aaggccaaca accgcgagcg aaaccgcatg cacaacctca     720
acgcggcact ggacgcgctg cgcgaggtgc tccccacgtt ccccgaggac gccaagctca     780
ccaagatcga gaccctgcgc ttcgcccaca actacatctg gcactcacc gagaccctgc      840 gcctggcgga tcactgcggg gcggcggcg ggggcctgcc gggggcgctc ttctccgagg      900
cagtgttgct gagcccggga ggagccgcg ccgccctgag cagcagcgga gacagcccct      960
cgcccgcctc cacgtggagt tgcaccaaca gccccgcgcc gtcctcctcc gtgtcctcca    1020 attccaacctc cccctacagc tgcactttat cgcccgccag cccggccggg tcagacatgg    1080
actattggca gcccccacct cccgacaagc accgctatgc acctcacctc cccatagcca    1140
gggattgtat ctagagctgc catttctgct acccacgcca ggccttagtg ggttcccttt    1200
cctgtcccca gtcgagccct cctcccttcc cctgcccctc ctttccacgc cctggaaacc    1260
atctcacttc acagggcagg tgtagccttt ctgattcctc ggttgtttct tgcatttctt    1320
ggctttgggt atccttcatt cagacgggct ctgattact gaaggtgtga tggagcttat     1380
tgtcaaagcc aagggtggcg ttttgggggc gcttcttgag acgaaaaaga ccctgggaag    1440
agatgatggt ggcatatcta aagagtttgc agagcggact gacgctcctc ccctttctct    1500
ttaacgccga aggacttggt gcagttcgtg tgaatctcac aggggaatg caactggttc      1560 ctgtgatctc ttcacctttg cttctacata gagatgttaa tgtcgagtag aaagaaatgt    1620
```

```
atcttagcat ctgaatgatt ttgctggtaa taatattatc cacagatttg caatggctgg    1680
catctgcttt attcccattg ctgtctgcag gctgtgggaa tttcacctgt caaaccaaac    1740
ttccctctct gatgtgcact ttgttctgtt tcccagattc gtcacaatgc ctattgtcct    1800
gtccttctct ttccttttc ttccccattt tgccatctgt ctcttatgat ttataagggg     1860
aaaaaaactt gttttgttag aggggcaggt tagaagtcat tgtataattt gtaggctttg    1920
taatgattga atgcaagcgt ggaaatttag gctgaactct ctatcaaaag gaaaaatgtg    1980
gaggaaaagg gaaaaatcag gagggaggat tgcctcatgt attatttatt tcgaccttt     2040 aggggagaag gaactcccc attctttcaa gagattaaaa ataaatcaac agtctgaaaa     2100
cctaagcaga cacggagcat tatccggatc agccacacac gtgttccctt ctatttatta    2160
taaagaaatt tttcatggga aaatatgtat tttttgtata ttctacagag tttattctag    2220
tatgtattta catcttgaag aacaagaaag ttgttcttgt gattaaacta taaataaact    2280
atctaatttt cataa                                                    2295

<210> SEQ ID NO 51
<211> LENGTH: 1200
<212> TYPE: DNA
<213> ORGANISM: Homo sapiens

<400> SEQUENCE: 51
gttcgttgca acaaattgat gagcaatgct tttttataat gccaactttg tacaaaaaag      60
ttggcatgac caaatcgtac agcgagagtg ggctgatggg cgagcctcag ccccaaggtc     120
ctccaagctg gacagacgag tgtctcagtt ctcaggacga ggagcacgag gcagacaaga     180
aggaggacga cctcgaagcc atgaacgcag aggaggactc actgaggaac gggggagagg     240
aggaggacga agatgaggac ctggaagagg aggaagaaga ggaagaggag gatgacgatc     300
aaaagcccaa gagacgcggc cccaaaaaga agaagatgac taaggctcgc ctggagcgtt     360
ttaaattgag acgcatgaag gctaacgccc gggagcggaa ccgcatgcac ggactgaacg     420
cggcgctaga caacctgcgc aaggtggtgc cttgctattc taagacgcag aagctgtcca     480
aaatcgagac tctgcgcttg gccaagaact acatctgggc tctgtcggag atcctgcgct     540
caggcaaaag cccagacctg gtctccttcg ttcagacgct ttgcaagggc ttatcccaac     600
ccaccaccaa cctggttgcg ggctgcctgc aactcaatcc tcggactttt ctgcctgagc     660
agaaccagga catgcccccc cacctgccga cggccagcgc ttccttccct gtacacccct     720
actcctacca gtcgcctggg ctgcccagtc cgccttacgg taccatggac agctcccatg     780
tcttccaggt taagcctccg ccgcacgcct acagcgcagc gctggagccc ttctttgaaa     840
gccctctgac tgattgcacc agcccttcct ttgatggacc cctcagcccg ccgctcagca     900
tcaatggcaa cttctctttc aaacacgaac cgtccgccga gtttgagaaa aattatgcct     960
ttaccatgca ctatcctgca gcgacactgg caggggccca aagccacgga tcaatcttct    1020
caggcaccgc tgcccctcgc tgcgagatcc ccatagacaa tattatgtcc ttcgatagcc    1080
attcacatca tgagcgagtc atgagtgccc agctcaatgc catatttcat gattacccaa    1140
ctttcttgta caaagttggc attataagaa agcattgctt atcaatttgt tgcaacgaac    1200
```

METHODS AND COMPOSITIONS FOR REPROGRAMMING MÜLLER GLIA

ACKNOWLEDGEMENT OF GOVERNMENT SUPPORT

This invention was made with government support under Grant Nos. F31 EY028412 and R01 EY021482, awarded by the National Institutes of Health. The government has certain rights in the invention.

REFERENCE TO A SEQUENCE LISTING SUBMITTED VIA EFS-WEB

The content of the ASCII text file of the sequence listing named "UW70WOU1_seq" which is 93 kb in size was created on Apr. 28, 2020, and electronically submitted via EFS-Web herewith the application is incorporated herein by reference in its entirety.

BACKGROUND

Some of the leading causes of blindness involve the loss of one or more types of retinal neurons. Age-related macular degeneration, glaucoma, ischemia, retinal arterial occlusion and inherited retinal diseases, such as Retinitis Pigmentosa or Usher's syndrome all ultimately lead to irreversible degeneration of photoreceptors or other retinal neurons. In mammalian retinas, lost neurons are not spontaneously regenerated, and currently, there are no effective therapies to replace the degenerated neurons in patients with retinal disease. By contrast, retinas of nonmammalian vertebrates, such as fish and amphibians, show a robust regenerative response upon retinal damage. Upon injury to the retina, fish Müller Glia (MG) re-enter the cell cycle to generate a progenitor, which proliferates, and generates different types of retinal neurons to replace those that were lost.

One key difference between fish and mouse MG in the response to retinal injury is the expression of the proneural transcription factor, Ascl1. This factor is necessary for regeneration in fish retina, but is not expressed in mammalian MG after injury. When we over-expressed Ascl1 in mouse MG with a lentivirus, we found that this single factor could reprogram them into neurogenic progenitors in vitro. When Ascl1 expression is induced in adult MG, the combination of Ascl1 and histone deacetylase (HDAC) inhibition can stimulate new neuron production from MG in adult mice after neuronal damage. The MG-derived neurons form connections with the existing retinal circuitry. Patch-clamp recordings from MG-derived neurons in retinal slices shows that they have neuronal-like light responses. Epigenetic analyses show that chromatin remodelers can produce a neurogenic potential to adult MG by making previously inaccessible neuronal genes open to proneural transcription factors, like Ascl1. In addition, a specific micro-RNA, miR-124, can induce expression of Ascl1 in Müller glial cells, and reprogram them to a neurogenic state, resulting in neuron production. Only a small percentage of MG are reprogrammed using these previous methods, however, limiting their promise for therapeutic applications. We also showed that Ascl1 expression and the resulting neurogenesis from MG can be significantly enhanced by inhibition of the Jak/STAT pathway, and/or by use of other reprogramming potentiating agents such as RNAi-based Ascl1 activators. However, these approaches require both retinal injury and co-administration of compositions comprising reprogramming potentiating agents (e.g., small molecules) which complicate and limit commercial application.

There are numerous diseases that cause the loss of specific neuronal populations in the retina resulting in blindness. As such, there remains a need to stimulate regeneration in the human retina for the development of new types of regenerative therapies for patients.

SUMMARY

Described herein are compositions, nucleic acid molecules and methods for inducing retinal regeneration and reprogramming of Müller glia (MG) into retinal neurons in a subject.

Disclosed herein is a nucleic acid molecule comprising a nucleic acid sequence encoding two or more proneural bHLH transcription factors. Representative examples of proneural bHLH transcription factors include, but are not limited to, Ascl1, Atonal7 (also known as Math5), Atoh1 (also known as Math1), Neurogenin-2, and Neuronal Differentiation 1 (Neurod1).

In one embodiment, the nucleic acid molecule comprises a nucleic acid sequence encoding Ascl1 and Atoh1. In another embodiment, the nucleic acid molecule comprises a nucleic acid sequence encoding Ascl1 and Atoh7. In another embodiment, the nucleic acid molecule comprises a nucleic acid sequence encoding Atoh1 and Atoh7. In another embodiment, the nucleic acid molecule comprises a nucleic acid sequence encoding Ascl1, Atoh1 and Atoh7. In some embodiments, the nucleic acid molecule comprises a nucleic acid sequence encoding two, three, four, or all five of Ascl1, Atonal7, Atoh1, Neurogenin-2, and Neurod1.

Also disclosed herein is a method for inducing retinal regeneration in a subject comprising: a) administering to a retina of the subject a nucleic acid molecule comprising a nucleic acid sequence encoding two or more proneural bHLH transcription factors selected from the group consisting of Ascl1+Atoh1, Ascl1+Atoh7, Atoh1+Atoh7, and Ascl1+Atoh1+Atoh7. In some embodiments, the nucleic acid molecule comprises a nucleic acid sequence encoding two, three, four, or all five of Ascl1, Atonal7, Atoh1, Neurogenin-2, and Neurod1.

In additional embodiments, the nucleic acid molecules and methods disclosed herein stimulate production of functional neurons from reprogrammed MG. In another embodiment, the number of the MG-derived functional neurons is increased. In another embodiment, the number of functional neurons is increased by 40%. In another embodiment, the subject is treated for retinal disease, damage or degeneration in the retina. In another embodiment, the subject is an adult. In another embodiment, a vector comprises the nucleic acid molecule. In one embodiment, the vector is a non-viral vector or a viral vector, and the viral vector is an adeno-associated viral (AAV) vector or a lentiviral vector. In an additional embodiment, a promoter sequence is in operable linkage with the nucleic acid encoding Ascl1. In one embodiment, the promoter is a retinal or MG-specific promoter. In one embodiment, administering to the retina is intravitreal or subretinal injection.

Also, in another embodiment, the nucleic add molecules disclosed herein comprise an MG-specific promoter sequence. In one embodiment, the MG-specific promoter sequence is a Rbpl1 promoter sequence or a portion thereof. In other embodiments, the nucleic add sequence comprises an IRES or 2A self-cleaving sites situated between the sequences encoding the proneural bHLH transcription factors, for example, in a multicistronic or polycistronic configuration. In another embodiment, the proneural bHLH transcription factors are expressed as a fusion protein.

Also provided herein are methods for inducing retinal regeneration comprising administering to a subject a composition as described herein. In some embodiments, the methods are effective to increase the number of Müller glial-derived neurons, to induce Müller glial cells to enter the mitotic cell cycle, and/or to generate new retinal neurons. In some embodiments, the new retinal neurons are bipolar neurons. In some embodiments of the method, the number of retinal neurons increases by at least 40% relative to a baseline level or other reference amount representative of an untreated retina. In some embodiments, the number of retinal neurons increases by 10%, 20%, 25%, 50%, 100%, 150%, 200%, or more.

The subject in the methods disclosed herein is typically a mammal, such as a human or veterinary subject. In one embodiment, the subject is an adult. The subject, in some embodiments, has a retinal degenerative disease. Examples of such retinal degenerative diseases include, hut are not limited to, Age-related macular degeneration, glaucoma, ischemia, central retinal arterial occlusion and inherited retinal diseases, such as Retinitis Pigmentosa or Usher's syndrome.

BRIEF DESCRIPTION OF THE DRAWINGS

FIG. 1 shows Atoh1 (upper panel), GFP (middle panel), and DAPI (lower panel) staining in the same tissue. All GFP+ cells with MG morphology fail to express Atoh1. All GFP+ cells with neuronal morphology express Atoh1.

DETAILED DESCRIPTION

Figure 1:
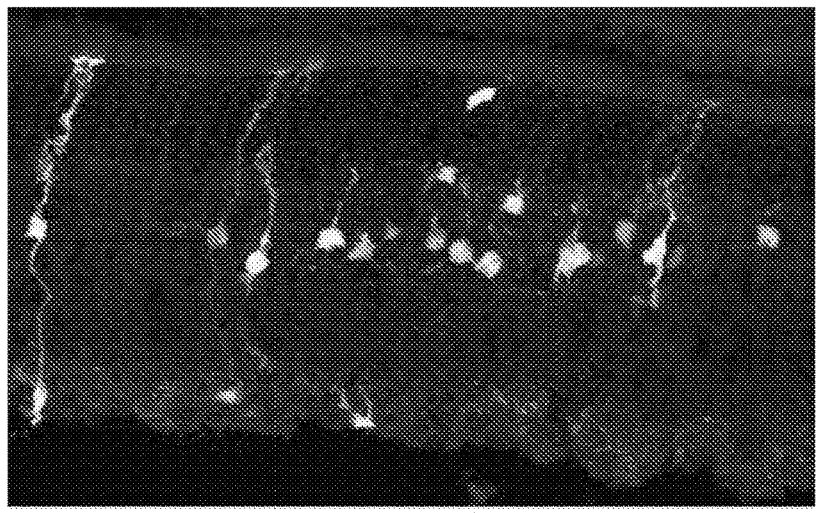
FIG. 1 shows the overexpression of Atoh1 and Ascl1 in adult mice. The experimental paradigm described is in Example 1 (Glast-CreER; Glox-stop-LNL-tTA; tetO-Ascl1-IRES-GFP; tetO-Atoh1 mice being injected with 5 consecutive daily intraperitoneal injections of tamoxifen; retinas collected 3-6 weeks after last tamoxifen injection).
Figure 1:
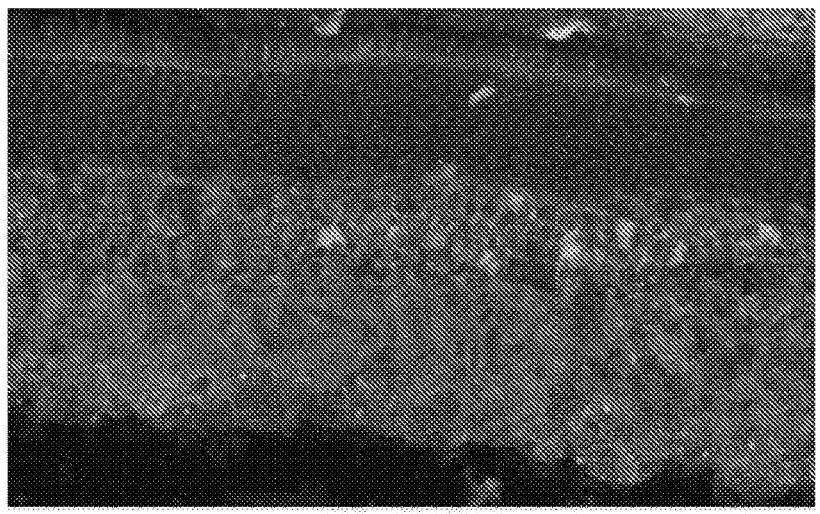
Figure 1:
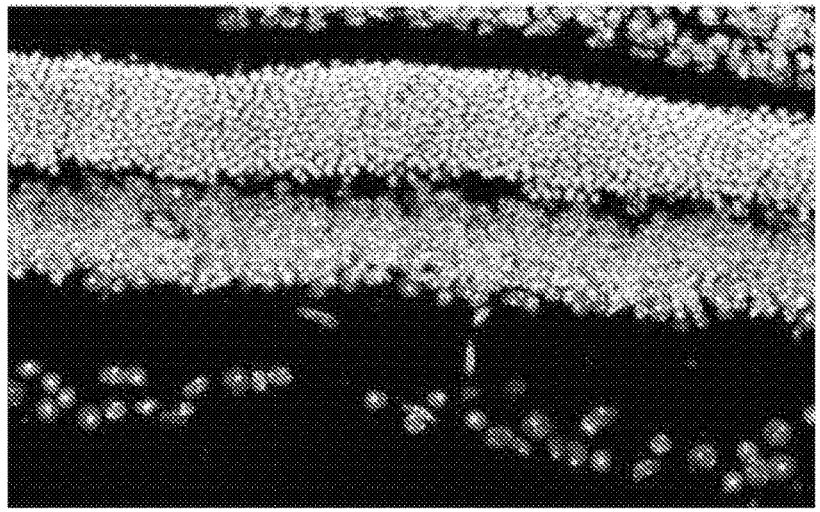

The bHLH transcription factors play a key role in development and cell activity. The proteins are characterized by a basic helix-bop-helix (bHLH), the majority of which are heterodimeric because their activity is highly regulated by the dimerization of the subunits.

The proneural Achaete-scute family bHLH transcription factor 1 (Ascl1) gene encodes a member of the basic helix-loop-helix (BHLH) family of transcription factors. The protein activates transcription by binding to the E box (5'-CANNTG-3'). Dimerization with other bHLH proteins is required for efficient DNA binding.

An exemplary nucleic acid sequence encoding human Ascl1 can be found at NCBI Reference Sequence number NG_008950.1 and also provided herein as SEQ ID NO: 1. In another embodiment disclosed herein is a nucleic acid sequence encoding a human Ascl1 amino acid sequence or portion thereof of UniProtKB/Swiss-Prot: P50553.2, provided herein as SEQ ID NO: 2. Ascl1 homologues, e.g., derived from species such as murine, canine, equine, are included herein, without limitation.

The Protein Atonal Homolog 1 (Atoh1) is a proneural member of the family of bHLH transcription factors. The protein activates a slightly different E box than the Ascl1 gene.

An exemplary nucleic acid sequence encoding human Atoh1 can be found at NCBI Reference Sequence number NM_005172.1 and also provided herein as SEQ ID NO: 3. In another embodiment disclosed herein is a nucleic acid sequence encoding a human Atoh1 amino add sequence or portion thereof of NP_005163.1, provided herein as SEQ ID NO: 4. Atoh1 homologs, orthologs and/or paralogs, e.g., derived from species such as murine, canine, equine, are included herein, without limitation.

The Atoh7 family bHLH transcription factor 7 (Atoh7) gene encodes a proneural member of the basic helix-loop-helix (BHLH) family of transcription factors.

An exemplary nucleic acid sequence encoding human Atoh7 can be found at NCBI Reference Sequence number NM_008553.4 and also provided herein as SEQ ID NO: 5. In another embodiment disclosed herein is a nucleic acid sequence encoding a human Atoh7 amino acid sequence or portion thereof of NP_660161.1, provided herein as SEQ ID NO: 6. Atoh7 homologs, orthologs, and/paralogs, e.g., derived from species such as murine, canine, equine, are included herein, without limitation. An exemplary nucleic acid sequence encoding Neurogenin-2 (also known as NEUROG2 and NGN-2) can be found at NCBI Reference Sequence number NM_024019 and also provided herein as SEQ ID NO: 50. An exemplary nucleic acid sequence encoding Neurod1 can be found at NCBI Reference Sequence number KR709666 and also provided herein as SEQ ID NO: 51.

Exemplary nucleic acid sequences of the Ascl1, Atoh1, and/or Atoh7 or other proneural bHLH transcription factor for use herein include, without limitation, portions thereof of the corresponding sequences of Ascl1, Atoh1, and/or Atoh7, for the purposes of configurating multicistronic, bicistronic, and/or tricistronic constructs, plasmids, and/or expression vectors.

The invention described herein is based on the discovery that intraocular gene-based delivery and expression of two or more proneural bHLH transcription factors in the retina stimulates regeneration of retinal interneurons from retinal Müller glia (MG) and reprograms the MG into bipolar, amacrine, horizontal, and/or ganglion cells.

Specifically, expression of Ascl1 and Atoh1 in the retina produced a robust reprogramming effect in MG. Surprisingly, we show that MG reprogramming occurs in adult mammals in the absence of retinal injury or additional small molecule-type reprogramming potentiating agents (e.g., HDAC inhibitors and/or Jak/STAT inhibitors and/or RNAi-based Ascl1 activators). Additionally, we show that expressing these proneural bHLH transcription factors in injured retinas similarly results in reprogramming of MG into new neurons which are able to integrate into the retinal circuitry and respond to light stimulus. We have characterized these Müller glial-derived retinal neurons with immunohistochemical staining, single-cell RNA-sequencing, electrophysiological whole-cell recordings, and various epigenetic assays and have confirmed that the new neurons highly resemble nascent retinal neurons. Atoh1, like Ascl1, belongs to the bHLH family of transcription factors. Atoh1, however, is in a different subclass of bHLH factors and binds to a related but not identical E-box sequence in the DNA to activate transcription. It is known that Atoh1 is important for hair cell development in the inner ear but it is not normally expressed in the developing or mature retina. It is also known that the highly related gene to Atoh1, Atoh7, is expressed in the developing retina and is important for ganglion cell development in mice. Accordingly, disclosed herein is the intraocular vector-based delivery of two or more genes encoding these families of proneural bHLH transcription factors into the retina of blind patients to infect Müller glial (MG) cells so that reprogramming of the MG to retinal neurons treats retinal degenerative disease as well as restoration of vision after injury, disease, or loss.

Reprogramming of MG and regeneration of retinal neurons is particularly important for developing therapeutic products and methods for a range of degenerative ocular diseases such as, for example, and without limitation, retinal degeneration caused by diabetic retinopathy, glaucoma, and age-related macular degeneration. One such retinal degenerative disease is known as central retinal artery occlusion (CRAO), wherein blood flow through the central retinal artery is blocked or occluded often resulting in loss of vision. CRAO is caused by thromboembolus, carotid artery atherosclerosis, giant cell arteritis, aneurysms or arterial spasms. Current treatment paradigms for many of these types of degenerative diseases of the retina, particularly for CRAO, show little to no definitive improvement in outcomes.

DEFINITIONS

All scientific and technical terms used in this application have meanings commonly used in the art unless otherwise specified. As used in this application, the following words or phrases have the meanings specified.

As used herein, the term "comprising" is intended to mean that the compositions and methods include the recited elements, but do not exclude others. As used herein, the transitional phrase "consisting essentially of" (and grammatical variants) is to be interpreted as encompassing the recited materials or steps "and those that do not materially affect the basic and novel characteristic(s)" of the recited embodiment. Thus, the term "consisting essentially of" as used herein should not be interpreted as equivalent to "comprising." "Consisting of" shall mean excluding more than trace elements of other ingredients and substantial method steps for administering the compositions disclosed herein. Aspects defined by each of these transition terms are within the scope of the disclosure herein.

As used herein, "retinal neuron" refers to any of the five types of neurons in the retina: photoreceptors, bipolar cells, ganglion cells, horizontal cells, and amacrine cells. In some particular embodiments, the retinal neurons are bipolar neurons, amacrine, horizontal, and ganglion cells.

As used herein, the terms "nucleic acid sequence" or "polynucleotide" refers to nucleotides of any length which are deoxynucleotides (i.e. DNAs), or derivatives thereof; ribonucleotides (i.e. RNAs) or derivatives thereof; or peptide nucleic acids (PNAs) or derivatives thereof. The terms include, without limitation, single-stranded, double-stranded, or mufti-stranded DNA or RNA, genomic DNA, cDNA, DNA-RNA hybrids, oligonucleotides (oligos), or other natural, synthetic, modified, mutated or non-natural forms of DNA or RNA.

MicroRNAs, or "miRNAs", or "miRs", are short, non-coding RNAs that regulate gene expression by post-transcriptional regulation of target genes.

"Short hairpin RNAs" or "shRNAs" are synthetic or non-natural RNA molecules. shRNA refers to RNA with a tight hairpin turn used to silence (via RNA interference or RNAi) target gene expression in a cell. An shRNA is typically delivered via an expression vector such as a DNA plasmid or via viral vectors.

The term "vector" refers to, without limitation, a recombinant genetic construct or plasmid or expression construct or expression vector that retains the ability to infect and transduce non-dividing and/or slowly-dividing cells and integrate into the target cell's genome. The vector may be derived from or based on a wild-type virus. Aspects of this disclosure relate to an adeno-associated virus vector, an adenovirus vector, and a lentivirus vector.

The term "expression control element" as used herein refers to any sequence that regulates the expression of a coding sequence, such as a gene. Exemplary expression control elements include but are not limited to promoters, enhancers, microRNAs, post-transcriptional regulatory elements, polyadenylation signal sequences, and introns. Expression control elements may be, without limitation, constitutive, inducible, repressible, or tissue-specific. A "promoter" is a control sequence that is a region of a polynucleotide sequence at which initiation and rate of transcription are controlled. It may contain genetic elements at which regulatory proteins and molecules may bind such as RNA polymerase and other transcription factors. In some embodiments, expression control by a promoter is tissue-specific. An "enhancer" is a region of DNA that can be bound by activating proteins to increase the likelihood or frequency of transcription. Non-limiting exemplary enhancers and posttranscriptional regulatory elements include the CMV enhancer and \A/PRE.

The term "multicistronic" or "polycistronic" or "bicistronic" or tricistronic" refers to mRNA with multiple, i.e., double or triple coding areas or exons, and as such will have the capability to express from mRNA two or more, or three or more, or four or more, etc., proteins from a single construct. Multicistronic vectors simultaneously express two or more separate proteins from the same mRNA. The two strategies most widely used for constructing multicistronic configurations are through the use of 1) an IRES or 2) a 2A self-cleaving site. An "IRES" refers to an internal ribosome entry site or portion thereof of viral, prokaryotic, or eukaryotic origin which are used within polycistronic vector constructs. In some embodiments, an IRES is an RNA element that allows for translation initiation in a cap-independent manner. The term "self-cleaving peptides" or "sequences encoding self-cleaving peptides" or "2A self-cleaving site" refer to linking sequences which are used within vector constructs to incorporate sites to promote ribosomal skipping and thus to generate two polypeptides from a single promoter, such self-cleaving peptides include without limitation, T2A, and P2A peptides or sequences encoding the self-cleaving peptides.

The term "substantially complementary," when used to define either amino acid or nucleic acid sequences, means that a particular sequence, for example, an oligonucleotide sequence, is substantially complementary to the sequence of miR-214 referenced. As such, typically the sequences will be highly complementary to the microRNA "target" sequence, and will have no more than 1, 2, 3, 4, 5, 6, 7, 8, 9, or 10 base mismatches throughout the sequence. In many instances, it may be desirable for the sequences to be exact matches, i.e. be completely complementary to the sequence to which the nucleic acid specifically binds, and therefore have zero mismatches along the complementary stretch. As such, highly complementary sequences will typically bind quite specifically to the target sequence region and will therefore be highly efficient in reducing, and/or even inhibiting the biological activity of the target sequence.

Substantially complementary nucleic acid sequences will be greater than about 80 percent complementary (or '% exact-match') to the corresponding target sequence to which the nucleic acid specifically binds, and will, more preferably be greater than about 85 percent complementary to the corresponding target sequence to which the nucleic acid specifically binds. In certain aspects, as described above, it will be desirable to have even more substantially complementary nucleic acid sequences for use in the practice of the invention, and in such instances, the nucleic acid sequences will be greater than about 90 percent complementary to the corresponding target sequence to which the nucleic acid specifically binds, and may in certain embodiments be greater than about 95 percent complementary to the corresponding target sequence to which the nucleic acid specifically binds, and even up to and including 96%, 97%, 98%, 99%, and even 100% exact match complementary to the target to which the designed nucleic acid specifically binds.

"Homology" or "identity" or "similarity" refers to sequence similarity between two peptides or between two nucleic acid molecules. Homology can be determined by comparing a position in each sequence which may be aligned for purposes of comparison. When a position in the compared sequence is occupied by the same base or amino acid, then the molecules are homologous at that position. A degree of homology between sequences is a function of the number of matching or homologous positions shared by the sequences. An "unrelated" or "non-homologous" sequence shares less than 40% identity, or alternatively less than 25% identity, with one of the sequences of disclosed herein.

Percent similarity or percent complementary of any of the disclosed sequences may be determined; for example, by comparing sequence information using the GAP computer program, version 6.0, available from the University of Wisconsin Genetics Computer Group (UWGCG). The GAP program utilizes the alignment method of Needleman and Wunsch (1970). Briefly, the GAP program defines similarity as the number of aligned symbols (i.e., nucleotides or amino acids) which are similar, divided by the total number of symbols in the shorter of the two sequences. The preferred default parameters for the GAP program include: (1) a unary comparison matrix (containing a value of 1 for identities and 0 for non-identities) for nucleotides, and the weighted comparison matrix of Gribskov and Burgess (1986); (2) a penalty of 3.0 for each gap and an additional 0.10 penalty for each symbol in each gap; and (3) no penalty for end gaps.

"Nucleotide sequence" refers to a heteropolymer of deoxyribonucleotides, ribonucleotides, or peptide-nucleic acid sequences that may be assembled from smaller fragments, isolated from larger fragments, or chemically synthesized de novo or partially synthesized by combining shorter oligonucleotide linkers, or from a series of oligonucleotides, to provide a sequence which is capable of specifically binding to a target molecule and acting as an antisense construct to alter, reduce, or inhibit the biological activity of the target.

As used herein, "directed against", in the context of antisense oligonucleotides, means the antisense oligonucleotide binds to a target miRNA and blocks or suppresses activity of the target.

As used herein, the terms "protein", "peptide", and "polypeptide" refer to amino acid subunits, amino acid analogs, or peptidomimetics. The subunits may be linked by peptide bonds. In another aspect, the subunit may be linked by other bonds, e.g., ester, ether, etc. As used herein the term "amino acid" refers to either natural and/or unnatural or synthetic amino acids.

As used herein, the term "recombinant expression system" or "recombinant expression vector" refers to a genetic construct for the expression of certain genetic material formed by recombination.

The term "effective amount" or "therapeutically effective amount" or "prophylactically effective amount", refer to an amount of an active agent described herein that is effective to provide the desired/intended result and/or biological activity. Thus, for example, in various embodiments, an effective amount of a composition described herein is an amount that is effective to result in regeneration of retinal neurons, and/or to improve or to ameliorate symptoms of and/or to treat retinal degenerative diseases.

When the disclosure herein relates to a small molecule, polypeptide, protein, polynucleotide, nucleic acid, oligonucleotide, antisense, or miRNA, an equivalent or a biologically equivalent of such is intended within the scope of this disclosure. As used herein, the term "biological equivalent thereof" is intended to be synonymous with "equivalent thereof" when referring to a reference small molecule, polypeptide, protein, polynucleotide, nucleic acid, oligonucleotide, antisense, or miRNA even those reference molecules having minimal homology while still maintaining desired structure or functionality. Unless specifically recited herein, it is contemplated that any nucleic acid, polynucleotide, oligonucleotide, antisense, miRNA, polypeptide, or protein mentioned herein also includes equivalents thereof. For example, an equivalent intends at least about 70% homology or identity, or at least 80% homology or identity and alternatively, or at least about 85%, or alternatively at least about 90%, or alternatively at least about 95%, or alternatively 98% percent homology or identity and exhibits substantially equivalent biological activity to the reference protein, polypeptide or nucleic acid. Alternatively, when referring to polynucleotides, an equivalent thereof is a polynucleotide that hybridizes under stringent conditions to the reference polynucleotide or its complement.

In some embodiments disclosed herein, the polypeptide and/or polynucleotide sequences are provided herein for use in gene and protein transfer and expression techniques described below. Such sequences provided herein can be used to provide the expression product as well as substantially identical sequences that produce a protein that has the same biological properties. These "biologically equivalent" or "biologically active" or "equivalent" polypeptides are encoded by equivalent polynucleotides as described herein. They may possess at least 60%, or alternatively, at least 65%, or alternatively, at least 70%, or alternatively, at least 75%, or alternatively, at least 80%, or alternatively at least 85%, or alternatively at least 90%, or alternatively at least 95% or alternatively at least 98%, identical primary amino acid sequence to the reference polypeptide when compared using sequence identity methods run under default conditions. Specific polynucleotide or polypeptide sequences are provided as examples of particular embodiments. Modifications may be made to the amino acid sequences by using alternate amino acids that have similar charge. Additionally, an equivalent polynucleotide is one that hybridizes under stringent conditions to the reference polynucleotide or its complement or in reference to a polypeptide, a polypeptide encoded by a polynucleotide that hybridizes to the reference encoding polynucleotide under stringent conditions or its complementary strand. Alternatively, an equivalent polypeptide or protein is one that is expressed from an equivalent polynucleotide.

"Hybridization" refers to a reaction in which one or more polynucleotides react to form a complex that is stabilized via hydrogen bonding between the bases of the nucleotide residues. The hydrogen bonding may occur by Watson-Crick base pairing; Hoogstein binding, or in any other sequence-specific manner. The complex may comprise two strands forming a duplex structure, three or more strands forming a multi-stranded complex, a single self-hybridizing strand, or any combination of these. A hybridization reaction may constitute a step in a more extensive process, such as the initiation of a PC reaction, or the enzymatic cleavage of a polynucleotide by a ribozyme.

Examples of stringent hybridization conditions include: incubation temperatures of about 25° C. to about 37° C.; hybridization buffer concentrations of about 6×SSC to about 10× SSC; formamide concentrations of about 0% to about 25%; and wash solutions from about 4×SSC to about 8×SSC. Examples of moderate hybridization conditions include: incubation temperatures of about 40° C. to about 50° C.; buffer concentrations of about 9×SSC to about 2×SSC; formamide concentrations of about 30% to about 50%; and wash solutions of about 5×SSC to about 2×SSC. Examples of high stringency conditions include: incubation temperatures of about 55° C. to about 68° C.; buffer concentrations of about 1×SSC to about 0.1×SSC; formamide concentrations of about 55% to about 75%; and wash solutions of about 1×SSC, 0.1×SSC, or deionized water. In general, hybridization incubation times are from 5 minutes to 24 hours, with 1, 2, or more washing steps, and wash incubation times are about 1, 2; or 15 minutes. SSC is 0.15 M NaCl and 15 mM citrate buffer. It is understood that equivalents of SSC using other buffer systems can be employed.

As used herein, "treating" or "treatment" of a retinal degenerative disease in a subject refers to (1) preventing the symptoms or disease from occurring in a subject that is predisposed or does not yet display symptoms of the disease; (2) inhibiting the disease or arresting its development; or (3) ameliorating or causing regression of the disease or the symptoms of the disease. As understood in the art, "treatment" is an approach for obtaining beneficial or desired results, including clinical results. For the purposes of the compositions, combination therapy, nucleic acid molecules, and methods disclosed herein for inducing neurogenesis from MG and/or generating functional neurons from MG, beneficial or desired results can include one or more, but are not limited to, alleviation or amelioration of one or more symptoms of retinal degeneration, diminishment of extent of a retinal degenerative condition (including a retinal degenerative disease), stabilized (i.e., not worsening) state of a retinal degenerative condition (including disease); delay or slowing of a retinal degenerative condition (including disease), progression, amelioration or palliation of a retinal degenerative condition (including disease), states of and remission of (whether partial or total) retinal degeneration, whether detectable or undetectable.

As used herein, the term "isolated" means that a naturally occurring DNA fragment, DNA molecule, coding sequence, or oligonucleotide is removed from its natural environment, or is a synthetic molecule or cloned product. Preferably, the DNA fragment, DNA molecule, coding sequence, or oligonucleotide is purified, i.e., essentially free from any other DNA fragment, DNA molecule, coding sequence, or oligonucleotide and associated cellular products or other impurities.

The term "cell" as used herein refers to either a prokaryotic or eukaryotic cell, optionally obtained from a subject or a commercially available source. Cells treated, transfected, transformed, or otherwise in contact with compositions and/or nucleic acid molecules disclosed herein, include without limitation, cells of a human, non-human animal, mammal, or non-human mammal, including without limitation, cells of murine, canine, or non-human primate species. Cells treated, transfected, transformed, or otherwise in contact with compositions and/or nucleic acid molecules disclosed herein are, without limitation, retinal cells, Müller glia (MG), and/or retinal neuronal cells such as retinal neurons, bipolar neurons, amacrine cells, horizontal cells, ganglion cells and/or glia. The term "Müller glial" cells "or "Müller glia" or "MG" refer to cells which are found in the vertebrate retina and are support cells for neurons. MG are the most common type of glial cells in the retina. While MG cell bodies are located in the inner nuclear layer of the retina, MG span across the entire retina.

As used herein, the term "subject" includes any human or non-human animal. The term "non-human animal" includes all vertebrates, e.g., mammals and non-mammals, such as non-human primates, horses, sheep, dogs, cows, pigs, chickens, and other veterinary subjects.

As used herein, "a" or "an" means at least one, unless clearly indicated otherwise.

As used herein, to "prevent" or "protect against" a condition or disease means to hinder, reduce or delay the onset or progression of the condition or disease.

The term "encode" as it is applied to nucleic acid sequences refers to a polynucleotide which is said to "encode" a polypeptide, an mRNA, or an effector RNA if, in its native state or when manipulated by methods well known to those skilled in the art, can be transcribed and/or translated to produce the effector RNA, the mRNA, or an mRNA that can for the polypeptide and/or a fragment thereof. The antisense strand is the complement of such a nucleic acid, and the encoding sequence can be deduced therefrom.

As used herein, the term "expression" or "gene expression" refers to the process by which polynucleotides are transcribed into mRNA and/or the process by which the transcribed mRNA is subsequently translated into peptides, polypeptides, or proteins. If the polynucleotide is derived from genomic DNA, expression may include splicing of the mRNA in a eukaryotic cell. The expression level of a gene may be determined by measuring the amount of mRNA or protein in a cell or tissue sample; further, the expression level of multiple genes can be determined to establish an expression profile for a particular sample.

As used herein, the term "functional" may be used to modify any molecule, biological, or cellular material to intend that it accomplishes a particular, specified effect.

As used herein, the term "combined therapy" refers to two or more compositions and/or nucleic acid molecules, delivered in combination, for example and without limitation, sequentially, concurrently, simultaneously, and/or step-wise, in order to achieve a therapeutic effect.

As used in the description of the invention and the appended claims, the singular forms "a," "an" and "the" are intended to include the plural forms as well, unless the context clearly indicates otherwise.

The term "about," as used herein when referring to a measurable value such as an amount, level or concentration, for example and without limitation, is meant to encompass variations of 20%, 10%, 5%, 1%, 0.5%, or even 0.1% of the specified amount, or fold differences in levels of a quantifiable comparison with a standard or control or reference material, such as 1-fold, 2-fold, 3-fold, 4-fold . . . 10-fold, 100-fold, etc. of the specified level of comparison.

In some embodiments, enhancing expression levels of the two or more proneural bHLH transcription factors, endogenous and/or exogenous, refers to an increase in the amount of expressed as compared to a control sample or explant levels of endogenous and/or exogenous Ascl1, and/or Atoh1, and/or Atoh7 such as, without limitation, untreated, or Ascl1 expression alone. In some embodiments, neurogenesis is increased and/or the production of functional neurons is increased as compared to a control. In some embodiments, expression levels and/or functional neurons are increased about 1.1 fold, about 1.2 fold, about 1.3 fold, about 1.4 fold, about 1.5 fold, about 1.6 fold, about 1.7 fold, about 1.8 fold, about 1.9 fold, about 2 fold, about 2.5 fold, about 3 fold, about 4 fold, about 5 fold, about 6 fold, about 7 fold, about 8 fold, about 9 fold, about 10 fold, about 20 fold, about 50 fold, about 100 fold, about 1000 fold, or about 10,000 fold relative to the control.

In some embodiments, the terms "reprogramming potentiator" or "reprogramming potentiating agent", used herein interchangeably, refers to a small molecule, polypeptide, protein, polynucleotide, nucleic acid, oligonucleotide, antisense, miRNA, or an equivalent or a biologically equivalent thereof which assists in the process of stimulating and/or boosting neurogenesis from MG in a manner such that functional neurons from the MG are produced. In one embodiment, one or more reprogramming potentiators assist in the process of stimulating neurogenesis and producing functional neurons from MG by inhibiting the HDAC pathway. In another embodiment, one or more reprogramming potentiators assist in the process of stimulating neurogenesis and producing functional neurons from MG by inhibiting the Jak/STAT pathway. In another embodiment, one or more reprogramming potentiators assist in the process of stimulating neurogenesis and producing functional neurons from MG by inhibiting the HDAC+Jak/STAT pathways. In another embodiment, one or more reprogramming potentiators assist in the process of stimulating neurogenesis and producing functional neurons from MG by enhancing and/or increasing endogenous and/or exogenous Ascl1 expression levels. See also our previous work in WO2019/210320, incorporated herein by reference in its entirety.

The terms "acceptable," "effective," or "sufficient" when used to describe the selection of any components, ranges, dose forms, etc. disclosed herein intend that said component, range, dose form, etc. is suitable for the disclosed purpose.

The term "adeno-associated virus" or "AAV" as used herein refers to a member of the class of viruses associated with this name and belonging to the genus dependoparvovirus, family Parvoviridae. Multiple serotypes of this virus are known to be suitable for gene delivery; all known serotypes can infect cells from various tissue types. At least 11 or 12, sequentially numbered, are disclosed in the prior art. Non-limiting exemplary serotypes useful in the methods disclosed herein include any of the 11 or 12 serotypes, e.g., AAV2, AAV5, and AAV8, or variant serotypes, e.g. AAV-DJ. The AAV structural particle is composed of 60 protein molecules made up of VP1, VP2, and VP3. Each particle contains approximately 5 VP1 proteins, 5 VP2 proteins and 50 VP3 proteins ordered into an icosahedral structure.

Compositions/Nucleic Acid Molecules

Provided are compositions and/or nucleic acid molecules for retinal regeneration, the potentiation of retinal regeneration, restoration of vision, and for treatment of retinal degenerative disease, damage, or injury.

Disclosed herein is a nucleic acid molecule comprising a nucleic acid sequence encoding two or more proneural bHLH transcription factors. In one embodiment, the nucleic acid molecule comprises a nucleic acid sequence encoding Ascl1 and Atoh1. In another embodiment, the nucleic acid molecule comprises a nucleic acid sequence encoding Ascl1 and Atoh7. In another embodiment, the nucleic acid molecule comprises a nucleic acid sequence encoding Atoh1 and Atoh7. In another embodiment, the nucleic acid molecule comprises a nucleic acid sequence encoding Ascl1, Atoh1 and Atoh7. In another embodiment; the nucleic acid molecule comprises a nucleic acid sequence encoding two or more proneural bHLH transcription factors selected from the group consisting of Ascl1+Atoh1, Ascl1+Atoh7, Atoh1+Atoh7, and Ascl1+Atoh1+Atoh7. In another embodiment, the nucleic acid molecule comprises a nucleic acid sequence encoding three or more proneural bHLH transcription factors (e.g., Ascl1+Atoh1+Atoh7). In some embodiments, the nucleic acid molecule comprises one, two, or three of the proneural bHLH transcription factors selected from Ascl1, Atoh1, and Atoh7, in combination with another proneural bHLH transcription factor. In some embodiments, the nucleic add molecule comprises a nucleic acid sequence encoding two, three, four, or all five of Ascl1, Atonal7, Atoh1, Neurogenin-2 (also known as NEUROG2 and NGN-2; Accession No. NM_024019; SEQ ID NO: 50), and Neurod1 (Accession No. KR709666; SEQ ID NO: 51).

In one embodiment disclosed herein is a nucleic acid molecule comprising a nucleic acid sequence encoding the two or more proneural bHLH transcription factors in operable linkage with a MG-specific promoter. In another embodiment, a nucleic acid molecule comprising a nucleic add sequence encoding the two or more proneural bHLH transcription factors in operable linkage with a human Rlbp1 promoter. Rlbp1 (Retinaldehyde binding protein 1) is a robust MG tissue specific promoter capable of driving expression of the two or more proneural bHLH transcription factors to MG cells at a level sufficient to induce neurogenesis from MG. In one embodiment, a portion of the Rlbp1 promoter is used for Ascl1+Atoh1 expression in MG. In another embodiment, the portion of the Rlbp1 promoter in operable linkage with the nucleic acid sequence encoding Ascl1 and Atoh1 is the Rlbp1 sequence found in SEQ ID NO: 7.

In one embodiment, the nucleic acid molecule for use in inducing or stimulating retinal neurogenesis from MG comprises a nucleic acid sequence encoding two or more proneural transcription factors. In another embodiment, the nucleic acid sequence encoding Ascl1+Atoh1 comprises a native Ascl1 promoter sequence. In another embodiment, the nucleic acid sequence encoding Ascl1+Atoh1 comprises a non-native Ascl1 promoter such as a retinal specific promoter. In another embodiment, the promoter is a MG-specific promoter such as, for example and without limitation, a retinaldehyde binding protein 1 (Rlbp1) promoter or portion thereof, glial fibrillary acidic protein (GFAP) promoter, vimentin (VIM) promoter, Hes1 promoter, or CD44 promoter. In another embodiment, the promoter is a ubiquitous promoter such as, for example and without limitation, a CMV promoter, CAG promoter or miniCMV promoter.

Such nucleic add molecules may be delivered by viral or non-viral means. One example of viral delivery is adeno-associated virus (AAV). Other examples include retrovirus, lentivirus, and baculovirus delivery. One example of a non-viral method of miR delivery is cell penetrating peptide (CPP). Polynucleotide constructs may also be modified, such as through chemical modification, to improve their stability and/or suitability for delivery. In some embodiments, the oligonucleotide is modified by locked nucleic acids and/or phosphorothioate linkages. In some embodiments, a delivery system is selected for improved bioavailability, such as PEGylated liposomes, lipidoids, or biodegradable polymers, as examples.

Nucleic Acid Molecules and Combined Therapy Compositions

In some embodiments, the composition further comprises one or more additional potentiating or therapeutic agents, including, for example, reprogramming potentiating agents. In some embodiments, the composition is free of reprogramming potentiating agents. Optionally, a composition comprising one or more small molecule reprogramming potentiating agents can be administered sequentially or concurrently with the nucleic acid molecules disclosed herein. In another embodiment, one or more protein/peptide or miR-based reprogramming potentiators can be incorporated into the nucleic acid molecules disclosed herein. Such one or more reprogramming potentiators are selected from HDACi, STATi, Jak/STATi and RNAi-based Ascl activators. See also our previous work in WO2019/210320, incorporated herein by reference in its entirety.

In one embodiment, the HDAC signaling pathway inhibitor is selected from the group consisting of peptidomimetics, small molecule inhibitors, oligonucleotides, peptides and proteins. Representative examples of small molecule HDACi include, but are not limited to, trichostatin A (TSA), Istodax™ also known as (Pro)/romidepsin, Beleodaq™, also known as (Pro)/belinostat, Farydak™, also known as (Pro)/panobinostat, and Zolinza™, also known as (Pro)/vorinostat, Quisinostat, Abexinostat, Givinostat, Resminostat, Phenylbutyrate, Valproic Acid, Depsipeptide, Entinostat, Mocetinostat, and Tubastatin A. Exemplary HDACi peptides are, without limitation, 16cyc-HxA, 16Iin-HxA and 16KA (SEQ ID NO: 8-10).

In one embodiment, the STAT signaling pathway inhibitor or Jak/STATi is selected from the group consisting of natural compounds, peptidomimetics, peptides, proteins, small molecules and oligonucleotides. Examples of endogenous STAT pathway inhibitors, include, but are not limited to, suppressor of cytokine signaling (SOCS) proteins, phosphatases, and protein inhibitor of activated STAT (PIAS) proteins. Such endogenous inhibitors provide a basis for therapeutic molecules and compounds for STAT inhibition. In one embodiment, protein or peptide inhibitors of STAT include, for example and without limitation, Socs1 (SEQ ID NO: 11), Socs2 (SEQ ID NO: 13), Socs3 (SEQ ID NO: 15), Socs4 (SEQ ID NO: 17), Socs5 (SEQ ID NO: 19), Socs6 (SEQ ID NO: 21), Socs7 (SEQ ID NO: 23), CIS, and/or XpYL. In one embodiment, a peptidomimetic inhibitor of STAT is ISS610. In another embodiment, small molecule inhibitors of STAT and/or Jak/STAT include, without limitation, STA-21, LLL3, S31-201, Stattic, OPB-31121, OPB-51602, SH-4-54, Tofactinib, Ruxolitinib, Baricitinib, Oclacitinib, AZD1480, and Dasatinib. In one embodiment, the STAT signaling pathway inhibitor is an inhibitor of STAT3. An exemplary STAT3 inhibitor includes, but is not limited to, SH-4-54. See also Fagard et al. JAKSTAT. 2013 Jan. 1; 2(1): e22882. In another embodiment, STAT and/or Jak/STAT inhibitors include natural compounds such as Butein and Capsaicin.

In some embodiments, the inhibitor, mimic, activator, or antagomir is an oligonucleotide or a nucleotide sequence. The invention thus provides nucleotide constructs for use in the compositions or combined therapy or nucleic acid molecules and methods described herein.

The reprogramming potentiating agents, in some embodiments, are selected from one or more STAT signaling pathway inhibitors; and one or more Ascl activators such as, without limitation, miR-25 and/or miR-124; and one or more let-7 family inhibitors. Exemplary sequences for such agents include, without limitation, SEQ ID NO: 25-32.

Optionally, provided herein is a composition comprising any one or more of the combined therapy of RNAi-based Ascl1 activators and/or HDACi STATi, and/or a nucleic acid sequence encoding the two or more proneural bHLH transcription factors or a vector comprising the nucleic acid sequences disclosed herein, and a carrier. In some embodiments, the carrier is a pharmaceutically acceptable carrier.

Viral Vectors

In some embodiments, the vector disclosed herein is a viral vector. In some embodiments, the vector is an adenoviral vector, an adeno-associated viral (AAV) vector, or a lentiviral vector. In some embodiments, the vector is a retroviral vector, an adenoviral/retroviral chimera vector, a herpes simplex viral I or II vector, a parvoviral vector, a reticuloendotheliosis viral vector, a polioviral vector, a papillomaviral vector, a vaccinia viral vector, or any hybrid or chimeric vector incorporating favorable aspects of two or more viral vectors. In some embodiments, the vector further comprises one or more expression control elements operably linked to the polynucleotide. In some embodiments, the vector further comprises one or more selectable markers.

In some embodiments, the vector disclosed herein is an AAV vector with low toxicity. In some embodiments, the AAV vector does not incorporate into the host genome, thereby having a low probability of causing insertional mutagenesis. In some embodiments, the AAV vector can encode a range of total polynucleotides from 4.5 kb to 4.75 kb. In some embodiments, exemplary AAV vectors that may be used in any of the herein described compositions, systems, methods, and kits can include an AAV1 vector, a modified AAV1 vector, an AAV2 vector, a modified AAV2 vector, an AAV3 vector, a modified AAV3 vector, an AAV4 vector, a modified AAV4 vector, an AAV5 vector, a modified AAV5 vector, an AAV6 vector, a modified AAV6 vector, an AAV7 vector, a modified AAV7 vector, an AAV8 vector, an AAV9 vector, an AAV.rh10 vector, a modified AAV.rh10 vector, an AAV.rh32/33 vector, a modified AAV.rh32/33 vector, an AAV.rh43 vector, a modified AAV.rh43 vector, an AAV.rh64R1 vector, and a modified AAV.rh64R1 vector and any combinations or equivalents thereof.

In some embodiments, the vector disclosed herein is a lentiviral vector. In one embodiment, the lentiviral vector is an integrase-competent lentiviral vector (ICLV). In some embodiments, the lentiviral vector can refer to the transgene plasmid vector as well as the transgene plasmid vector in conjunction with related plasmids (e.g., a packaging plasmid, a rev expressing plasmid, an envelope plasmid) as well as a lentiviral-based particle capable of introducing exogenous nucleic acid into a cell through a viral or viral-like entry mechanism. Lentiviral vectors are well-known in the art. In some embodiments, exemplary lentiviral vectors that may be used in relation to any of the herein described compositions, nucleic acid molecules and/or methods, and can include a human immunodeficiency virus (HIV) 1 vector, a modified human immunodeficiency virus (HIV) 1 vector, a human immunodeficiency virus (HIV) 2 vector, a modified human immunodeficiency virus (HIV) 2 vector, a sooty mangabey simian immunodeficiency virus (SIV$_{SM}$) vector, a modified sooty mangabey simian immunodeficiency virus (SIV$_{SM}$) vector, a African green monkey simian immunodeficiency virus (SIV$_{AGM}$) vector, a modified African green monkey simian immunodeficiency virus (SIV$_{AGM}$) vector, a equine infectious anemia virus (EIAV) vector, a modified equine infectious anemia virus (EIAV) vector, a feline immunodeficiency virus (Fly) vector, a modified feline immunodeficiency virus (FIV) vector, a Visna/maedi virus (VNV/VMV) vector, a modified Visna/ maedi virus (VNV/VMV) vector, a caprine arthritis-encephalitis virus (CAEV) vector, a modified caprine arthritis-encephalitis virus (CAEV) vector, a bovine immunodeficiency virus (BIV), or a modified bovine immunodeficiency virus (BIV).

In some embodiments of the compositions and/or nucleic acid molecules and/or methods of the disclosure, a vector of the disclosure is a viral vector. In some embodiments, the viral vector comprises a sequence isolated or derived from a retrovirus. In some embodiments, the viral vector comprises a sequence isolated or derived from a lentivirus. In some embodiments, the viral vector comprises a sequence isolated or derived from an adenovirus. In some embodiments, the viral vector comprises a sequence isolated or derived from an adeno-associated virus (AAV). In some embodiments, the viral vector is replication incompetent. In some embodiments, the viral vector is isolated or recombinant. In some embodiments, the viral vector is self-complementary.

In some embodiments of the compositions and/or nucleic acid molecules and/or methods of the disclosure, the viral vector comprises a sequence isolated or derived from an adeno-associated virus (AAV). In some embodiments, the viral vector comprises an inverted terminal repeat sequence or a capsid sequence that is isolated or derived from an AAV of serotype AAV1, AAV2, AAV3, AAV4, AAV5, AAV6, AAV7, AAV8, AAV9, AAV10, AAV11, or AAV12, or the vector and/or components are derived from a synthetic AAV serotype, such as, without limitation, Anc80 AAV (an ancestor of AAV 1, 2, 6, 8 and 9). In some embodiments, the viral vector is replication incompetent. In some embodiments, the viral vector is isolated or recombinant (rAAV). In some embodiments, the viral vector is self-complementary (scAAV).

In some embodiments of the compositions and methods of the disclosure, a vector of the disclosure is a non-viral vector. In some embodiments, the vector comprises or consists of a nanoparticle, a micelle, a liposome or lipoplex, a polymersome, a polyplex or a dendrimer.

In some embodiments, expression vector or viral vector disclosed herein is used to transfect, transform, or come in contact with a cell which is a eukaryotic cell. In some embodiments, the cell is an animal cell. In some embodiments, the cells is a zebrafish cell. In some embodiments, the cell is a mammalian cell. In some embodiments, the cell is a bovine, murine, feline, equine, porcine, canine, simian, or human cell. In particular embodiments, the cell is a retinal neuron or MG of an animal or mammal.

In some embodiments, a cell is a packaging cell or a producer cell for production of a viral particle.

In some embodiments, provided herein are viral particles comprising, consisting of, or consisting essentially of a vector comprising, consisting of, or consisting essentially of a polynucleotide sequence encoding an Ascl1 protein.

In general, methods of packaging genetic material such as RNA or DNA into one or more vectors is well known in the art. For example, the genetic material may be packaged using a packaging vector and cell lines and introduced via traditional recombinant methods.

In some embodiments, the packaging vector may include, but is not limited to retroviral vector, lentiviral vector, adenoviral vector, and adeno-associated viral vector. The packaging vector contains elements and sequences that facilitate the delivery of genetic materials into cells. For example, the retroviral constructs are packaging plasmids comprising at least one retroviral helper DNA sequence derived from a replication-incompetent retroviral genome encoding in trans all virion proteins required to package a replication incompetent retroviral vector, and for producing virion proteins capable of packaging the replication-incompetent retroviral vector at high titer, without the production of replication-competent helper virus. The retroviral DNA sequence lacks the region encoding the native enhancer and/or promoter of the viral 5' LTR of the virus, and lacks both the psi function sequence responsible for packaging helper genome and the 3' LTR, but encodes a foreign polyadenylation site, for example the SV40 polyadenylation site, and a foreign enhancer and/or promoter which directs efficient transcription in a cell type where virus production is desired. The retrovirus is a leukemia virus such as a Moloney Murine Leukemia Virus (MMLV), the Human Immunodeficiency Virus (HIV), or the Gibbon Ape Leukemia virus (GALV). The foreign enhancer and promoter may be the human cytomegalovirus (HCMV) immediate early (IE) enhancer and promoter, the enhancer and promoter (U3 region) of the Moloney Murine Sarcoma Virus (MMSV), the U3 region of Rous Sarcoma Virus (RSV), the U3 region of Spleen Focus Forming Virus (SFFV), or the HCMV IE enhancer joined to the native Moloney Murine Leukemia Virus (MMLV) promoter.

The retroviral packaging plasmid may consist of two retroviral helper DNA sequences encoded by plasmid-based expression vectors, for example where a first helper sequence contains a cDNA encoding the gag and pol proteins of ecotropic MMLV or GALV and a second helper sequence contains a cDNA encoding the env protein. The Env gene, which determines the host range, may be derived from the genes encoding xenotropic, amphotropic, ecotropic, polytropic (mink focus forming) or 10A1 murine leukemia virus env proteins, or the Gibbon Ape Leukemia Virus (GALV env protein, the Human Immunodeficiency Virus env (gp160) protein, the Vesicular Stomatitus Virus (VSV) G protein, the Human T cell leukemia (HTLV) type I and II env gene products, chimeric envelope gene derived from combinations of one or more of the above env genes or chimeric envelope genes encoding the cytoplasmic and transmembrane of the above env gene products and a monoclonal antibody directed against a specific surface molecule on a desired target cell. Similar vector-based systems may employ other vectors such as sleeping beauty vectors or transposon elements.

The resulting packaged expression systems may then be introduced via an appropriate route of administration, discussed in detail with respect to the method aspects disclosed herein.

Pharmaceutical Compositions

Pharmaceutical compositions disclosed herein include one or more pharmaceutically or physiologically acceptable carriers, diluents or excipients. Such compositions may comprise buffers such as neutral buffered saline, phosphate buffered saline and the like; carbohydrates such as glucose, mannose, sucrose or dextrans, mannitol; proteins; polypeptides or amino acids such as glycine; antioxidants; chelating agents such as EDTA or glutathione; adjuvants (e.g., aluminum hydroxide); and preservatives. Compositions of the disclosure may be formulated for intraocular administration.

Cells

In some embodiments of the compositions and/or nucleic acid molecules and/or methods of the disclosure, a cell of the disclosure is a retinal cell, such as a Müller glial (MG) cell, or a rod or cone photoreceptor cell. In some embodiments, the cell is a neuronal cell. In some embodiments, a neuronal cell of the disclosure is a neuron of the retina. In some embodiments, a neuron cell of the disclosure is a neuron of an optic nerve. In some embodiments, a neuron cell of the disclosure is a neuroglial or a glial cell. In some embodiments, a cell is a bipolar neuron, a horizontal cell, a ganglion cell, or an amacrine cell. In some embodiments, a cell of the disclosure is an astrocyte. In some embodiments, cells of the disclosure are macroglia or microglia or glia.

In some embodiments of the compositions and methods of the disclosure, a cell of the disclosure is a cultured cell.

In some embodiments of the disclosure, a cell is in vivo, in vitro, ex vivo, or in situ. In some embodiments, the cells are modified ex vivo and transplanted into and/or administered to the retina of a subject in need thereof.

In some embodiments, a cell of the disclosure is autologous or allogeneic and used for transplantation.

In some embodiments, a cell of the disclosure is a stem cell-derived or an embryonic stem cell-derived retinal cell. In some embodiments, the cell is derived from an induced pluripotent stem cell (iPS cell)-derived retinal cell.

Methods

Described herein are methods for inducing retinal regeneration in a subject. Also provided are methods for enhancing retinal regeneration, improving retinal neurogenesis, potentiating retinal regeneration, restoring vision, and treating retinal degenerative disease, damage, injury, or blindness.

In one embodiment is a method for inducing retinal regeneration in a subject comprising: a) administering to a retina of the subject the nucleic acid molecules and/or compositions disclosed herein. In one embodiment, a method for inducing retinal regeneration in a subject comprises: a) administering to a retina of the subject a nucleic acid molecule comprising a nucleic acid sequence encoding two or more proneural bHLH transcription factors, wherein expression of the proneural bHLH transcription factors stimulates regeneration of retinal interneurons from retinal Müller glia (MG) and reprograms the MG into bipolar, amacrine, horizontal, and/or ganglion cells. In particular, in one embodiment of the method disclosed herein, the nucleic acid molecule comprises a nucleic acid sequence encoding Ascl1 and Atoh1. In another embodiment of the method disclosed herein, the nucleic acid molecule comprises a nucleic acid sequence encoding Ascl1 and Atoh7. In another embodiment of the method disclosed herein, the nucleic acid molecule comprises a nucleic acid sequence encoding Atoh1 and Atoh7. In another embodiment of the method disclosed herein, the nucleic acid molecule comprises a nucleic acid sequence encoding Ascl1, Atoh1 and Atoh7. In another embodiment of the method disclosed herein, the nucleic acid molecule comprises a nucleic acid sequence encoding two or more proneural bHLH transcription factors selected from the group consisting of Ascl1+Atoh1, Ascl1+Atoh7, Atoh1+Atoh7, and Ascl1+Atoh1+Atoh7.

In one embodiment of the method disclosed herein, the nucleic acid molecule comprising a nucleic acid sequence encoding the two or more proneural bHLH transcription factors is in operable linkage with a MG-specific promoter. In another particular embodiment of the method disclosed herein, a nucleic acid molecule comprising a nucleic acid sequence encoding the two or more proneural bHLH transcription factors (e.g., Ascl1, Atoh1 and Atoh7) is in operable linkage with a human Rlbp1 promoter. In another embodiment of the method disclosed herein, a nucleic acid molecule comprising a nucleic acid sequence encoding Ascl1 and Atoh1 is in operable linkage with a human Rlbp1 promoter. In another embodiment of the method disclosed herein, a nucleic acid molecule comprising a nucleic acid sequence encoding Ascl1 and Atoh7 is in operable linkage with a human Rlbp1 promoter. In another embodiment of the method disclosed herein, a nucleic acid molecule comprising a nucleic acid sequence encoding Ascl1, Atoh1, and Atoh7 is in operable linkage with a human Rlbp1 promoter. Rlbp1 (Retinaldehyde binding protein 1) is a robust MG tissue specific promoter capable of driving expression of Ascl1 to MG cells at a level sufficient to induce neurogenesis from MG. In one embodiment of the method disclosed herein, a portion of the Rlbp1 promoter is used for expression of the two or more proneural bHLH transcription factors in MG. In another embodiment of the method disclosed herein, the portion of the Rlbp1 promoter in operable linkage with the nucleic acid sequence encoding the proneural bHLH transcription factors (e.g., Ascl1 and Atoh1) is the Rlbp1 sequence found in SEQ ID NO: 7.

Also provided herein are methods for inducing retinal regeneration comprising administering to a subject a composition as described herein. In some embodiments, the methods are effective to increase the number of Müller glial-derived neurons, to induce Müller glial (MG) cells to enter the mitotic cell cycle, and/or to generate new retinal neurons; including the generation of new bipolar neurons, horizontal cells, ganglion, and/or amacrine cells. In some embodiments of the method, the number of retinal neurons increases by at least 25% relative to a baseline level or other reference amount representative of an untreated retina. In other embodiments, the number of retinal neurons increases by at least 40%. In some embodiments, the number of retinal neurons increases by 10%, 20%, 50%, 100%, 150%, 200%, or more.

Optionally, methods disclosed herein may utilize combined therapy compositions comprising one or more, or two or more, small molecule reprogramming potentiating agents. The agents can be administered sequentially or concurrently with the nucleic acid molecules disclosed herein. In another embodiment, one or more protein/peptide or miR-based reprogramming potentiators can be incorporated into the nucleic acid molecules used in the methods disclosed herein. Such one or more reprogramming potentiators are selected from HDACi, STATi, Jak/STATi and RNAi-based Ascl activators. See also our previous work in WO2019/210320, incorporated herein by reference in its entirety. In some embodiments, the method is performed in the absence of such reprogramming potentiators.

The subject is typically a mammal, such as a human or veterinary subject. In one embodiment, the subject is an adult. The subject, in some embodiments, has a retinal degenerative disease. Examples of such retinal degenerative diseases include, but are not limited to, Age-related Macular Degeneration (AMD), Retinitis Pigmentosa (RP). Diabetic Retinopathy (DR), Central Retinal Artery Occlusion (CRAO), Vitreoretinopathy, and Glaucoma.

Administration and Dosage

The compositions and/or nucleic acid molecules disclosed herein are administered in any suitable manner, often with pharmaceutically acceptable carriers. Suitable methods of administering compositions, compounds, molecules, nucleic acids, and vectors in the context of the present invention to a subject's eye or retina are available, and, although more than one route can be used to administer a particular composition, a particular route can often provide a more immediate and more effective reaction than another route. For treatment of the retina; intraocular injection, such as, for example and without limitation, intravitreal injection and subretinal injection are the most common routes of delivery to the retina. In some embodiments, however, periocular, suprachoroidal, systemic, or topical administration is more suitable for efficacy and safety of delivery.

The dose administered to a patient, in the context of the disclosure herein, should be sufficient to result in a beneficial therapeutic response in the patient over time, or to inhibit disease progression. Thus, the composition is administered to a subject in an amount sufficient to elicit an effective response and/or to alleviate, reduce, cure or at least partially arrest symptoms and/or complications from the retinal disease or injury. An amount adequate to accomplish this is defined as a "therapeutically effective dose."

Routes, order and/or frequency of administration of the therapeutic compositions disclosed herein, as well as dosage, will vary from individual to individual, and may be readily established using standard techniques. In general, an appropriate dosage and treatment regimen provides the active compound(s) in an amount sufficient to provide therapeutic and/or prophylactic benefit. Such a response can be monitored by establishing an improved clinical outcome in treated patients as compared to non-treated patients.

EXAMPLE EMBODIMENTS

Embodiment 1: A nucleic acid molecule comprising a nucleic acid sequence encoding two or more proneural bHLH transcription factors.

Embodiment 2: The nucleic acid molecule of the preceding embodiment, wherein the two or more proneural bHLH transcription factors is selected from the group consisting 1) Ascl1+Atoh1, 2) Ascl1+Atoh7, 3) Atoh1+Atoh7, and 4) Ascl1+Atoh1+Atoh7, and 5) a combination thereof.

Embodiment 3: The nucleic acid molecule of the preceding embodiments, wherein the two or more proneural bHLH transcription factors is Ascl1 and Atoh1.

Embodiment 4: The nucleic acid molecule of the preceding embodiments, wherein the nucleic acid sequence comprises an IRES or a 2A self-cleaving site.

Embodiment 5: The nucleic acid molecule of the preceding embodiments, wherein the nucleic acid sequence comprises a promoter sequence.

Embodiment 6: The nucleic acid molecule of the preceding embodiments, wherein the promoter sequence is a retinal or Müller glial (MG)-specific promoter.

Embodiment 7: The nucleic add molecule of the preceding embodiments, wherein the MG-specific promoter is Rlbp1.

Embodiment 8: A method for inducing retinal regeneration in a subject comprising: administering to a retina of the subject a nucleic acid molecule comprising a nucleic acid sequence encoding two or more proneural bHLH transcription factors, wherein expression of the proneural bHLH transcription factors stimulates regeneration of retinal interneurons from retinal Müller glia (MG) and reprograms the MG into bipolar, amacrine, horizontal, and/or ganglion cells.

Embodiment 9: The method of the preceding embodiment, wherein the two or more proneural bHLH transcription factors is selected from the group consisting of 1) Ascl1+Atoh1, 2) Ascl1+Atoh7, 3) Atoh1+Atoh7, and 4) Ascl1+Atoh1+Atoh7, and 5) a combination thereof.

Embodiment 10: The nucleic add molecule or method of any of the preceding embodiments, wherein the two or more proneural bHLH transcription factors is selected from the group consisting of Ascl1, Atonal7, Atoh1, Neurogenin-2, Neurod1, and combinations thereof.

Embodiment 11: The methods of any of the preceding embodiments, wherein the number of the MG-derived functional neurons is increased.

Embodiment 11: The methods of the preceding embodiments, wherein the subject is treated for retinal disease, damage or degeneration in the retina.

Embodiment 12: The methods of the preceding embodiments, wherein the subject is an adult.

Embodiment 13: The methods of the preceding embodiments, wherein a vector comprises the nucleic acid molecule.

Embodiment 14: The methods of the preceding embodiments, wherein the vector is a non-viral vector or a viral vector.

Embodiment 15: The methods of the preceding embodiments, wherein the vector is a viral vector.

Embodiment 16: The methods of the preceding embodiments, wherein the viral vector is an adeno-associated viral (AAV) vector or a lentiviral vector.

Embodiment 17: The methods of the preceding embodiments, wherein the nucleic acid molecule further comprises a promoter sequence in operable linkage with the nucleic acid sequence encoding the two or more proneural bHLH transcription factors.

Embodiment 18: The methods of the preceding embodiments, wherein the promoter is a retinal or NAG-specific promoter.

Embodiment 19: The methods of the preceding embodiments, wherein the MG-specific promoter is Rlbp1.

Embodiment 20: The methods of the preceding embodiments, wherein administering to the retina is intravitreal or subretinal injection.

Embodiment 21: The methods of the preceding embodiments, wherein the nucleotide sequence comprises an IRES or 2A self-cleaving site.

Embodiment 22: The nucleic acid molecules or methods of the preceding embodiments, wherein the two or more proneural bHLH transcription factors are expressed as a fusion protein.

Embodiment 23: The nucleic acid molecules or methods of the preceding embodiments, optionally comprising, or accompanying the combined therapy of administering reprogramming potentiators selected from the group consisting of HDACi, Jak/STATi, and RNAi-based Ascl activators.

EXAMPLES

The following examples are presented to illustrate the present invention and to assist one of ordinary skill in making and using the same. The examples are not intended in any way to otherwise limit the scope of the invention.

Example 1: Atoh and Ascl1 Overexpression in Adult Mice Induces Reprogramming of Müller Glia Adult Glast-CreER: Flox-stop-LNL-tTA: tetO-Atoh1: tetO-Ascl1-ires-GFP mice were injected for 5 consecutive days with tamoxifen and retinas were collected 3-6 weeks later for immunohistochemistry. GFP and Atoh1 were stained to determine (1) if there were GFP+ cells present in this paradigm, and (2) if Atoh1 was expressed in MG when co-expressed with Ascl1. Abundant GFP expressing cells were observed with no obvious signs of injury or apoptosis, suggesting that the combination of Ascl1 and Atoh1 are tolerable (FIG. 1). Surprisingly, over 80% of the MG had retracted their glial processes and adopted a neuronal morphology. All the MG that maintained their glial morphology failed to express detectable levels of Atoh1 (FIG. 1), whereas every GFP+ cell with a neuronal morphology expressed high levels of Atoh1 (FIG. 1). These data show that the combination of Atoh1 and Ascl1 expression induces MG reprogramming without the need for retinal damage or a reprogramming potentiator such as an HDAC inhibitor (e.g., TSA).

Figure 2:
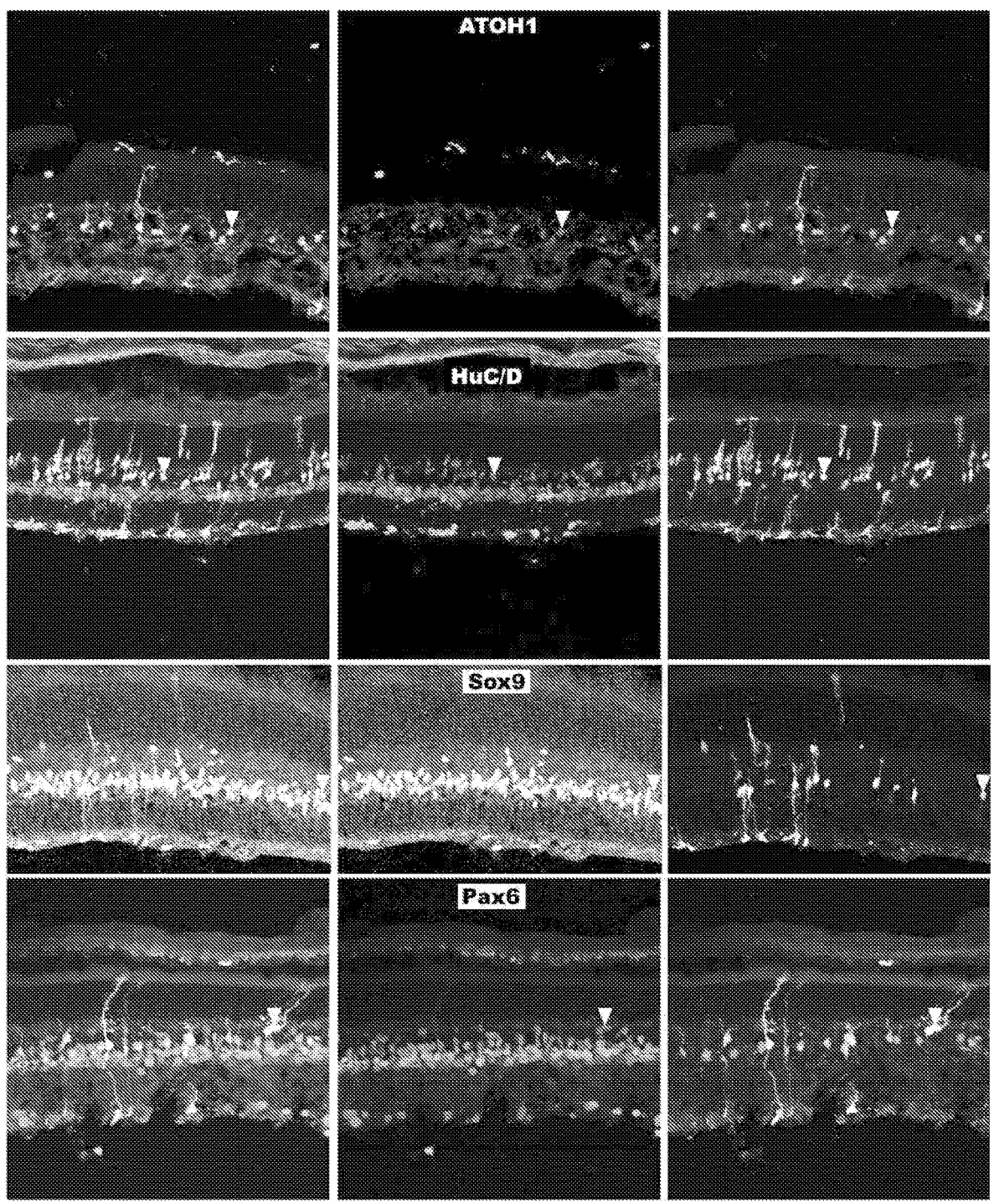
FIG. 2 shows Atoh1 and Ascl1-overexpressing cells in adult mice stained for a subset of amacrine markers. Arrows indicate examples of cells that express Atoh1, HuC/D, and Pax6.

Example 2: Atoh1 and Ascl1-Overexpression Cells in Adult Mice Stain for a Subset of Amacrine Markers To further characterize the MG-derived neurons co-expressing Ascl1/Atoh1, immunohistochemical staining with a panel of neuronal markers was used. Every GFP+ cell with a neuronal morphology stained for amacrine marker HuC/D, and none of the cells stained for bipolar markers Otx2 or Cabp5. This is in stark contrast to Ascl1 alone, wherein generated neurons primarily express Otx2 and Cabp5 and very few HuC/D positive cells are present. A subset of the neurons in the Atoh1/Ascl1 expressing cells additionally stained with amacrine marker Pax6 (FIG. 2). Notably, the neurons had reduced expression of the MG marker Sox9, while the GFP+ MG that failed to undergo neurogenesis still had high levels of Sox9 (FIG. 2). This is similar to previous findings from ANT and ANTSi-treated retinas, wherein MG-derived neurons downregulate glial genes.

In addition to Atoh1 and HuC/D being expressed in every GFP+ cell with neuronal morphology, NeuN expression was observed in every neuronal cell. This was a surprising result given that NeuN is normally in every ganglion cell and only a subset of amacrine cells. Because these MG-derived neurons appeared to resemble amacrine/ganglion cells, single-cell RNA-sequencing was performed to determine if the cells express additional ganglion cell genes. Indeed, the sequencing results revealed that ganglion cell genes Gad2, Gap43, Nefl, Nefm, Stmn2, Stmn3, Tfap2b, Tfap2a, and Tubb3 were expressed. Taken together, these results provide the basis for therapeutic paradigms, particularly single-injection gene therapies, for reprogramming and generating new retinal neurons from MG. Moreover, this work underpins the possibility of inducing retinal regeneration to functional neurons from MG without inducing injury and/or without the need for adding a reprogramming potentiator such as an HDACi, a Jak/STATi, and/or RNAi-based Ascl activators.

REFERENCES

Cafaro, J., Lee, G. S. & Stone, J. S. Atoh1 expression defines activated progenitors and differentiating hair cells during avian hair cell regeneration. *Dev Dyn* 236, 156-170, doi:10.1002/dvdy.21023 (2007).

Chen, P., Johnson, J. E., Zoghbi, H. Y. & Segil, N. The role of Math1 in inner ear development: Uncoupling the establishment of the sensory primordium from hair cell fate determination. *Development* 129, 2495-2505 (2002).

Brown, N. L., Dagenais, S. L.; Chen, C. M. & Glaser, T. Molecular characterization and mapping of ATOH7, a human atonal homolog with a predicted role in retinal ganglion cell development. *Mamm Genome* 13, 95-101, doi:10.1007/s00335-001-2101-3 (2002).

Brown, N. L., Patel, S., Brzezinski, J. & Glaser, T. Math5 is required for retinal ganglion cell and optic nerve formation. *Development* 128, 2497-2508 (2001).

Kay, J. N., Finger-Baier, K. C., Roeser, T.; Staub, W. & Baier, H. Retinal ganglion cell genesis requires lakritz, a Zebrafish atonal Homolog. *Neuron* 30, 725-736 (2001).

Wang, S. W. et al. Requirement for math5 in the development of retinal ganglion cells. *Genes Dev* 15, 24-29 (2001).

Schlamp, C. L et al. Evaluation of the percentage of ganglion cells in the ganglion cell layer of the rodent retina. *Mol Vis* 19, 1387-1396 (2013).

Raymond, I. D., Vila, A., Huynh, U. C. & Brecha, N. C. Cyan fluorescent protein expression in ganglion and amacrine cells in a thy1-CFP transgenic mouse retina. *Mol Vis* 14, 1559-1574 (2008).

Throughout this application various publications are referenced. The disclosures of these publications in their entireties are hereby incorporated by reference into this application in order to describe more fully the state of the art to which this invention pertains. Also incorporated by reference herein in its entirety is provisional application No. 62/840,264, filed Apr. 29, 2019, to which this application claims priority.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for inducing retinal regeneration in a mammalian subject comprising: administering to a retina of the subject a nucleic acid molecule comprising a nucleic acid sequence encoding two or more proneural bHLH transcription factors, wherein expression of the proneural bHLH transcription factors stimulates regeneration of retinal interneurons from retinal Müller glia (MG) and reprograms the MG into bipolar, amacrine, horizontal, and/or ganglion cells, wherein the proneural bHLH transcription factors comprise Ascl1 and a second proneural bHLH transcription factor selected from the group consisting of Atoh7, Atoh1 Neurogenin-2, and Neuronal Differentiation 1 (Neurod1).

2. The method of claim 1, wherein the two or more proneural bHLH transcription factors is selected from the group consisting of: 1) Ascl1+Atoh1, 2) Ascl1+Atoh7, and 3) Ascl1+Atoh1+Atoh7.

3. The method of claim 2, wherein the number of the MG-derived functional neurons is increased.

4. The method of claim 1, wherein the subject has a retinal disease, damage or degeneration in the retina.

5. The method of claim 1, wherein the subject is an adult.

6. The method of claim 1, wherein a vector comprises the nucleic acid molecule.

7. The method of claim 6, wherein the vector is a non-viral vector or a viral vector.

8. The method of claim 7, wherein the viral vector is an adeno-associated viral (AAV) vector or a lentiviral vector.

9. The method of claim 1, wherein the nucleic acid molecule further comprises a promoter sequence in operable linkage with the nucleic acid sequence encoding the two or more proneural bHLH transcription factors.

10. The method of claim 9, wherein the promoter is a retinal or MG-specific promoter.

11. The method of claim 10, wherein the MG-specific promoter is Rlbp1.

12. The method of claim 1, wherein the administering to the retina is intravitreal or subretinal injection.

13. The method of claim 1, wherein the nucleic acid sequence comprises an IRES or 2A self-cleaving site.

14. The method of claim 1, wherein the two or more proneural bHLH transcription factors are expressed as a fusion protein.

15. The method of claim 1, wherein the administering is performed without use of a reprogramming potentiator.

16. The method of claim 15, wherein the reprogramming potentiator is a histone deacetylase (HDAC) inhibitor, a Jak/STAT inhibitor, or an RNAi-based Ascl1 activator.

17. A method of enhancing neurogenesis in mammalian retina in the absence of a reprogramming potentiator, the method comprising: administering to a retina of a mammalian subject a nucleic acid molecule comprising a nucleic acid sequence encoding two or more proneural bHLH transcription factors, wherein expression of the proneural bHLH transcription factors stimulates regeneration of retinal interneurons from retinal Müller glia (MG) and reprograms the MG into bipolar, amacrine, horizontal, and/or ganglion cells, wherein the proneural bHLH transcription factors comprise Ascl1 and a second proneural bHLH transcription factor selected from the group consisting of Atoh7, Atoh1, and Neuronal Differentiation 1 (Neurod1).

18. The method of claim 17, wherein the nucleic acid molecule is an adeno-associated viral (AAV) vector or a lentiviral vector.

* * * * *